United States Patent
Rajasingham

(12) 
(10) Patent No.: US 6,715,816 B2
(45) Date of Patent: *Apr. 6, 2004

(54) EASY EJECTOR SEAT WITH SKELETAL CRASH SAFETY BEAM

(76) Inventor: Arjuna Indraeswaran Rajasingham, 6024 Bradley Blvd., Bethesda, MD (US) 20817

( * ) Notice: Subject to any disclaimer, the term of this patent is extended or adjusted under 35 U.S.C. 154(b) by 329 days.

This patent is subject to a terminal disclaimer.

(21) Appl. No.: 09/779,593

(22) Filed: Feb. 9, 2001

(65) Prior Publication Data

US 2002/0125729 A1 Sep. 12, 2002

Related U.S. Application Data

(63) Continuation-in-part of application No. 09/435,830, filed on Nov. 8, 1999, and a continuation-in-part of application No. 09/404,475, filed on Sep. 24, 1999, and a continuation-in-part of application No. 08/936,626, filed on Sep. 24, 1997, now Pat. No. 6,059,354.
(60) Provisional application No. 60/226,570, filed on Aug. 21, 2000, and provisional application No. 60/195,298, filed on Apr. 10, 2000.

(51) Int. Cl.[7] .................................................. B60N 2/02
(52) U.S. Cl. ................ 296/68.1; 296/65.04; 280/250.1; 297/DIG. 4
(58) Field of Search .................................. 296/63, 65.01, 296/67, 68, 68.1, 65.02, 65.03, 65.11, 65.12, 65.13, 65.14, 65.15, 188, 189; 180/282; 297/344.11, 487, 488, 216.1, 216.11, 216.16, 216.18, 411.44, DIG. 4; 280/734, 250.1; 414/921

(56) References Cited

U.S. PATENT DOCUMENTS

| | | | |
|---|---|---|---|
| 3,865,427 A | * | 2/1975 | Delany |
| 4,170,368 A | * | 10/1979 | Southward et al. |
| 4,354,791 A | * | 10/1982 | Antonellis |
| 4,542,917 A | * | 9/1985 | Waite |
| 5,110,173 A | * | 5/1992 | Mergna |
| 5,466,111 A | * | 11/1995 | Meyer |
| 5,769,360 A | * | 6/1998 | Kerbis et al. |
| 5,857,832 A | * | 1/1999 | Al-Temen et al. |
| 5,884,929 A | * | 3/1999 | Kincaid |
| 6,416,272 B1 | * | 7/2002 | Suehiro et al. |

* cited by examiner

Primary Examiner—Joseph D. Pape

(57) ABSTRACT

An arrangement in passenger vehicles, that diverts the impact energy in impacts away from the passengers to the remaining mass of the vehicle thereby protecting the passengers, and in the same arrangement provides utilitarian access to the vehicle, such utilitarian access making it possible to both install multi-element contoured surround seats for the occupant, and also arrangement for wheelchairs that may be engaged in the position of a conventional occupant seat. An indo-skeletal structural arrangement proposed for the vehicle, provides further benefits by targeting the strength of the vehicle to protect passengers while minimizing other massive elements in the vehicle.

12 Claims, 52 Drawing Sheets

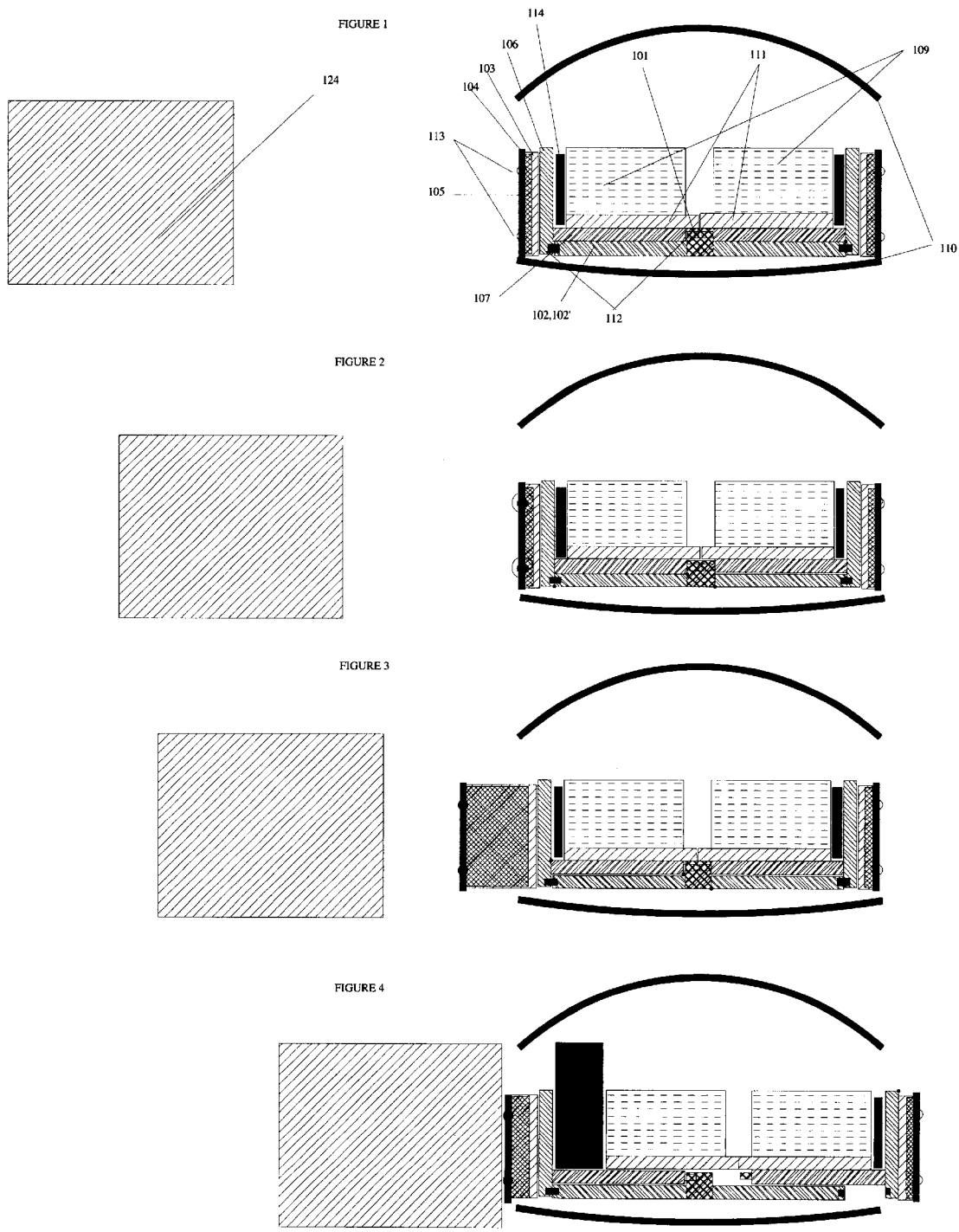

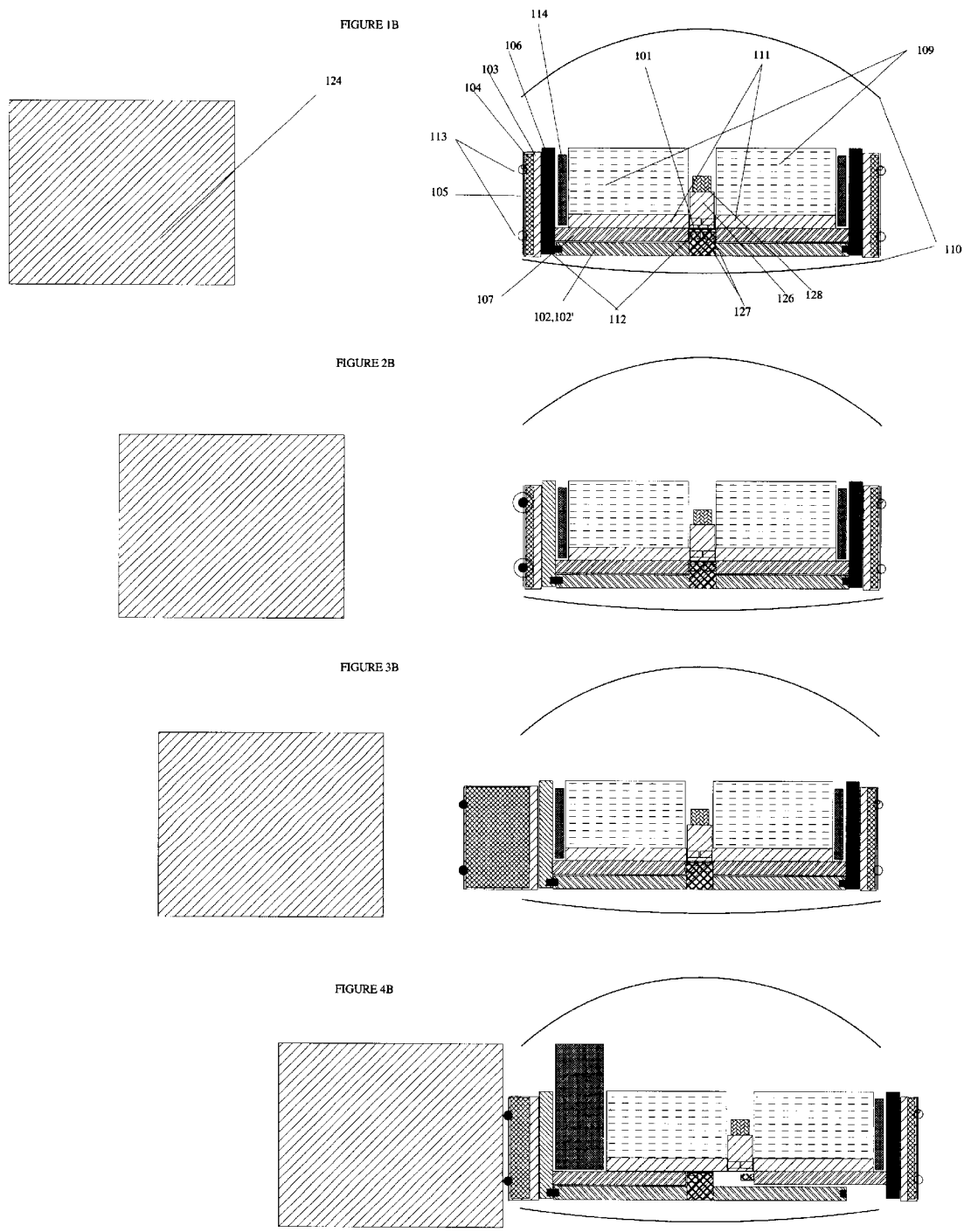

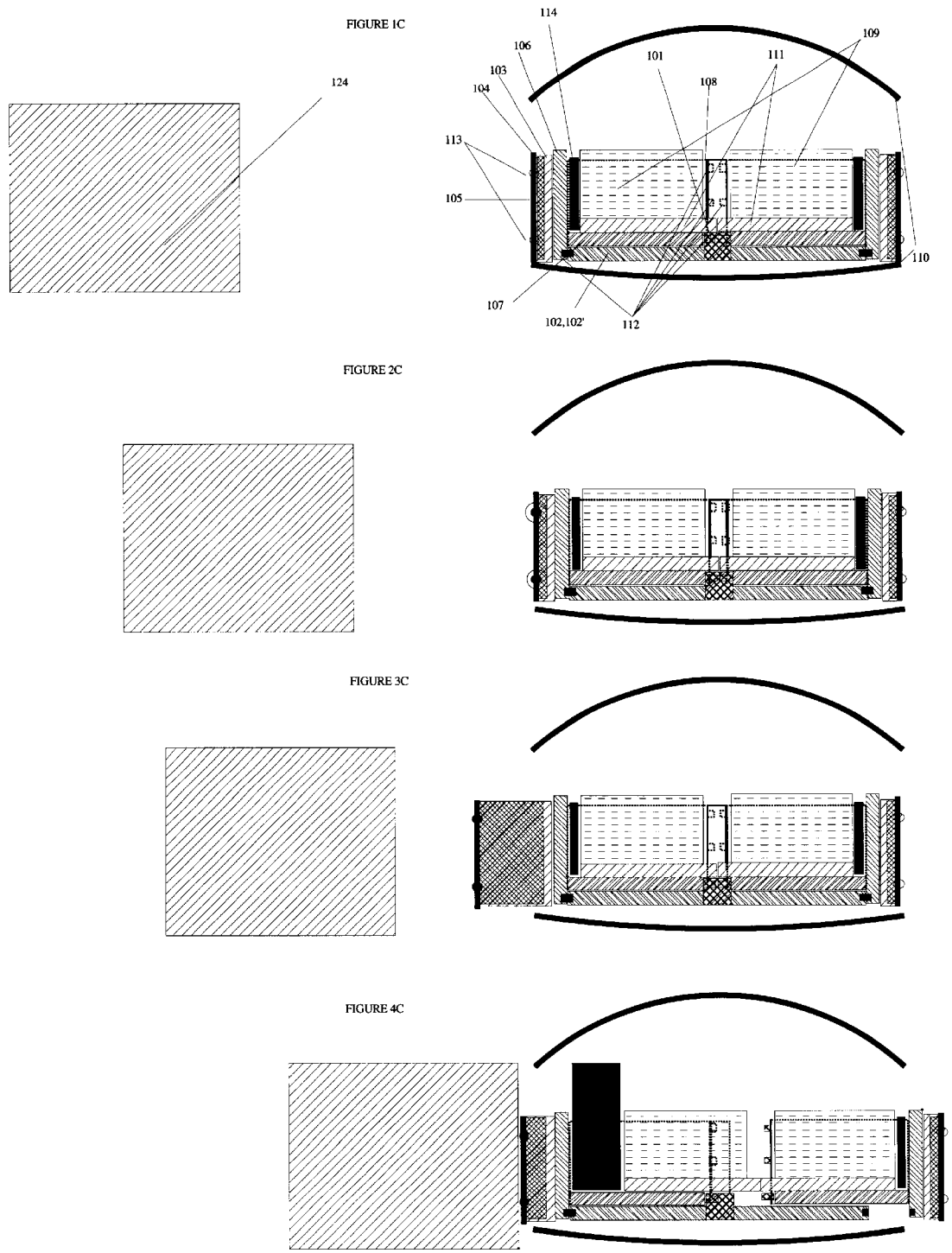

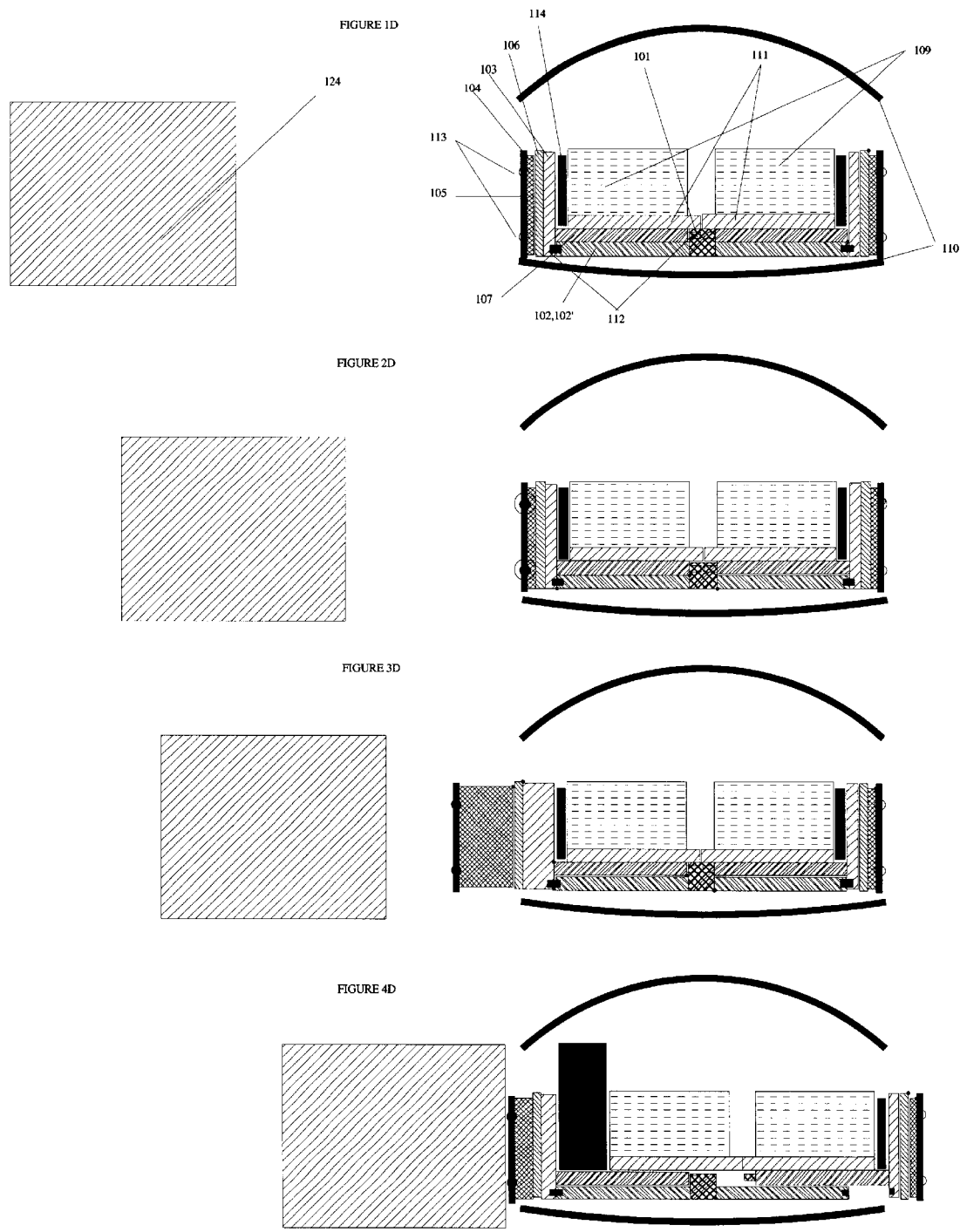

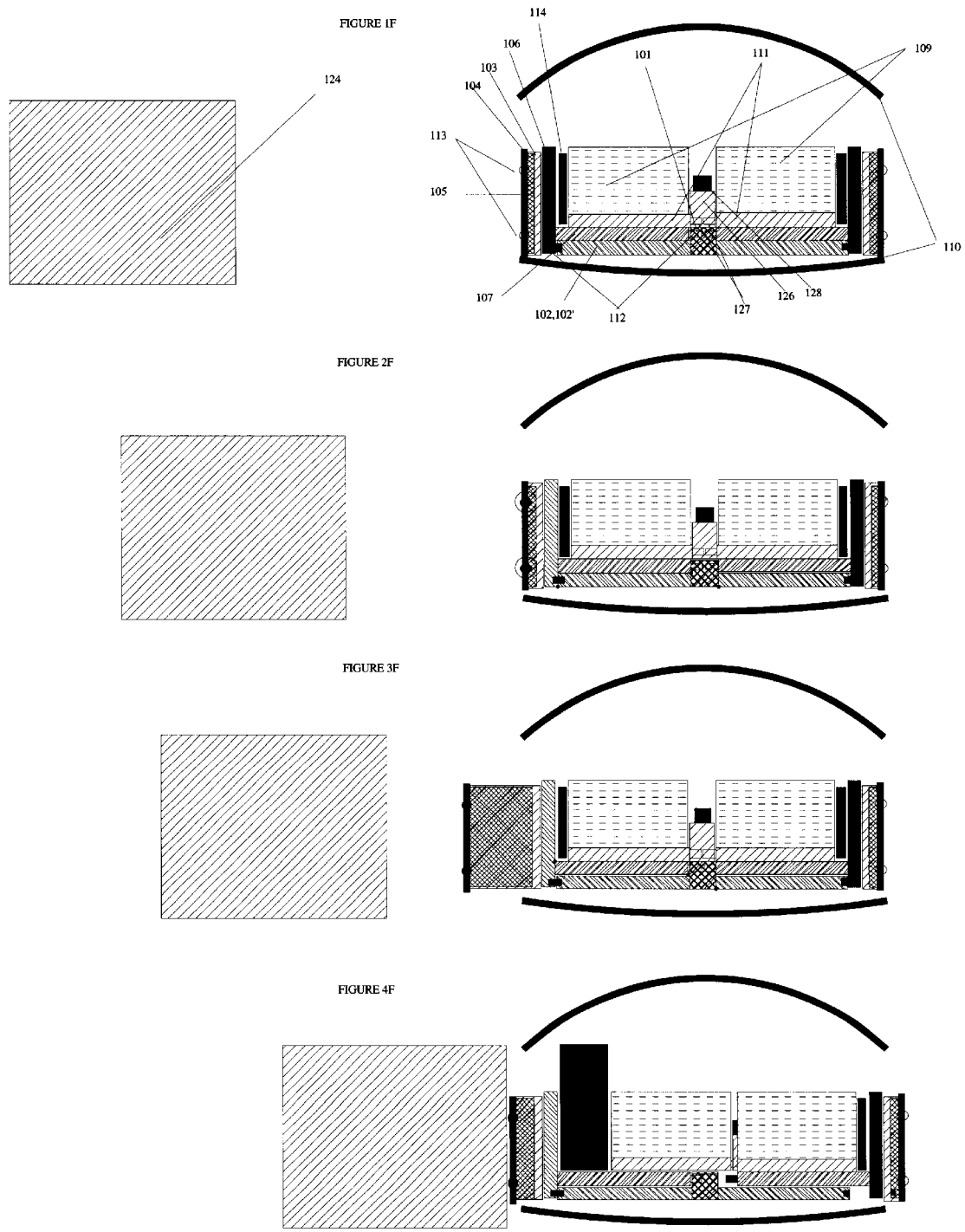

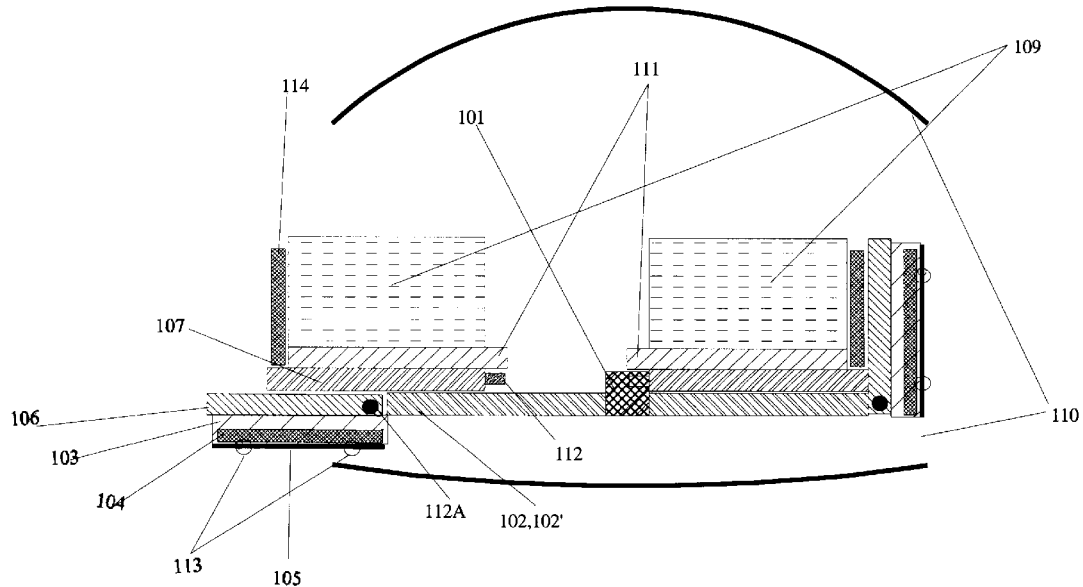
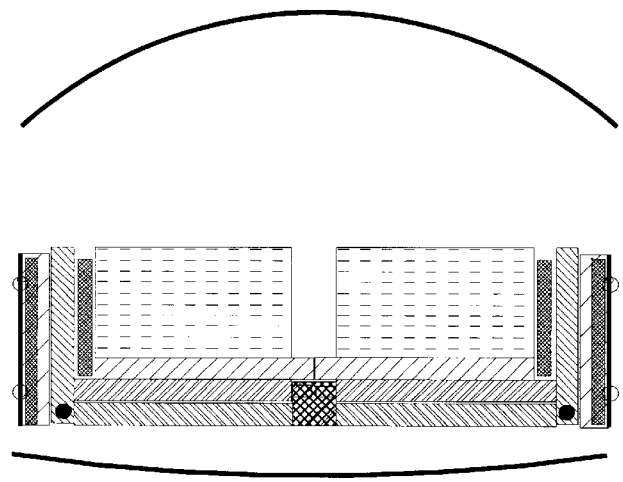

FIGURE 6A2
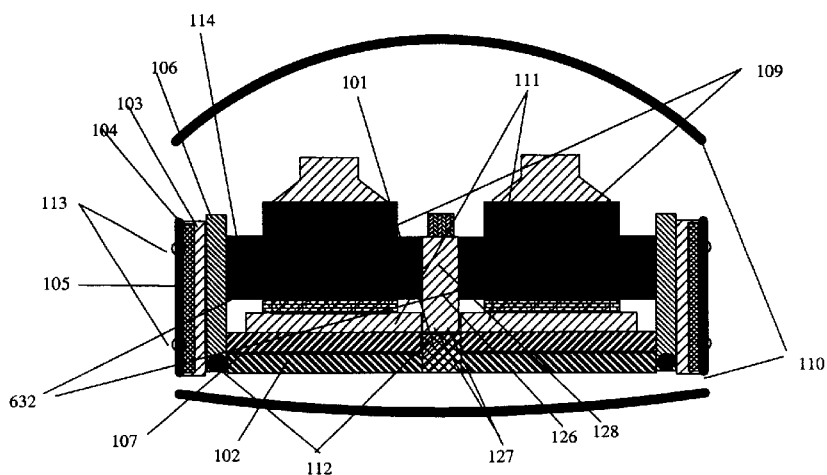
FIGURE 6A1
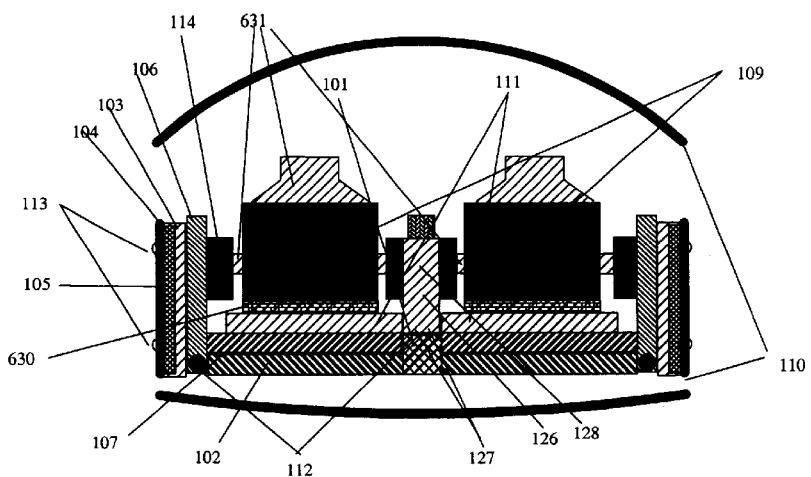
FIGURE 5A1
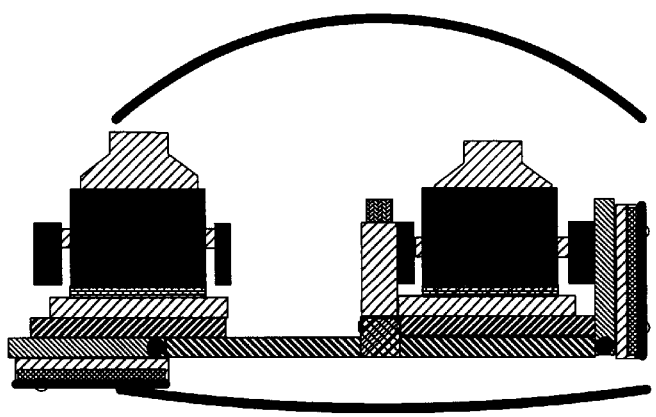

FIGURE 5A2
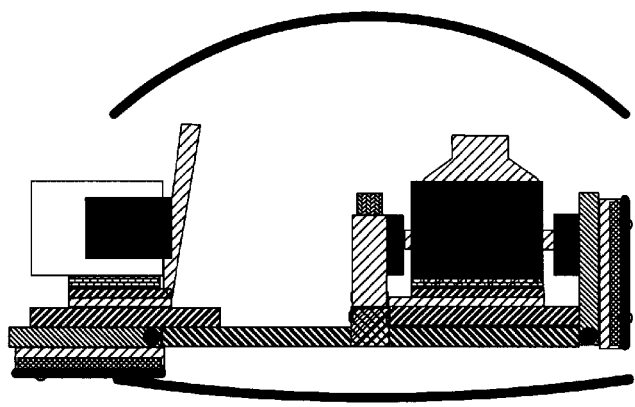
FIGURE 5A3
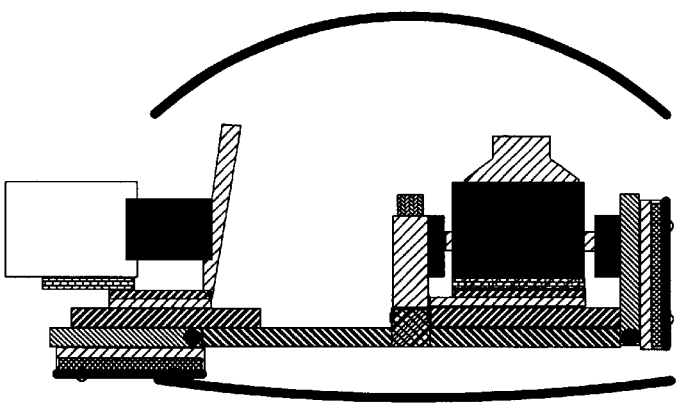
FIGURE 5-0
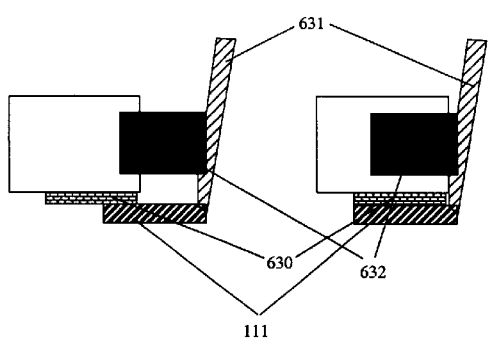

FIGURE 10 A1
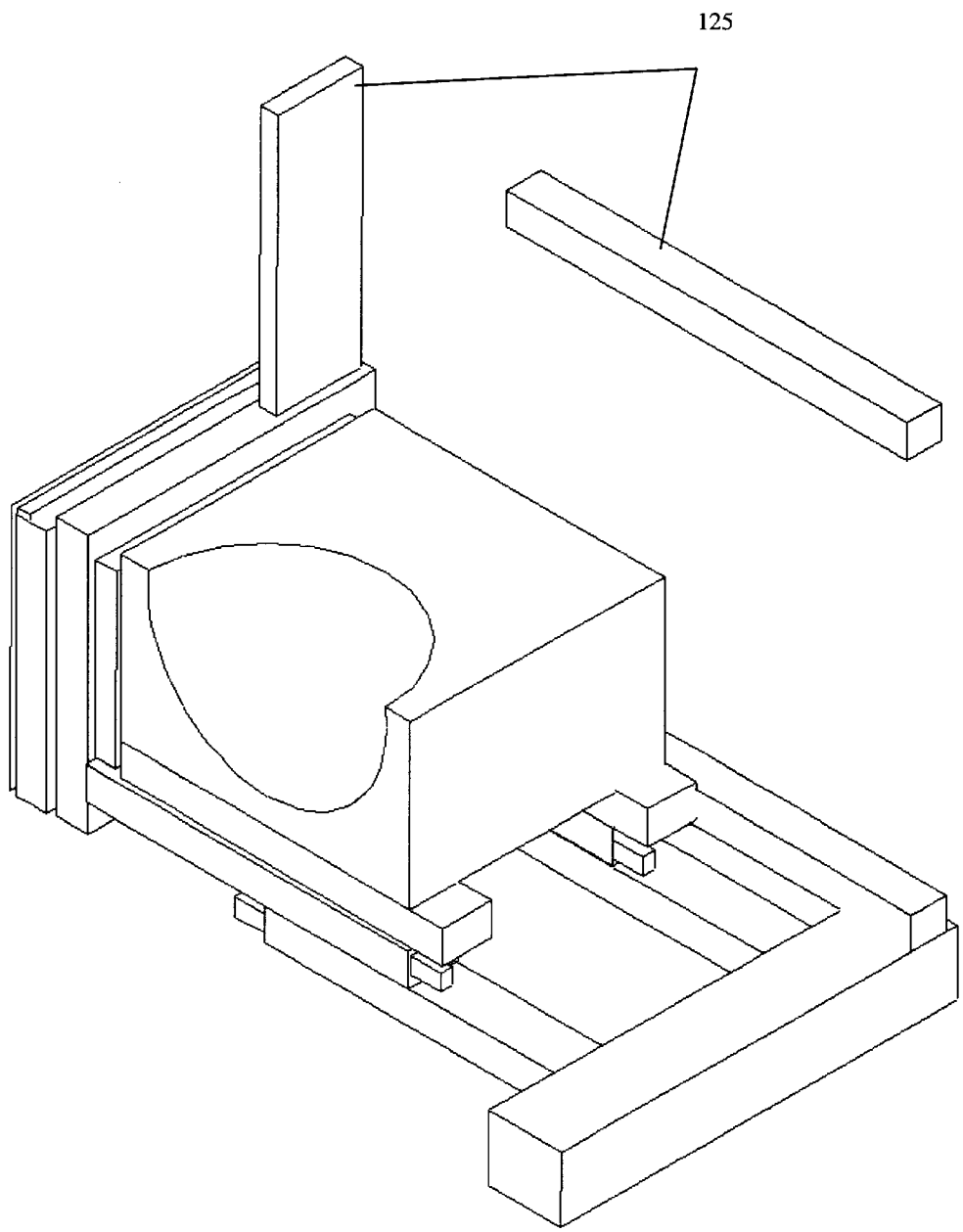

113

FIGURE 10 B1
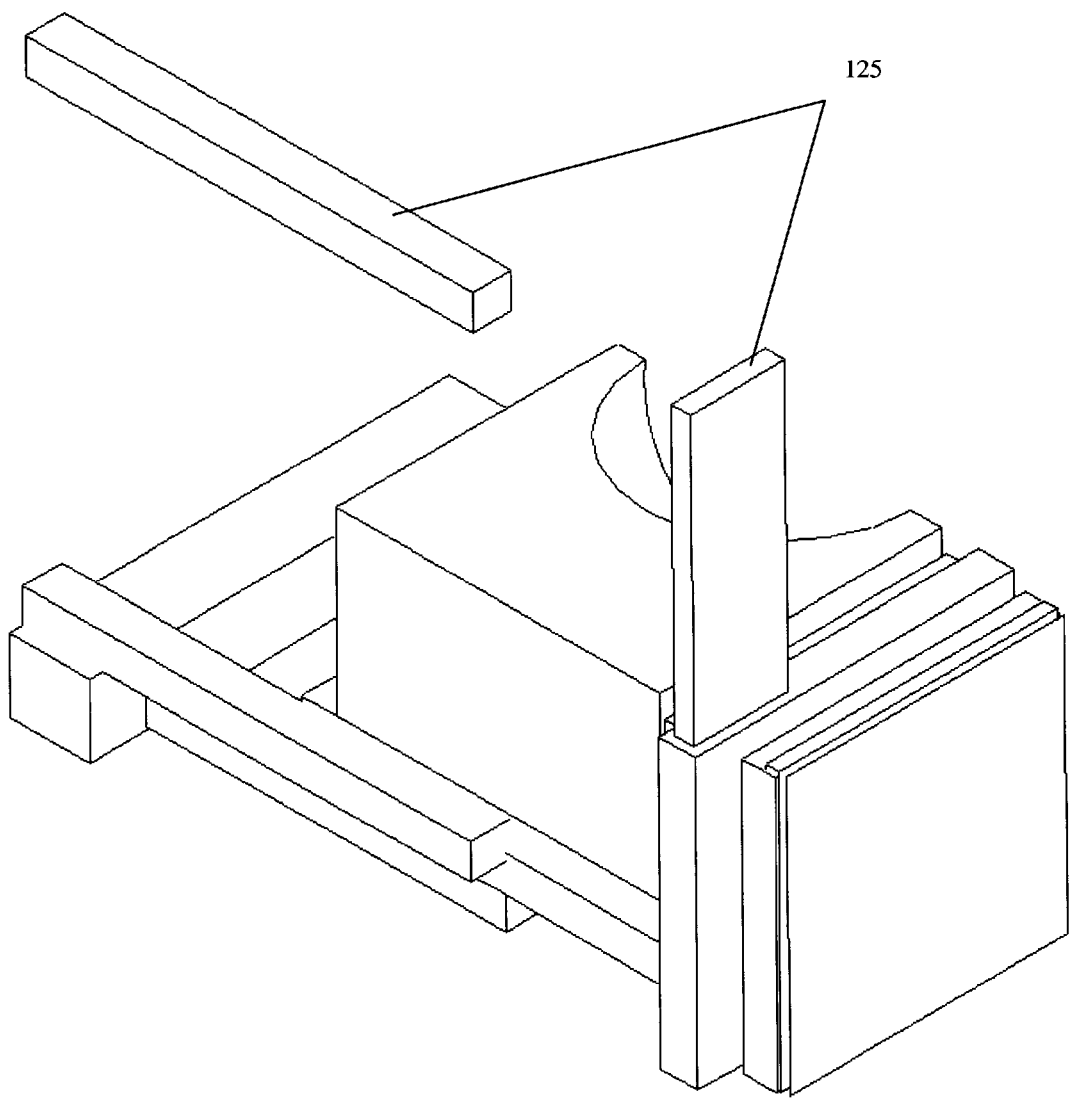

FIGURE 11 Safety Zones

FIGURE 12 A1
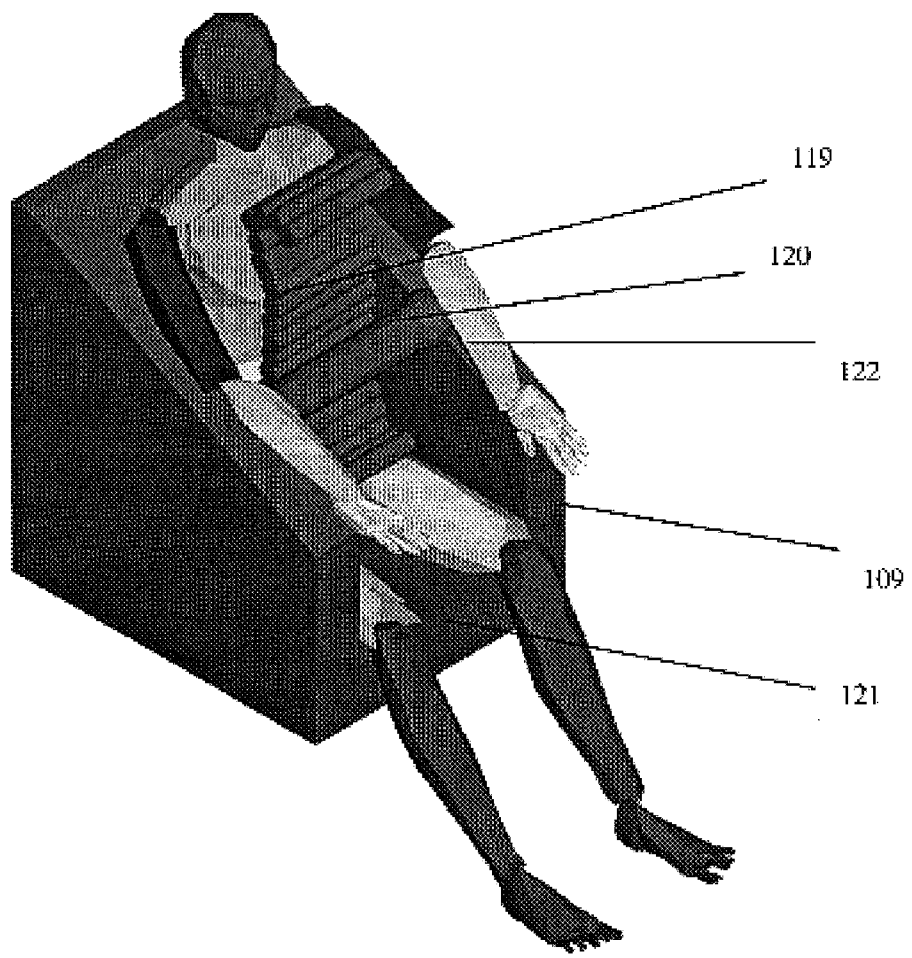

FIGURE 12 B1
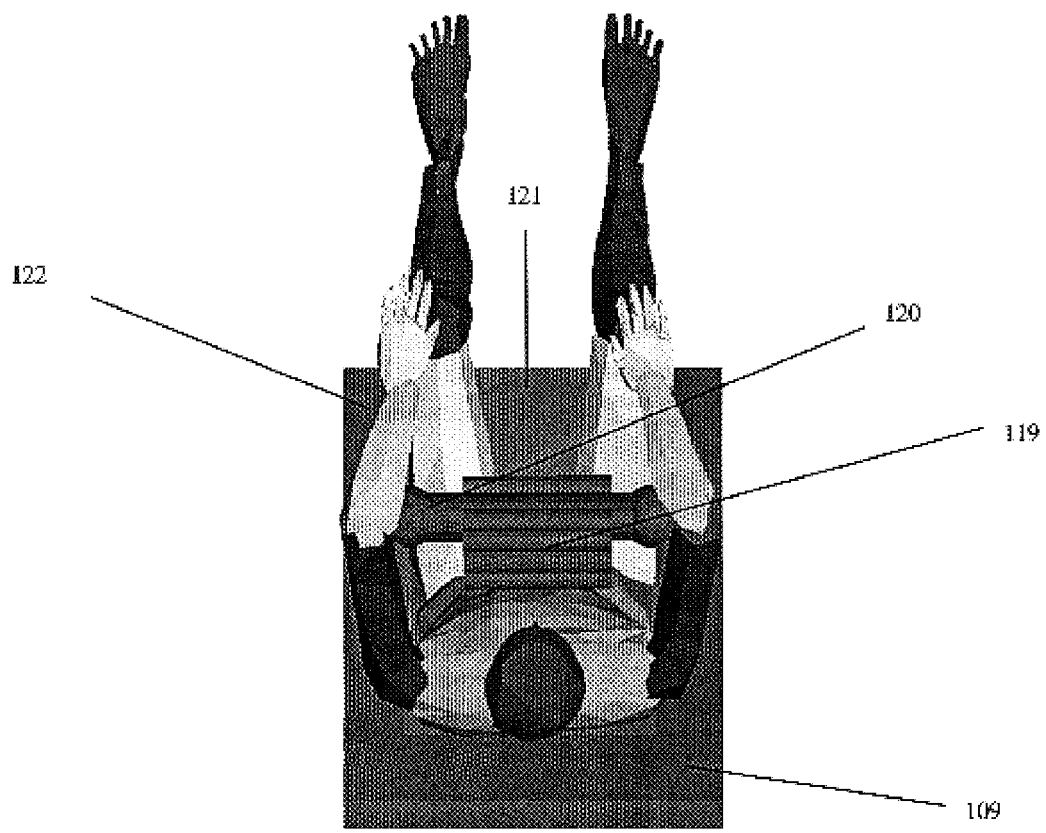

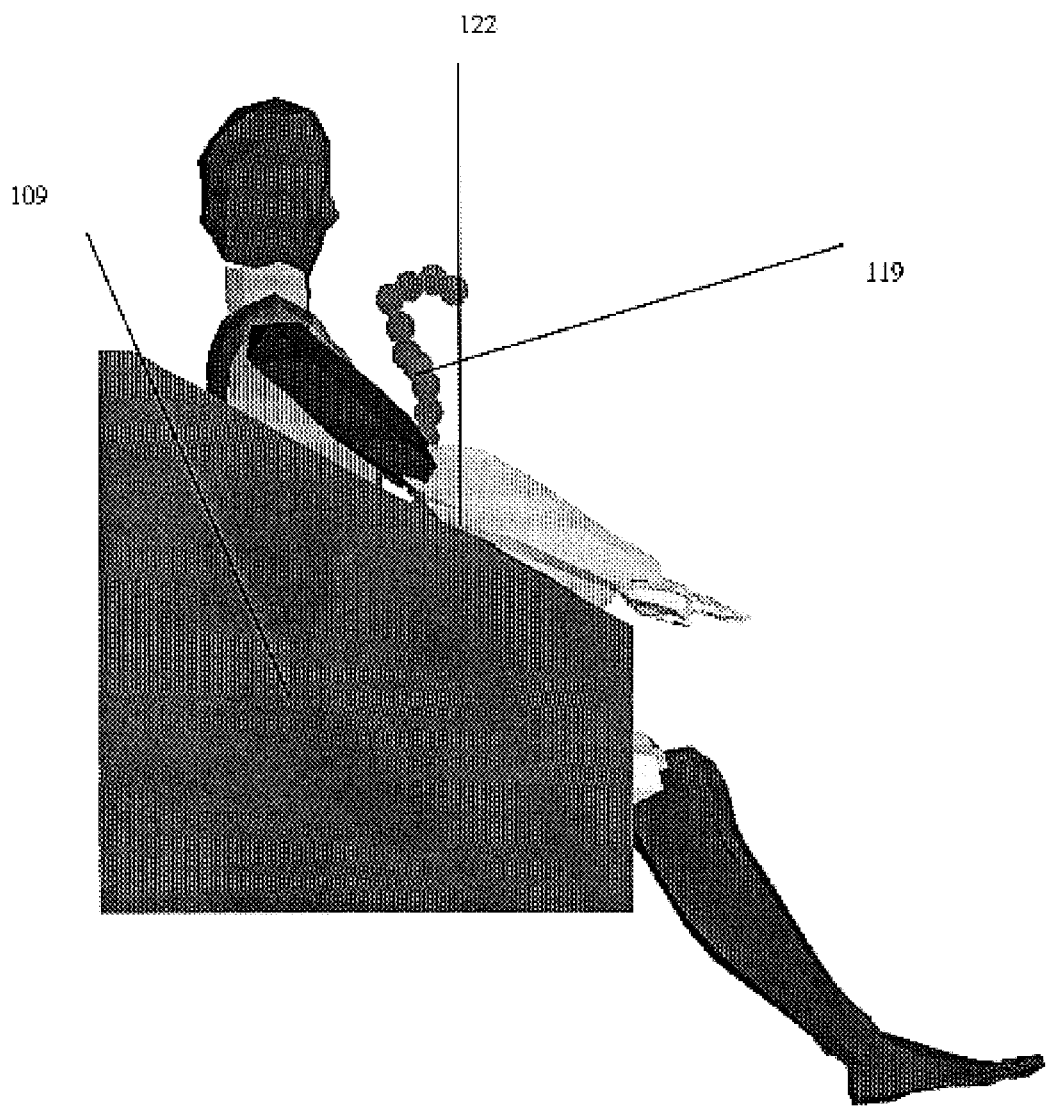
FIGURE 12 C1

FIGURE 12E1
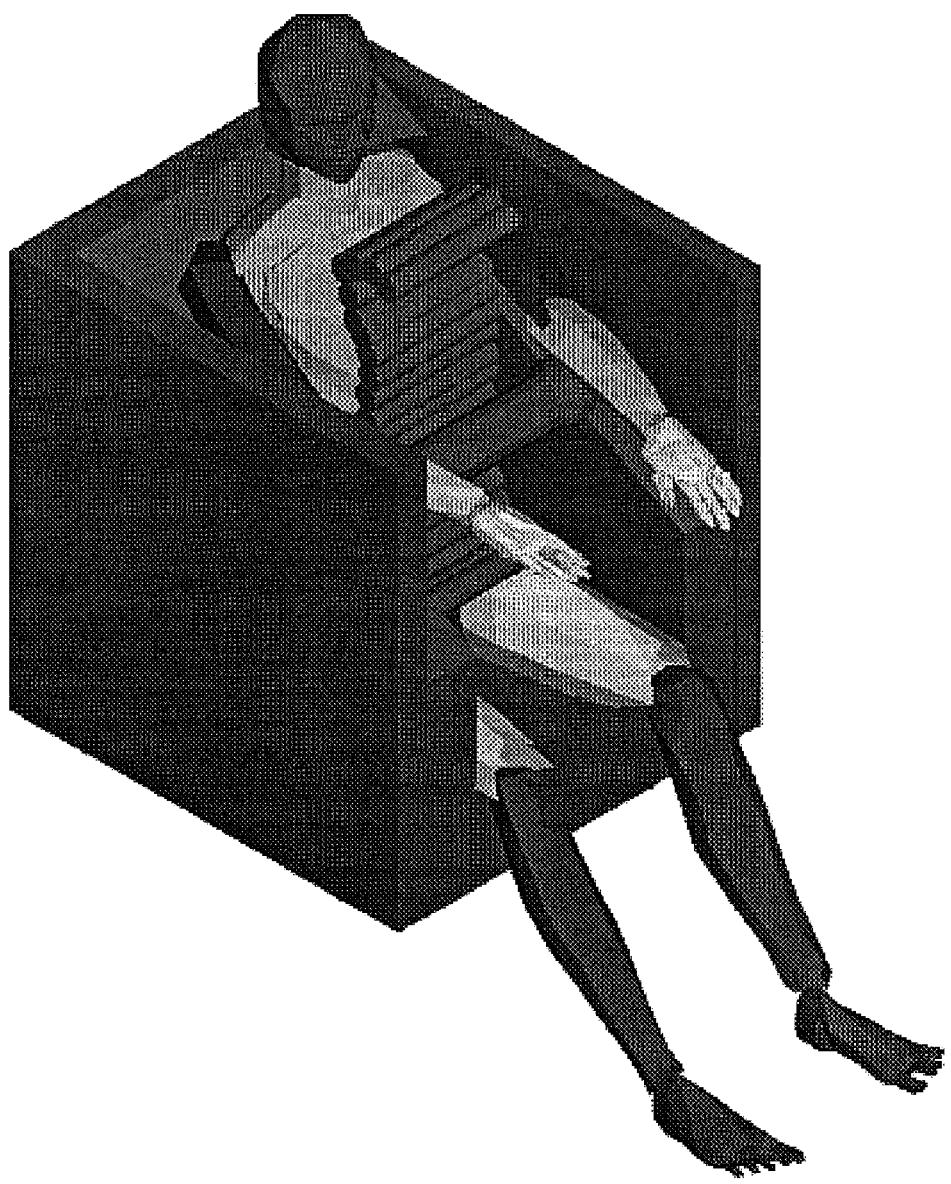

FIGURE 12 H2
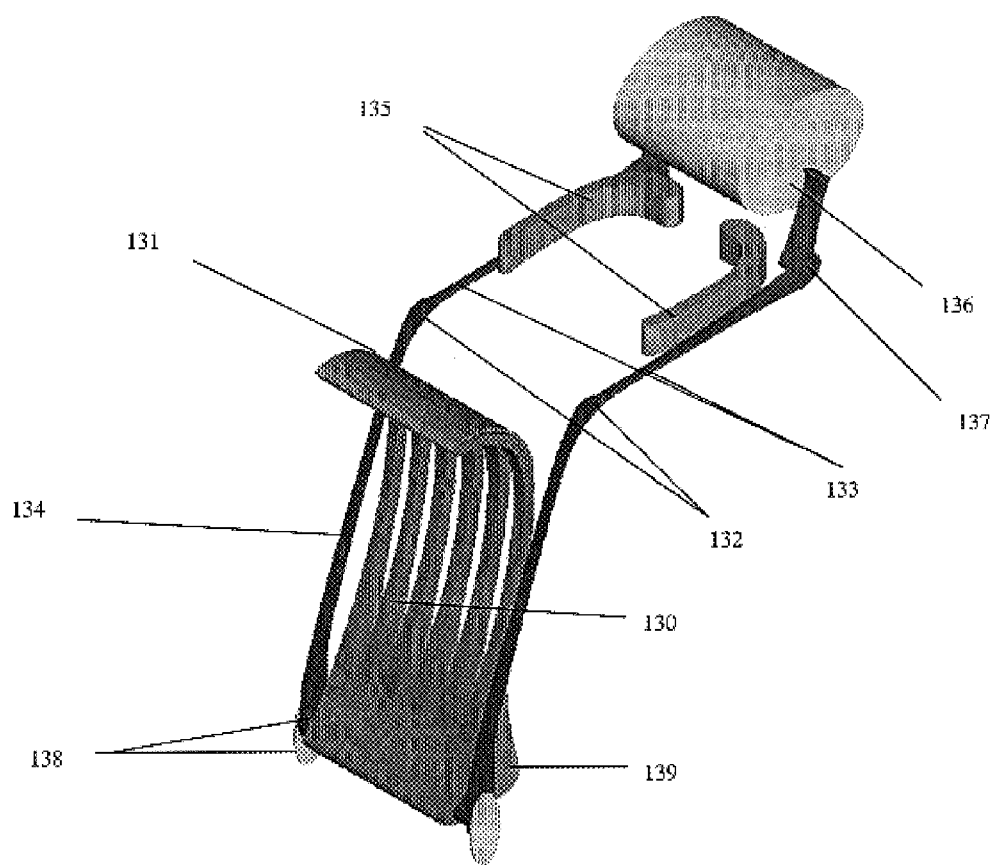

FIGURE 12.12
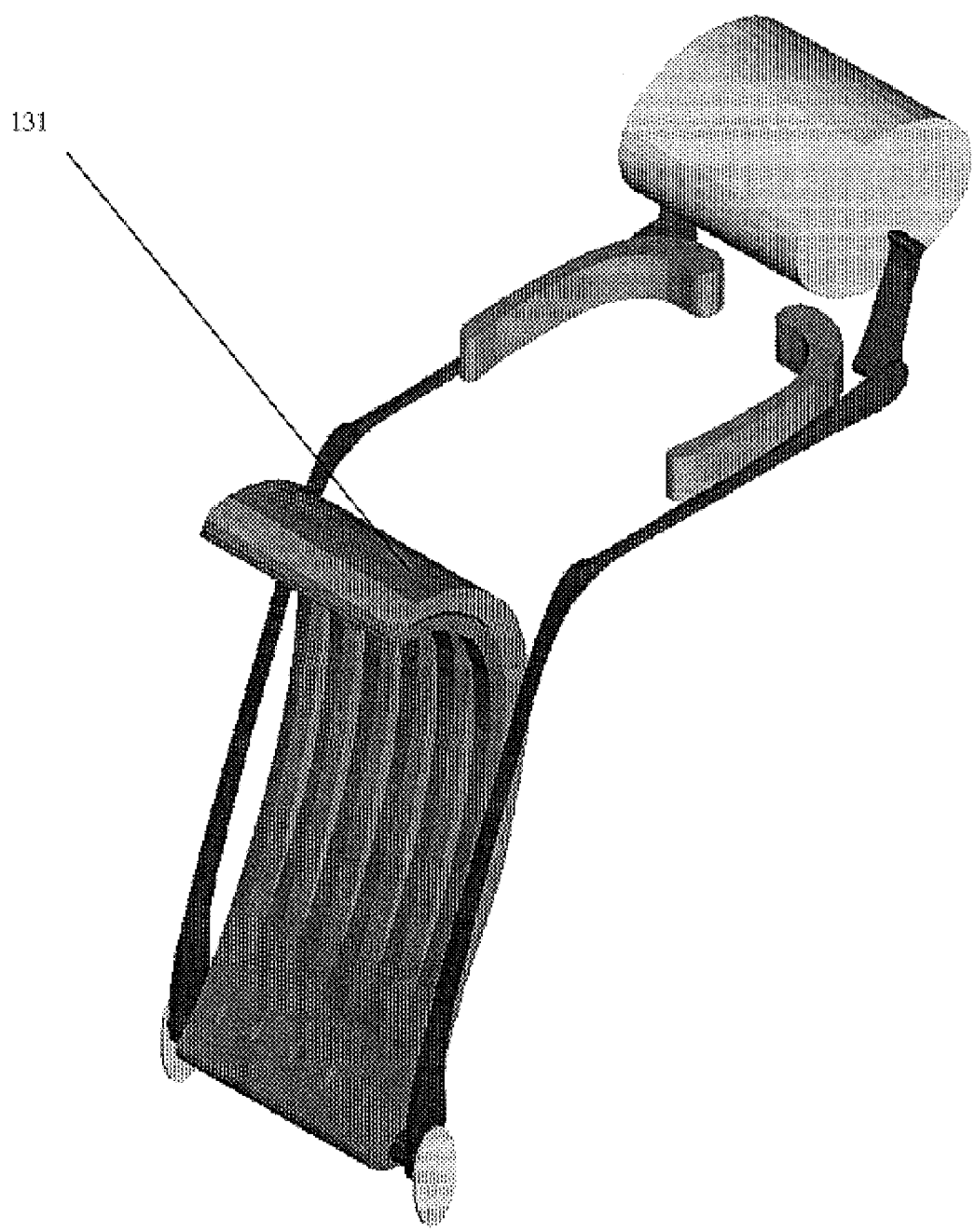

AN ISOMETRIC VIEW

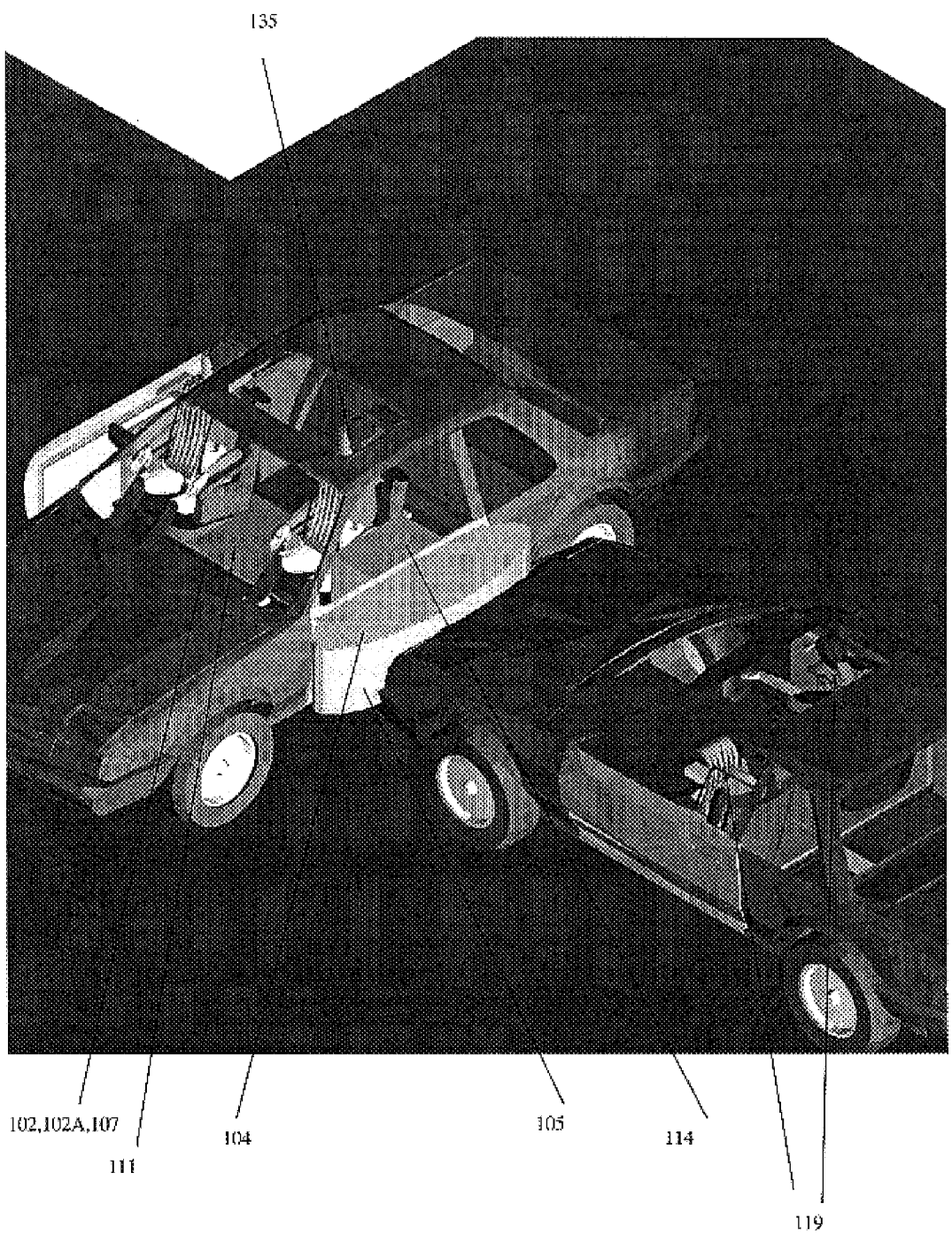

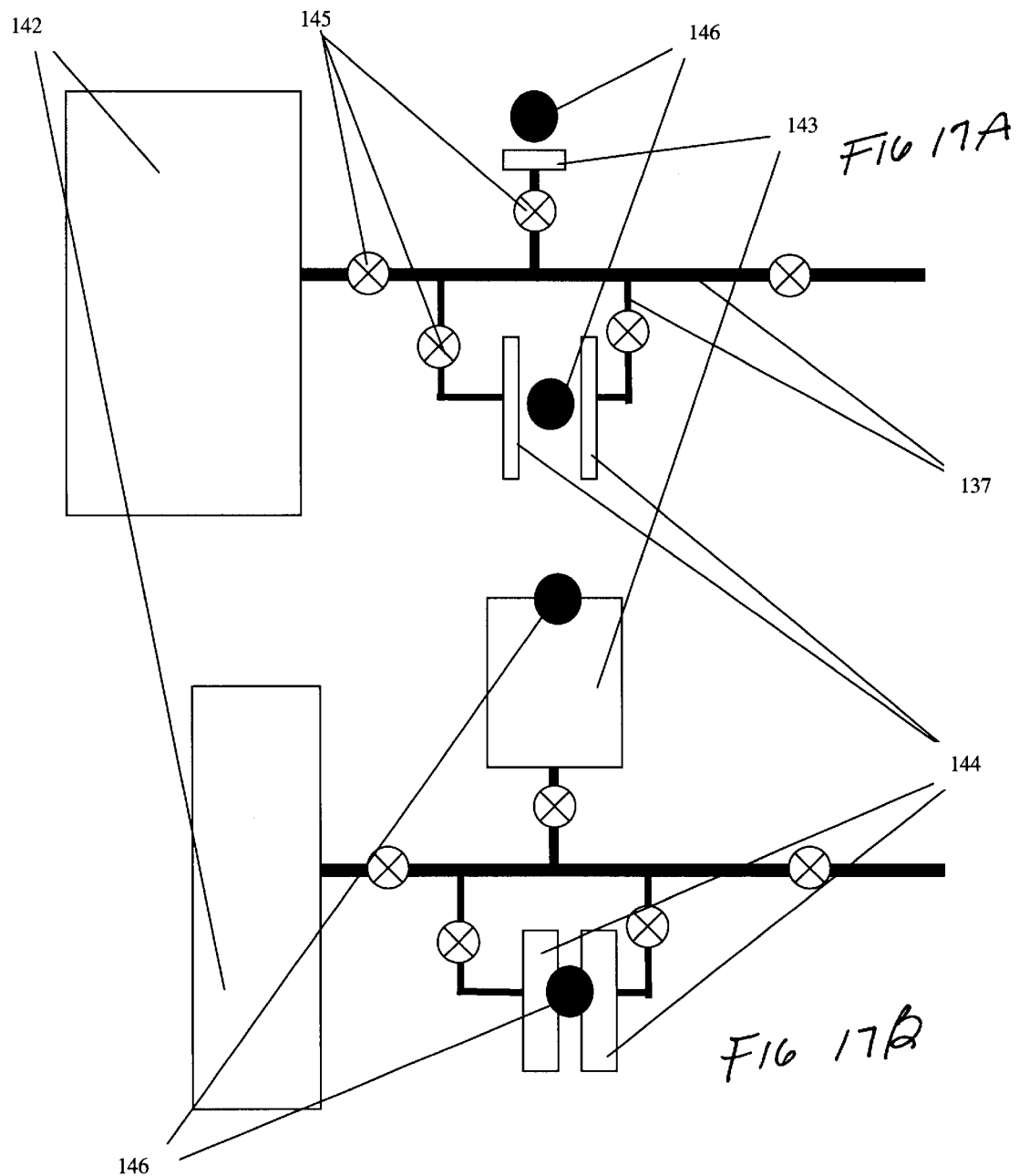

FIGURE 18 G
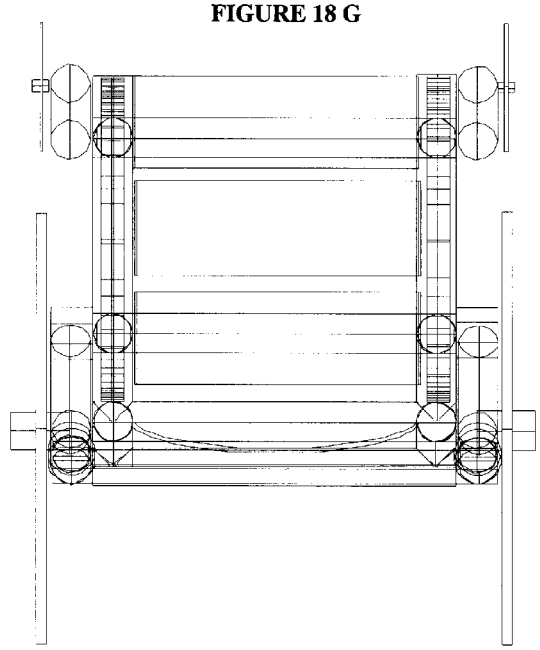
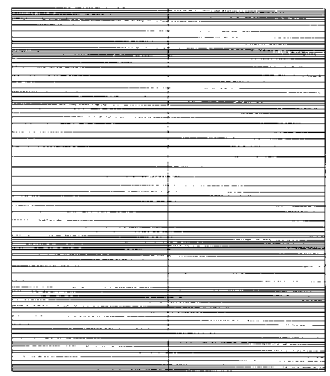
FIGURE 18 H
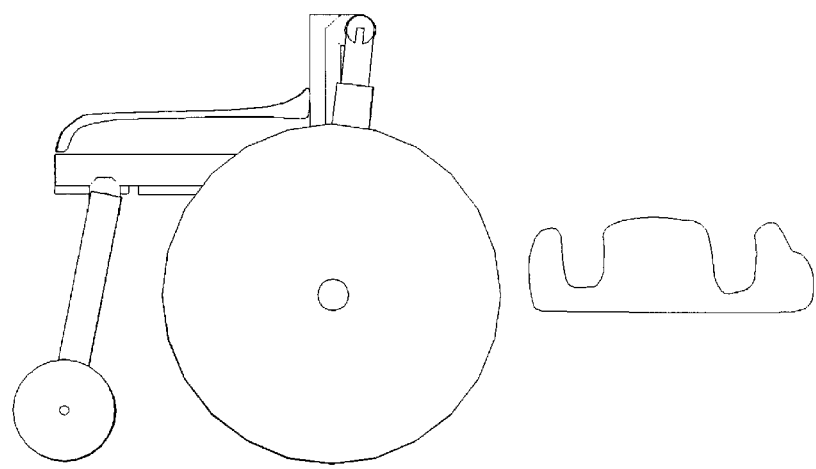

EASY EJECTOR SEAT WITH SKELETAL CRASH SAFETY BEAM

CROSS REFERENCE TO RELATED APPLICATIONS

This application is a continuation in part of the application entitled "Easy Ejector with skeletal crash safety beam" U.S. Ser. No.: 08/936,626 filed Sep. 24, 1997 now U.S. Pat. No. 6,059,354, U.S. Ser. No, 09/404,475 filed Sep. 24, 1999 now U.S. Pat. No. 6,547,315 U.S. Ser. No. 09/435,830 filed Nov. 8, 1999 now U.S. Pat. No. 6,609,749 and claims priority from U.S. Ser. No.: 08/936,626 filed Sep. 24, 1997, U.S. Ser. No. 09/404,475, U.S. Ser. No. 09/435,830, U.S. Ser. No. 60/195,298, U.S. Ser. No. 60/226,570, EPO Ser. No. 98948260.9-2306, EPO Ser. No. 00203896.6.

STATEMENT REGARDING FEDERALLY SPONSORED RESEARCH OR DEVELOPMENT

Not Applicable

REFERENCE TO A MICRO FICHE APPENDIX

Not Applicable

BACKGROUND OF INVENTION

1. Field of Invention

The present invention defines a means to incorporate in passenger motor vehicles, unique safety arrangements particularly for lateral or side impacts that provide energy absorption by the mass of the vehicle but decouple the passenger from the impact acceleration and deceleration that is provided by the mass of the vehicle, thereby protecting the passengers during such collisions. Moreover, the same arrangement synergistically provides utility in access, comfort and further safety in the operating position for passengers and the driver.

2. Description of the Related Art

In the past safety of passengers was not always the priority in passenger vehicle design. In the evolution of motor vehicle design the structure moved from a chassis that held together the mechanical components of the vehicle—a structure that was then attached to a passenger compartment or to passenger seats. The design of the structure was to hold together the working components of the vehicle—a critical aspect at the time. Thereafter in more recent times right up to the present, Exo-skeletal designs have been the dominant paradigm. Here rigid shells were constructed to hold both the mechanical components and the passengers in fixed positions. However such fixed shell structures have had limited success in protecting passengers and drivers when there are lateral collisions as passengers undergo the same impact related accelerations and decelerations as the remaining parts of the vehicle, as space limitations don't allow for "crumple zones" as in the case of impact protection for head on collisions. Passengers are particularly vulnerable to side impacts as they cannot take preemptive measures as with head-on collisions where there is speed control and directional control that is available. As vehicle speeds have increased substantially in the last several decades, these safety considerations for passengers have become critical and urgent. Vehicle designers—particularly automobile designers—have risen admirably to the task by incorporating myriads of devices and additions within the rigid shell paradigm to minimize risk in the event of collisions. Such devices include restraints such as seat belts and certain types of protective air bags. However, there are limits within the rigid shell paradigm for two reasons: First, the energy of impact cannot be easily diverted away from passengers into the remaining mass of the vehicle on impact. Second, the rigid shell needs to support high shear stresses on lateral impact and related compressive loads to the passenger compartment of the vehicle a factor that can only be addressed with greater mass of the vehicle that will impact its performance.

Another area of interest in passenger vehicles is to provide, in synergy with the above contributions, utility and comfort of passengers and drivers and further synergistic head-on collision protection.

There are four areas of Background art that are related to the present invention. These are: vehicles with sliding seats, safety arrangements addressing lateral impacts on passenger vehicles, air bags and other shock absorbing devices, and miscellaneous safety devices for frontal impacts. None of the inventions in these areas individually or collectively state or imply any aspects of the present invention. Moreover, none of this Background art even addresses the issue of energy transfer away from the passengers to the mass of the vehicle on impact and concurrently provide a mechanism for easy access to the vehicle with ejector seats. This is despite the urgent need in the car industry for such safety and utility. Moreover the novelty of the present invention is underscored as it provides solutions hitherto unidentified in a very large and competitive industry that is acutely aware of these needs and is constantly in search of new solutions to them.

Sloan U.S. Pat. No. 3,071,407 (1963) describes a single rear bench seat (lines 4–45)—full length (C1-L55), that can slide out of either side of the vehicle. It describes a door structure that may be attached to the seat and slide across and through the passenger compartment of the vehicle as the seat slides out. This invention does not state or imply any safety considerations in its structure, moreover such a bench seat on slides, in the event of a lateral collision on the doors will focus the impact energy on the passengers and these passengers will be the principal casualties as the mass of the vehicle slides away little harmed. This will be the case even in the embodiment described where the doors are fixed to the seat and slides through the passenger compartment with the seat. Moreover, it cannot be used in a front seat even for its limited functionality with doors fixed to the seat as driving instrumentation (steering wheel etc) will not allow a door to slide through the compartment. Finally it does not provide any comfort features for passengers over and above a bench seat. Mach U.S. Pat. No. 2,753,947 (1956) describes a sliding bench seat for the access of the engine of the vehicle it does not address the issue of safety of passengers or access utility. It is expected to perform similarly to Sloan in an impact on the doors or around the side profile of the passengers in the vehicle. Solomon U.S. Pat. No. 2,758,872 (1953) provides a sliding bench seat that goes through the doorway and for the same reasons as Sloan does not provide protection in side impacts or provide any comfort features over and above a bench seat. Cyphert U.S. Pat. No. 3,944,277 (1976) describes a seat mounted on a sliding platform that has a door at the end and protective walls around it. The arrangement being designed for the utility of the operator to reach points away from the body of the vehicle without dismounting the vehicle. This invention like Sloan does not state or imply any safety considerations in its use. Moreover there is no expressed or implied reference to the utility of mounting and dismounting the vehicle or for the comfort of the operator or the passengers except for the ability for the platform to move out to give the operator greater reach away from the vehicle body. Rees U.S. Pat. No. 5,213,300 (1993) describes internal design structure for slide arrangements that allow forward and backward movement of the passenger seats in vehicles. This like many other inventions prior to it relate to the structure of the slides to adjust the position of the seats for passenger comfort in the direction of motion of the vehicle.

All the above items of background art relate to sliding seats. None of the above background art related to sliding seats have stated or implied safety considerations. Moreover, none of them provide utility for mounting and dismounting a vehicle except for a bench seat that slides out on either side of the vehicle, or provide comfort features except for seating arrangement on a bench seat and in one of the above—the lateral movement for convenience of the operator.

Maier U.S. Pat. No. 2,148,950 (1939) provides a laterally braced passenger compartment that braces a rigid shell body of a vehicle. Barenyi U.S. Pat. No. 2,710,222 (1955) provides a stiffening for the bottom plate of a vehicle body. Catlin U.S. Pat. No. 5,660,428 (1997) provides a design for a rigid shell structure. Guertler U.S. Pat. No. 5,464,266 (1995) uses stiffening arrangements for the floor of the vehicle as a component of a rigid shell vehicle body. Masuda U.S. Pat. No. 5,671,968 (1968) describes a strengthened rigid shell for the passenger compartment Oliver U.S. Pat. No. 4,533,172 (1985) describes a three part rigid shell structure for motor vehicles with the central section for passengers Sinnhuber U.S. Pat. No. 5,000,509 (1991) describes an arrangement that transfers impact energy from lateral impacts to the rigid body of the vehicle but does so through rigid members that include elements in the seats. The seats have limited lateral movement and are not free to move independent of the vehicle body in the event of a collision, thereby placing the passengers on the direct path of the energy transfer Maeda U.S. Pat. No. 4,512,604 (1985) describes a lateral brace for the seat arrangement of the vehicle within a rigid vehicle body structure thereby distributing the impact energy to other parts of the rigid body structure. Sacco U.S. Pat. No. 5,435,618 (1995) describes a lateral stiffening element that braces the rigid vehicle body in the region of the seats. Bhalsod U.S. Pat. No. 5,716,094 (1998) describes a pusher block that engages the seat in the event of a lateral impact thereby providing a rigid member between the rigid body structure and the seats that can transfer impact energy to the seats.

All of the above items of background art related to bracing a rigid body structure and provide stiffening mechanisms within the rigid shell structure to distribute energy of lateral impact. None of these items of background art provide mechanisms to transfer energy away from passengers in lateral impacts, or provide other safety arrangements or provide utility for mounting and dismounting the vehicle or provide comfort features for passengers in the operating position.

Baber U.S. Pat. No. 5,725,265 (1998) presents airbags for front and rear vehicle bumpers that deploy on impact. Such devices cannot be implemented on the side of the vehicle as a deceleration zone is not available under operating conditions as may be made available in the front and back of the vehicle. Moreover, as this airbag deploys on impact it creates a deceleration zone by pushing its own vehicle away that may actually increase the impulse forces acting on the passengers. Mercier U.S. Pat. No. 3,822,076 (1974) describers similar external front and back airbags and uses probes that protrude from the vehicle at the front and back to deploy the airbags. Such apparatus cannot be installed on the sides of the vehicle, as clearances are small. Stirling U.S. Pat. No. 5,131,703 (1992) describes a fluid filled chamber around the vehicle that will provide a deceleration zone on impact—frontal rear or lateral. However this arrangement requires the deceleration zone to be present during normal operating conditions that will reduce the maneuverability of vehicles if deployed on the sides of the vehicle. Park U.S. Pat. No. 4,995,659 (1991) describes a gas filled chamber deployed around the vehicle. Such a chamber is normally inflated under normal conditions and reduces maneuverability of the vehicle. Campbell U.S. Pat. No. 4,815,777 (1989) describes a bumper that can be deployed selectively by filling with gas. This bumper is effective when extended only. It is not designed to be deployed when the vehicle is in motion, as it will reduce maneuverability. Hartmann U.S. Pat. No. 5,810,427 (1998) describes a mechanism that transfers fluid from one airbag to another on impact. The airbag that is deployed is normally in an extended position to absorb the impact energy and provide the deceleration zone. However, such an extended airbag will reduce the maneuverability of the vehicle. There is a literature ("Extended Bumper and Glass-Plastic glazing methods to reduce intrusion and ejection in severe motor vehicle crashes". C. C. Clark 1993. 26th Symposium on Automotive Technology and Automation. Aachen Germany., "Airbag bumpers inflated just before the crash" C. C. Clark., William A. Young. 1994. SAE Technical Paper 941051., "The crash anticipating extended airbag bumper system". C. C. Clark. 1994. Fourteenth International Technical Conference on the enhanced safety of vehicles. Munich Germany., "Airbags as a means to reduce crash loads and intrusion, and increase inter-vehicular compatibility." C. C. Clark. 1995. International Conference on Pelvic and Lower extremity injuries-Proceedings Washington D.C., Human Transportation Fatalities and Protection against Rear and Side Crash Loads by the Airstop Restraint" Carl Clark and Carl Blechschmidt. 1965. The Ninth Stapp Car Conference.) IDS, and background art on the construction of external airbags including deployment proactively with radar or other devices. This entire literature is limited to the use of proactive external airbags mounted on vehicles with rigid structures that include the passenger. There is no reference in this literature to the proactive detection of impact explicitly or implicitly creating a deceleration zone for passenger protection internally, relative to the vehicle as in the present invention. Moreover, this literature is focussed on external airbags for front impact protection with for example rigid penetration buffers to negotiate posts and trees, unlike the present invention which does not prescribe external airbags for front impacts. Furthermore, as this literature describes external airbags without perforation shields their implementability is questionable as, unlike internal airbags that are in relatively protected environments, impact with external airbags often occurs with objects with sharp points and edges that are likely to perforate the external airbags. The Present invention requires perforation shields for external airbags.

All the above items of background art relate to air bag devices for safety in vehicles. However, none of these references take the integrated approach of the present invention, as more fully explained below, which comprises proactive deployment of both internal and external air bags, together with sliding seat members and other devices. Moreover while the present invention can function even without the deployment of external airbags, either proactive or reactive, taken together these items provide protection for passengers which is more than the sum of the parts. Furthermore, none of the protection airbags disclosed, related to external air bags having protective perforation shields that further enhance their efficacy. Moreover none of these devices provide energy transferring mechanisms away from the passenger in a lateral impact or provide other safety features. Moreover they do not provide any utility features for passengers in mounting and dismounting the vehicle or provide comfort features to the passengers.

Perras U.S. Pat. No. 2,873,122 (1959) which describes an invention where upon a head-on collision the seat projects a curved protector around the passenger designed to protect the passenger. This curved protector retracts into the seat under normal operating conditions. It is not clear how effective such a mechanism will be as the acceleration of the passenger forward relative to the vehicle may precede that of curved protector's release from the seat. Satzinger U.S. Pat. No. 3,961,805 (1976) describes seat belts for frontal collisions that provide safety for vehicles. Such seat belts are in common use. However, they suffer from the drawback that they restrain the body of the passenger in the narrow regions covered by such belts which may cause injury as other parts of the body are not restrained. Moreover such belts are not popular, while in common use as the belts are in constant contact with the body—a factor that is not often relished. Pulling U.S. Pat. No. 3,981,520 (1976) describes an arrangement where that provides passenger movement and protection in frontal impacts. On impact the passenger moves in the vertical plane of motion to a more protected position while side firing airbags provide frontal protection. This system of deployment of airbags for frontal collision protection is similar to other frontal airbag systems. They are necessary as restraining systems during the collision but need to be retracted in conventional passenger compartments to give passengers access to their seats while mounting and dismounting the vehicle. Erickson U.S. Pat. No. 2,777,531 (1957) describes an invention that rotates the seat of the passenger thereby restraining and protecting the passenger on impact taking advantage of the inertia prior to impact to endow the passenger with rotational energy that changes the position of the seat. Such rotation can injure the passenger with impacts at present day passenger vehicle speeds.

All the above items of background art relate to frontal impact protection. None of these items provide a device that is normally deployed during operation, and provides a broad area of restraint across the body for the entire upper body, head and neck, without a need for changing the orientation of the passenger. Moreover none of these items provide any protection for side impacts or provide utility for mounting and dismounting the vehicle or for the comfort of the passengers in the operating position.

SUMMARY

In view of these prior references what would be useful is an arrangement that diverts the impact energy in lateral or side impacts away from the passengers to the remaining mass of the vehicle thereby protecting the passengers, and in the same arrangement provides utilitarian access to the vehicle, such utilitarian access making it possible to both install multi-element contoured surround seats for passengers and the driver, and also a safety device for head-on collision protection that obviates the need for conventional seat belts and front impact airbags. Moreover, it would be useful to have a synergistic structural arrangement for the vehicle that targets strength of the vehicle to protect passengers while minimizing other massive elements in the vehicle.

The present invention includes these objects and advantages.

OBJECTS & ADVANTAGES

Some of the objects and advantages of the present invention are, to provide an arrangement that diverts the impact energy in lateral or side impacts away from the passengers to the remaining mass of the vehicle thereby protecting the passengers but decelerating the impacting object with the remaining mass of the vehicle. Moreover the arrangement synergistically provides a means for utilitarian easy access to the vehicle for passengers and drivers alike and allows the installation of multi-element surround contoured seats for the comfort and protection of passengers. This arrangement differs sharply from the Background art in that it does not simply offer to the impacting body a reinforced rigid shell where the passenger is treated as part of this integral unit, but rather provides selective and differential treatment of the mass of the passengers and driver of the vehicle vis-à-vis the remaining mass of the vehicle. Furthermore the present invention differs sharply from the Background art in that the resulting structure synergistically permits the installation of contoured multi-element surround seats and a unique safety harness that protects passengers in head-on collisions, both of which may not be implementable without the slide or other moving arrangements for seats on either side of the vehicle in the present invention.

Another object and Advantage of the present invention is the gravity slide drive and a related shock absorbing arrangement relative to the fixed body members of the vehicle ad the terrain traversed by the vehicle, for my arrangement for which there is no counterpart in the Background art. This allows further Utility and weight and energy saving in implementing the above elements of the present invention.

Another Object and Advantage of the present invention includes External side Airbags that differ sharply from the Background art in that for the first time they proactively create a "Just in Time" deceleration zone both for the passenger relative to the vehicle and also for the vehicle relative to the impacting body, for the lateral or side impact while not remaining in an extended position under normal operating conditions of the vehicle.

Another Object and advantage of this invention is a perforation resistant shield for external airbag protection that would reduce the probability of deployment failure. The background art does not provide for this function in externally deploying airbags.

Another object and advantage of the present invention is a indo-skeletal structure of the vehicle body that permits the energy transfer from the lateral or side impact through compressive members to the body of the vehicle. Unlike the Background art this indo-skeletal structure is designed to transfer energy to the body of the vehicle without transferring it to the passengers and driver of the vehicle. The passengers are targeted for protection with "Safety zones".

BRIEF DESCRIPTION OF DRAWINGS

FIG. 3 is an illustration of the same vehicle as in FIGS. 1 and 2, except that the distance and velocity sensors have deployed the external Airbags. They may also provide delayed deployment of the internal Airbags.

FIG. 4 is an illustration of the same vehicle as in FIGS. 1,2 and 3 except that the impacting object has made impact with deceleration and energy absorption provided by the External airbags and the shock absorbers and resisted by the mass of the vehicle through compression members as noted below. The Passengers and seats are free to move away from the impact on the secondary slides as the internal Airbag deploys, pushing out the Primary slide on the side away from the impact.

FIGS. 1D, 2D, 3D and 4D illustrate an alternative embodiment with the shock absorbers mounted internal to the protector shield.

FIGS. 1C, 2C, 3C and 4C illustrate an alternative embodiment that has an auxiliary beam mounted behind the seat with a high section of the central member of the skeletal structure behind the seat to abut the auxiliary beam.

FIGS. 1B, 2B, 3B and 4B illustrate an alternative embodiment with a center console.

FIGS. 1F, 2F, 3F and 4F illustrate an alternative embodiment with a center console that is crushable (an element of "crushable elements") and as a result decreases the need for the ejection of the passenger on the further side of the vehicle at impact.

FIG. 5 represents the open position and FIG. 6 represents the closed position.

FIGS. 5A and 6A illustrate an embodiment of the current invention with the protector shield/shock absorbers/external airbag hinging down to support the primary slide. A useful feature for larger vehicles with more than a single seat on each side.

FIGS. 6-2, 6-1, 5-1, 6A2, 6A1, 5A1, 5A2, 5A3, 5-0 illustrate an embodiment with a passenger support mechanism comprising a wheelchair. FIGS. 6-2, 6-1, 5-1, 5-0 show a sequence of an embodiment based on FIGS. 5 and 6 while the FIGS. 6A2, 6A1, 5A1, 5A2, 5A3 show an embodiment based on the FIGS. 5A, 6A. 6-2 and 6A2 show the wheelchairs in the operational position with the support of supplementary inflatable aircushions. FIGS. 6-1 and 6A1 show the supplementary inflatable aircushions deflated for egress and ingress of the wheelchair. FIGS. 5-1 and 5A1 show the lateral movement of the wheelchair for egress and ingress. In addition FIG. 5A2 shows a rotation of the passenger support mechanism. Finally FIGS. 5A3 aqnd 5-0 show the movement of the detachable elements of the passenger support mechanism supported by the movable elements of the passenger support mechanism, towards the extended or loading position in the two chosen embodiments.

FIG. 7 is an illustration of the Gravity Slide drive at the end of the unload cycle for passengers. FIG. 8 is an illustration of the Gravity slide drive at the beginning of the Load cycle for passengers. FIG. 9 is an illustration of the left side loaded and ready for operation of the vehicle and the right side at the start of the loading operation, emphasizing the independence of the two sides of the Gravity slide drive mechanism.

FIG. 10 C is an illustration of a Plan view of the present invention for one side of the vehicle.

FIGS. 10 A1, 10B1 are isometric views of an alternative embodiment with a vertical extension/"safety cage" to protect passengers further. FIG. 10 C1 is a plan view of the same arrangement.

FIGS. 12B and 12C is an illustration of the Plan and Side Elevation of the seat arrangement. FIG. 12 A1 illustrates an alternative embodiment of the seat arrangement. FIGS. 12B1 and 12C1 illustrate the plan and elevation of this embodiment. FIG. 12 D1 illustrates an embodiment of the child seat. FIG. 12 E1 illustrates an embodiment with a different external profile for the seat providing greater protection to the passenger. FIGS. 12 F2 and 12 G2 illustrate isometric views of an embodiment of the safety harness and 12 H2, 12 I2, 12 J2 illustrate an isometric view of another embodiment of the safety harness, in the normal state, with front impact anatomical passive micro aircushions deployed, and the head and neck anatomical micro air cushions deployed respectively.

FIG. 15A illustrates a side impact with internal and external airbags deployed and the passengers ejected away from the impact.

FIG. 15B illustrates the deployment of the anatomical passive micro aircushions in a front impact and the passenger impact protection with the harness and shield. The left side passenger illustrates the normal position for reference.

FIGS. 17 A,B show a schematic diagram of the passive air cushion system disclosed in this invention.

LIST OF REFERENCE NUMBERS

Figure 1G:
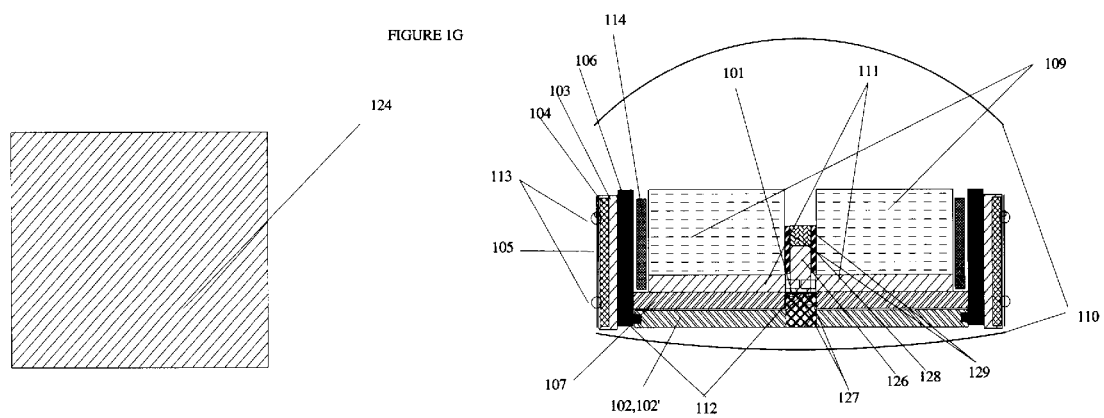
FIGS. 1G, 2G, 3G and 4G illustrate an alternative embodiment with center airbags (also an element of "crushable elements") that are a part of a passive airbag system to protect passengers during lateral impact by absorbing some of the impact energy but more importantly providing a means to inflate head and neck protection airbags and other anatomical micro cushions mounted in the vicinity of the human body. This particular embodiment has a crushable center console as well.
Figure 2G:
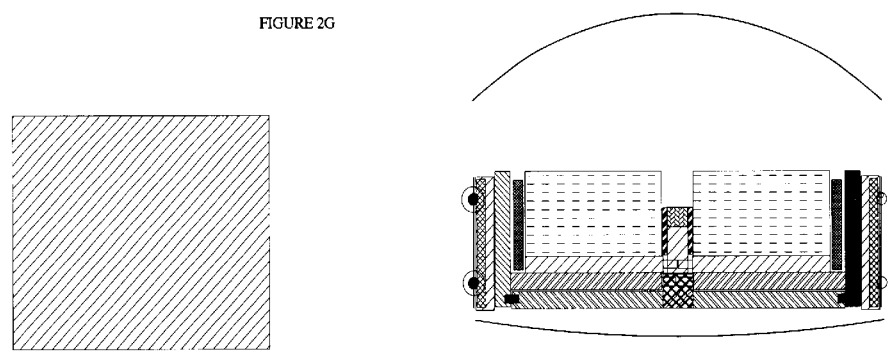

101—Central Member of Indo-skeletal structure
102—Safety Beam LowerElement/Lower Primary Slide
103—Side impact shock absorbers
104—External Air Bags
105—Perforation Shields
106—Protector Shields
107—Safety Beam Upper Element/Upper Primary Slide
108—Auxiliary Beam.(fixed or sliding)
109—Multi-element contoured passenger seat
110—Vehicle Shell/Body
111—Secondary Slides/Impact decouplers
112—Locking devices
112A—Pivot for Protector shield
113—Proactive Velocity/Distance Detectors
114—Internal side impact airbag
115—Spring device for manual slide
116—Inside door open button
117—outside door open button
118—Beam pivot for Gravity slide drive ejector
119—Safety Harness
120—Support for Safety Harness
121—Bottom of seating surface of the contoured seat
122—Contoured arm rests
123—Child seat attachment
124—Impacting body
125—Vertical extensions/ Safety Cage (fixed or sliding)
126—Center console
127—Secondary slide/Center console locks
128—Instrumentation
129—Center airbags-energy absorption/passive head and neck anatomical airbag system
130—Safety Harness Shield
131—Safety Harness—Anatomical passive micro air cushion and visco-elastic buffer
132—Safety Harness elbow
133—Safety Harness extending upper arm
134—Safety Harness Pivoting lower arm
135—Safety Harness Head and neck anatomical micro aircushions (active or passive)
136—Safety Harness Adjustable Head restraint
137—Safety Harness Hinged support
138—Safety Harness Locking Support
139—Safety Harness passive micro aircushion air reservoir
140—Adjustable Hinge support on seat
141—Foot rest
142—Sacrificial chamber
143—Micro air-cushion—displacement function
144—Micro air cushion—support function
145—Valves—air flow/fluid flow
146—protected entity
147—Fluid paths
148—Wheelchair Conversion—Seat lower cushion and support structure
149—Wheelchair Conversion—Chair Clamps
150—Wheelchair Conversion—Chair Cross support
151—Wheelchair Conversion—Primary Pivot with locks for Rear Wheel retraction
152—Wheelchair Conversion—Principal Rear Wheel Support
153—Wheelchair Conversion—Rear Wheel Support strut
154—Wheelchair Conversion—Secondary Pivot for Rear Wheel retraction
155—Wheelchair Conversion—Spring loaded locking support Sleeve
156—Wheelchair Conversion—Seat back
157—Wheelchair Conversion—Primary Pivot with locks for front wheel
158—Wheelchair Conversion—Wheelchair back pivot release
159—shadow vertebra—air cell retainer
160—shadow vertebra—lateral tilt return spring
161—shadow vertebra—upper fixed slot for lateral tilt return spring
162—shadow vertebra—support flange
163—shadow vertebra—upper slot for support flange
164—shadow vertebra—left body
165—shadow vertebra—right body
166—shadow vertebra—left upper air cell socket
167—shadow vertebra—right upper air cell socket
168—shadow vertebra—lateral tilt air cell visco elastic damper tube
169—shadow vertebra—lateral support arm connector
170—shadow vertebra—back support adjustable air cushions
171—shadow vertebra—left lower air cell socket
172—shadow vertebra—right lower air cell socket
173 shadow vertebra—lower slot of r support flange
174—lower sliding slot for lateral tilt return spring
175—shadow rib—body
176—shadow rib—adjustable air cushions
177—shadow rib—tilt control connectors
178—shoulder bolster
179—Shoulder bolster adjustable air cushions
180—back support adjustable air cushions
181—Neck lateral support with deploying passive micro air bag
182—Head lateral support arms with deploying passive micro air bag
183—Head rear support adjustable air cushions
184—Neck rear support adjustable air cushions
185—Lumbar support adjustable air cushions
186—Adjustable Hip bolster
187—Adjustable Pelvic support
188—Axial contraction system—Central body tube
189—Axial contraction system—Body extender tube
190—Axial contraction system—front end connector tube
191—Axial contraction system—back end connector tube
192—Axial contraction system—front end
193—Axial contraction system—back end
194—Axial contraction system—front module
195—Axial contraction system—rear module
196—Axial contraction system—front module crank

197—Axial contraction system—rear module crank
198—passenger support platform
630—Mobility devices for wheelchair.
631—Fixed elements of passenger support mechanism
632—supplementary air cushions (inflatable)

DETAILED DESCRIPTION OF INVENTION

The present invention provides a passenger vehicle a structure that synergistically incorporates two functions. First, during lateral or side impacts a means to decouple from impact, and protect passengers while projecting the remaining mass of the vehicle to decelerate the impacting body, and second, utility to passengers and drivers, in mounting and dismounting the vehicle with the comfort of contoured surround seats. The arrangement may in some embodiments use an indo-skeletal beam that allows such embodiments to rely on compressive force transmission to transfer impact energy to the mass of the vehicle rather than shear loads that are required in the shell paradigm of construction in most current passenger vehicles.

The present invention may use Primary and Secondary slides on each side of the vehicle, to meet these objectives. The Primary slide has among other attached devices, a protector shield that bears the impact force in lateral or side impacts. Such protector shields may be hinged out for access if the sliding arrangement is not used. The Primary Slide may engage a central indo-skeletal beam in some embodiments. The Secondary slide is attached among other devices to possibly contoured surround seats (the passenger support mechanisms). This slide may be activated under impact to guide passengers in their seats away from the impact zone.

The present invention may utilize a Safety Beam in the vicinity of the seats. However, there is an important advance over the Background art in that the Beam does not lock the passengers on the path of the energy transfer, but rather, conducts the energy of impact away from the passenger to the indo-skeletal frame or to the body members of the shell (collectively elements of the fixed body members) and thereby to the mass of the vehicle(the massive components of the vehicle such as but not without limitation the motor and vehicle frame) allowing independent motion of the passengers away from the impact.

The present invention may use proactively fired external airbags which for the first time provide a means to create a "Just in Time" deceleration zone on the side of a vehicle prior to impact but not deployed under normal operating conditions of the vehicle. Notably, Background art for external airbags that are either extended under normal operating conditions of the vehicle or require reactive deployment cannot function effectively, as the former will impede the maneuverability of the vehicle and the latter will not be able to create a deceleration zone in time for the impact.

Overall this invention provides a "bottom up" paradigm for the design of vehicles starting with the human environment and building outwards to the vehicle—in stark contrast to the conventional approach of design that starts with the vehicle and inserts within these constraints, the passenger environment. Moreover, this invention embodies a two level safety system. The first or the primary level is passive and has a negligible probability of failure. The second level is active and predictive or proactive, utilizing advanced technologies. However, complex advanced technology systems have the drawback of higher probabilities of failure. Therefore while the second level can reduce the level of injury in serious crashes, there is a non trivial probability of failure of this secondary system Therefore it is necessary to build a primary system that is good enough in most cases to reduce injury levels in severe crashes. The paper in the Appendix includes simulation results for an embodiment of the primary system alone with a failure of the secondary system.

The following descriptions are for embodiments of the present invention. Deviations from this description in an embodiment is possible without deviating from the present invention.

PREFERRED EMBODIMENT

Figure 6:
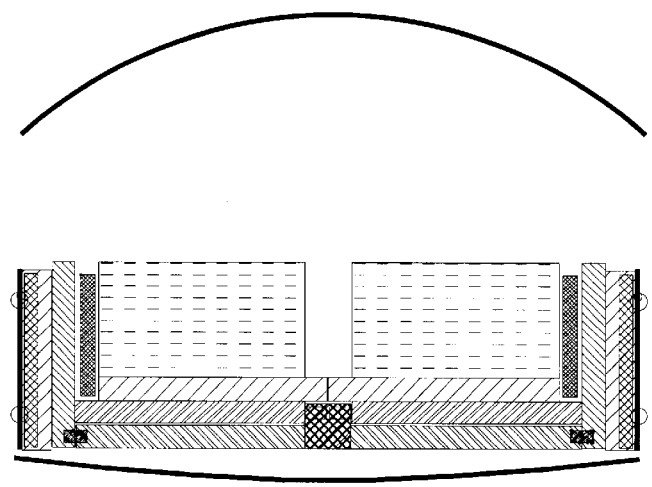
Figure 11:
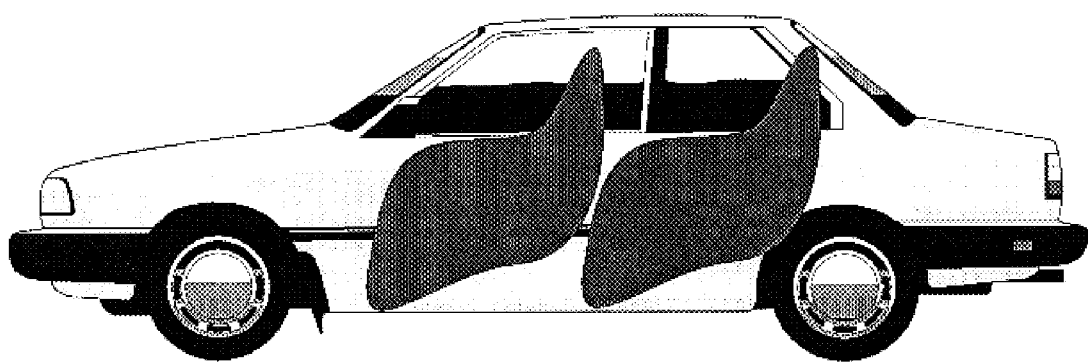
FIG. 11. is an illustration of the position of the "Safety Zones" that are targeted for protection with the Protector shields.

The following is a detailed description of some of the components of this embodiment. The seating arrangement of a passenger vehicle is shown in FIG. 1. The cross section of the central member of the indo-skeletal structure (101) is fixed to the safety beam lower element (102). The Protector Shield (106) is firmly attached to the Safety beam Upper element/Upper Primary slide (107), which slides on the Safety beam lowerelement/lower Primary slide (102). (The terms upper and lower being used for the slides to distinguish them and not representing a relative elevation of the slides). The construction of such protector shields would follow that of any impact resisting body panel member of a vehicle, with the usual weight strength tradeoffs. Such construction is well disclosed in the background art. The sliding arrangement may use single element or multiple element direct contact low friction surfaces sliding on one another, roller bearings, ball bearing structures—all of which are well disclosed in the background art. The Protector Shield(106) are designed to cover the required "safety zone" (501) as noted on FIG. 11. The Safety beam upper element/Upper Primary Slide (107) locks into the Central member of the indo-skeletal structure (101) in the operating position with locking devices (112). Such locking devices do not take any additional loads on impact, and may as a result follow the extensive background art for locking devices for example similar mechanisms to those used in automobile door locks. These locks may be activated by the ignition key switch for additional safety while the vehicle is operational. The Protector Shield (106) has attached on the outside a shock absorber (103), which may include external airbags (104). (the protector shield in this embodiment provides a protective skin on the side of the vehicle) The construction of such shock absorbers follow the background art. Such external airbag (104) are protected from sharp objects on impact by a Perforation Shield (105). These perforation shields protect the external airbag (and the passenger) from sharp objects. The construction of such perforation resisting shields are well disclosed in the background art. Such Perforation shields may be attached by conventional means to the outer surface of the airbag and retained in the normal operating position using techniques used for airbags both internal and external disclosed in the background art. The Air Bag (104) is deployed with distance and velocity sensors (113) mounted on the Perforation shields (105). Distance and velocity sensors are used in other applications and their construction is well disclosed in the background art. The Safety beam upper element/Upper Primary Slide (107), supports the secondary slide/Impact decouplers (111). In this embodiment this is firmly attached to the Safety Beam Upper element/Upper Primary Slide until the impact when it is decoupled to slide away from the impact. The Secondary slide arrangement may use a friction based approach, or other approach, all of which are well disclosed in the background art. This embodiment has contoured surround Passenger Seats (109) that are mounted on the Secondary slides (111). These seats have internal Airbags (114) that deploy on impact and may "unfurl" upwards to protect the head or upper body as well. The construction of seat adjustment mechanisms are well disclosed in the background art. This Figure shows the impacting object on the left approaching the vehicle, but too distant to trigger any action.

Figure 3G:
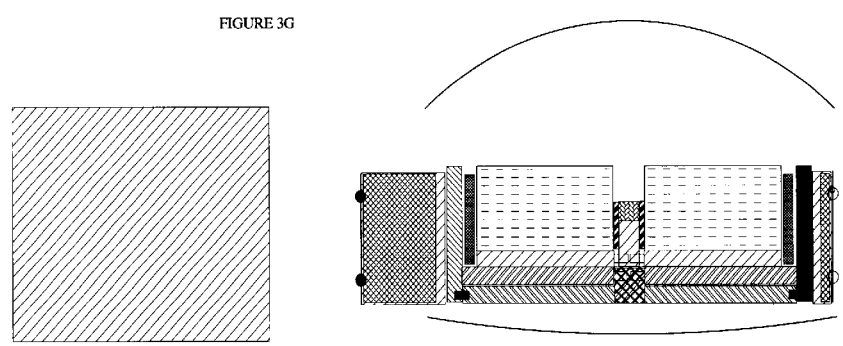
Figures 2, 6:
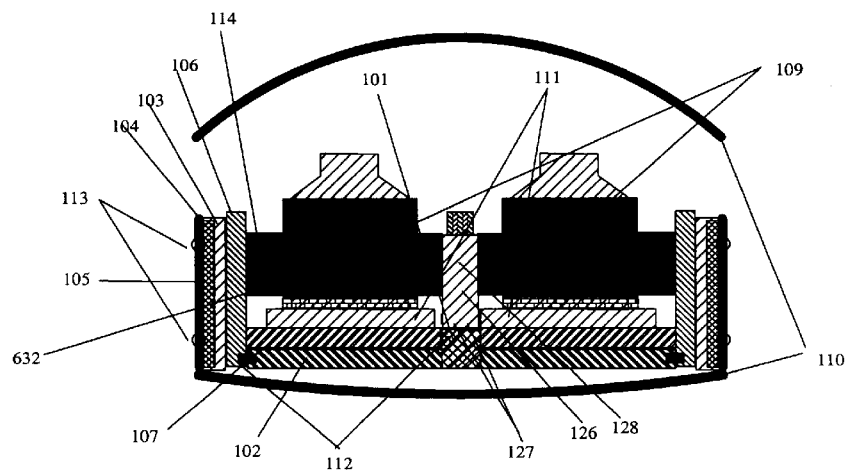
FIG. 2 is an illustration of the same vehicle arrangement as in FIG. 1, except that the impacting object has advanced towards the passenger vehicle adequately to trigger the distance and velocity sensors.
Figures 1, 6:
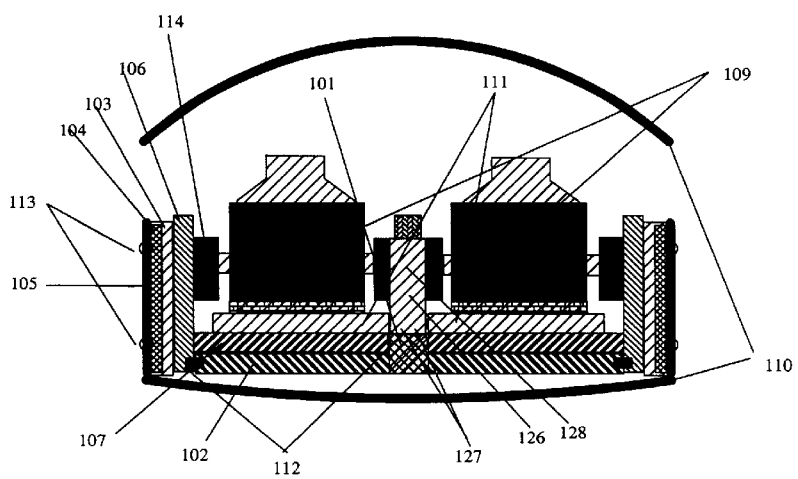
FIG. 1 is an illustration of a front elevation of a seating arrangements in a passenger vehicle. This figure is an illustration of the invention in the normal vehicle operating condition. The impacting body is represented on the left as still distant but advancing towards the above passenger vehicle.
Figures 1, 5:
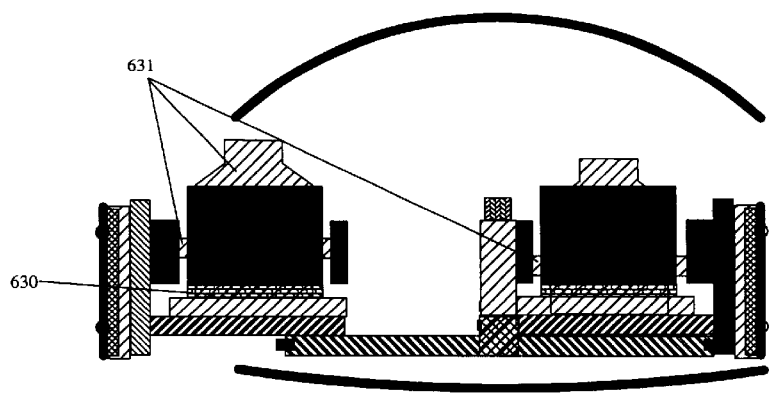
Figure 15:
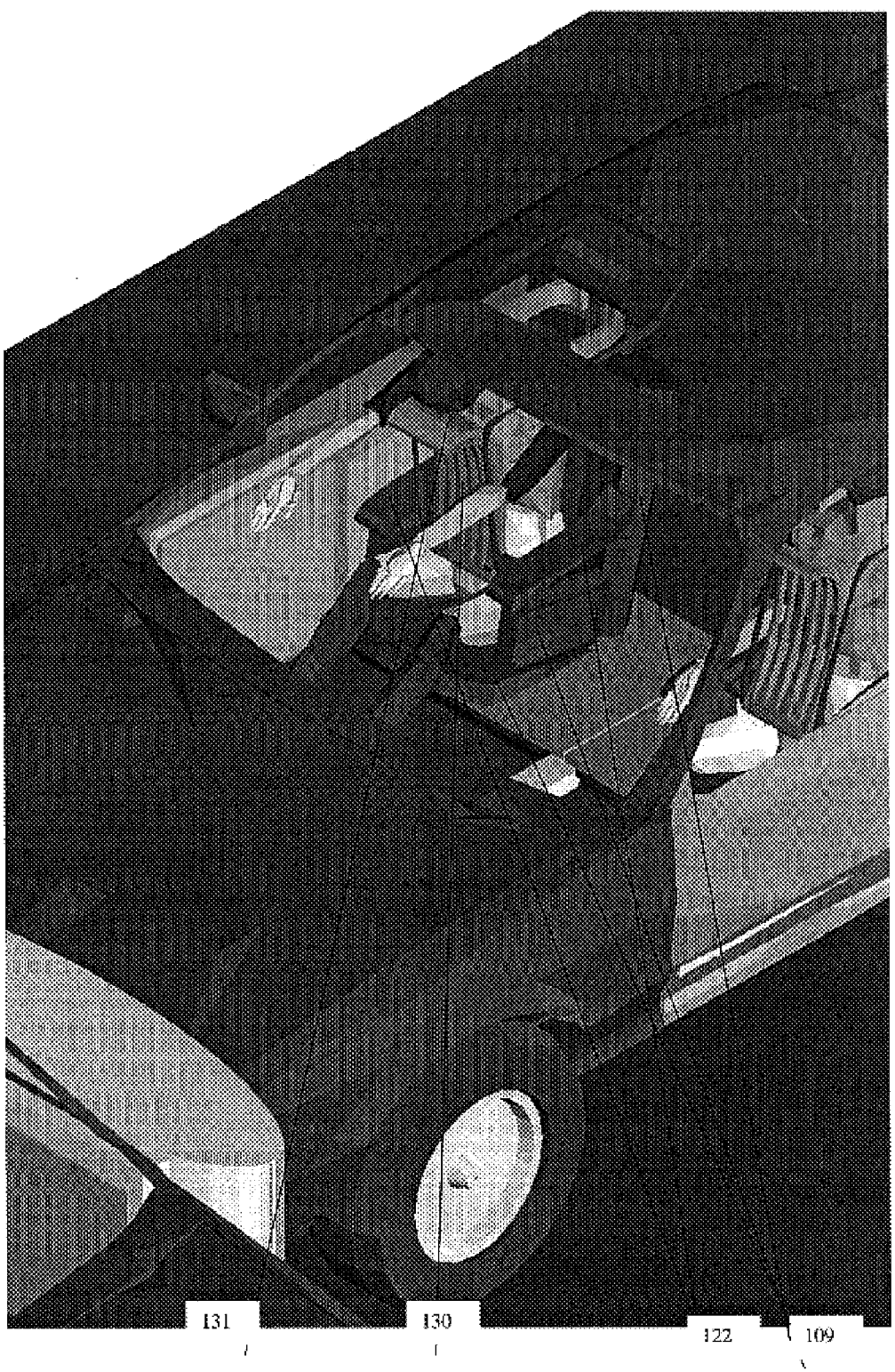
FIG. 15 C illustrates a detailed view of the safety harness and its components.
Figure 15:

In FIG. 2, the impacting object has moved to a position that can now trigger the distance and velocity sensors (113). These sensors trigger the deployment of the External Airbags (104), and the shock absorbers (103). The internal airbags (114) may be triggered by conventional means disclosed in the prior art, explicitly or implicitly reacting to proactive or reactive impact detection. The internal air bags are designed to move the passengers and the passenger seats to the extent necessary through a Motion Space to a Safe Position on primary impact detection, and thereafter protect the protected entity—the passenger and the seat. Thereafter as illustrated in FIG. 3, the External Airbags (104) and shock absorbers (103) deploy to provide the required deceleration zone for the impact. As a result on impact the energy of impact is partially absorbed by the External Air bag (104) and the Shock Absorber (103) and the remaining energy transferred to the massive components of the vehicle through the Protector Shield (106), the Safety beam upper element/upper primary slide (107) and the safety beam lower element/lower primary slide (102) to the Central element of the Indo-skeletal frame (101) and the body of the vehicle. Notably, the Secondary slides (111) decouple and slide the passenger seats (109) with the passengers away outside the path of the impact forces and protected by the internal Airbag (114). The Safety beam upper element/ Upper Primary Slide (107) on the side of the vehicle away from the impact is free to slide out with all devices mounted on it to provide a path for the secondary slide (111) and the seats (109). In this situation it may be seen that the Safety beam upper element/upper primary slide works as an impact-resisting beam on the side of the impact and a release and support mechanism on the side away from the impact. FIG. 15 A illustrates the side impact with the deployed internal and external airbags, and the displaced passengers away from the impact in the vehicle sustaining the lateral impact. FIG. 15 B illustrates the frontal impact support for the passenger on the right hand side. The Left hand passenger is shown in the normal position for comparison.

Figure 14:
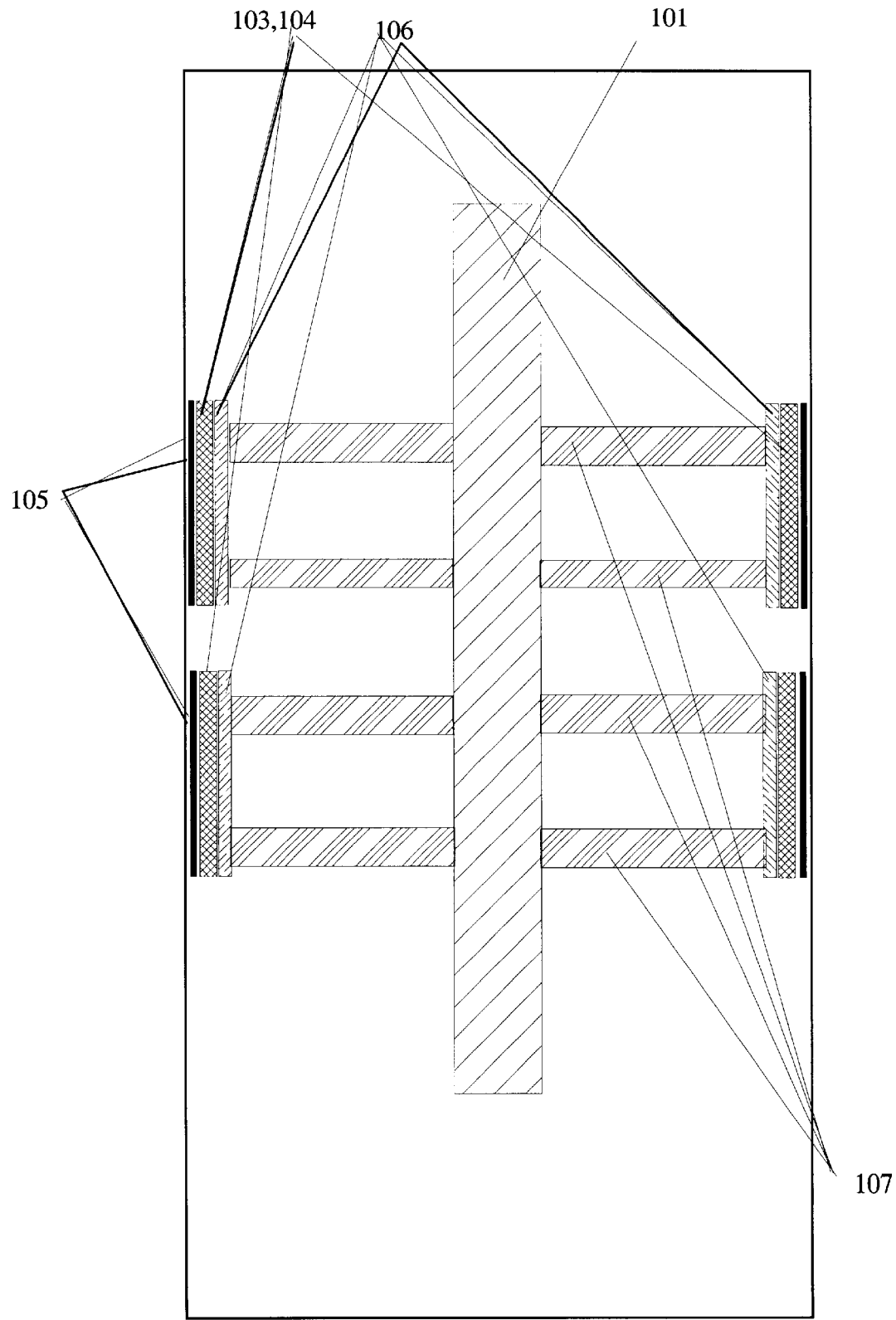
FIG. 14 illustrates a horizontal cross section of an embodiment of the present invention at the level of the upper primary slides.

FIG. 14 illustrates a horizontal cross section of the embodiment at the height of the safety beam upper element/ upper primary slides (107). The central member of the indo-skeletal structure (101) is flanked by the safety beam upper element/upper primary slides (107) abutting the central member, with the protector shields (106) and the shock absorbers that include the external airbags (103,104) at the outer end of the safety beam upper element/upper primary slides. The perforation shields are shown at the outer extreme of the shock aborbers and airbags. In this embodiment there are two sets of safety beam upper element/upper primary slides on each side of the vehicle that can support two rows of seats (front and rear) one on each side with its own protection with the protection shields and shock absorbing devices.

Figure 10A:
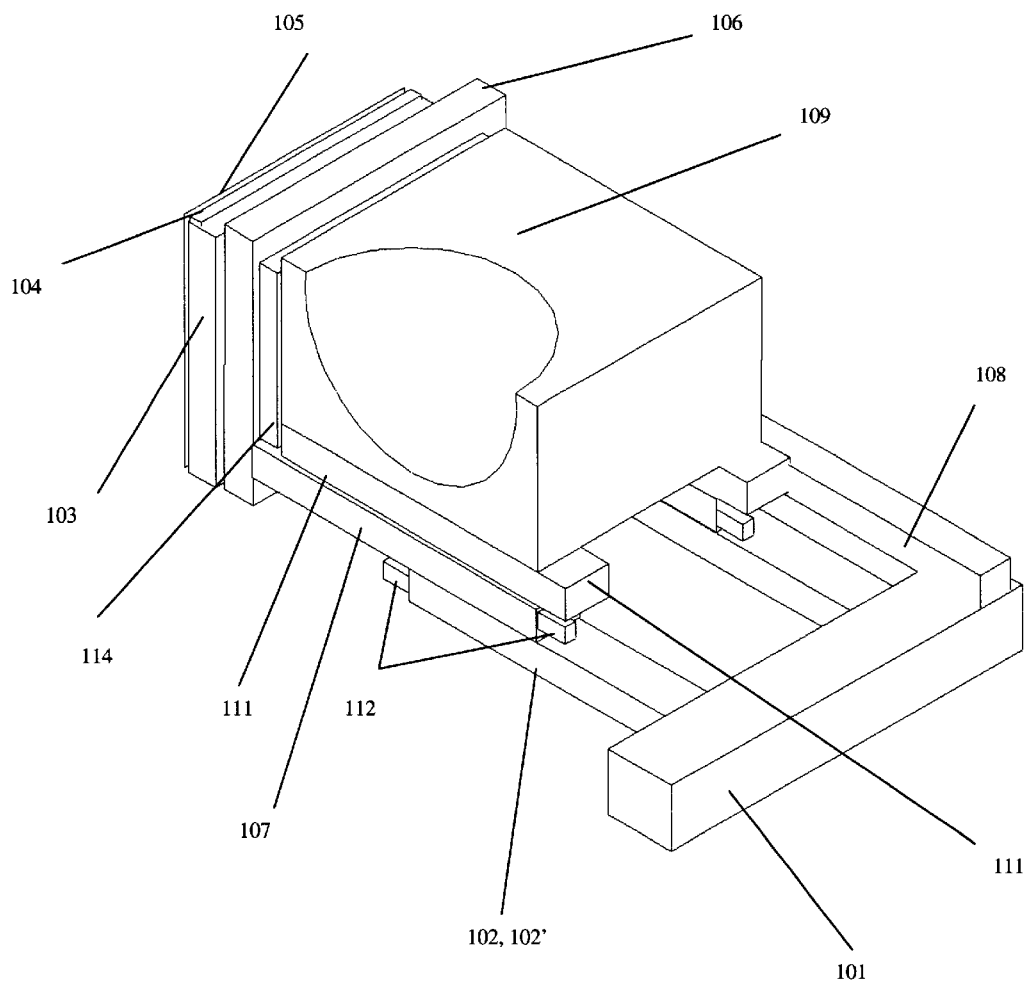
FIGS. 10 A and B are an illustration of Isometric views of the present invention on one side of the vehicle for clarity.

An auxiliary slide beam structure (108) (as illustrated in FIGS. 10A, 10B and 10C) may be attached to the central member of the Indo-skeletal beam (101) and locked into the protector shield when the vehicle is ready for operation, or be attached to the protector shield and slide out with the Safety beam upper element/upper primary slide (107), and get locked to the central member of the Indo-skeletal structure (101) in the operating position.

Figure 5:
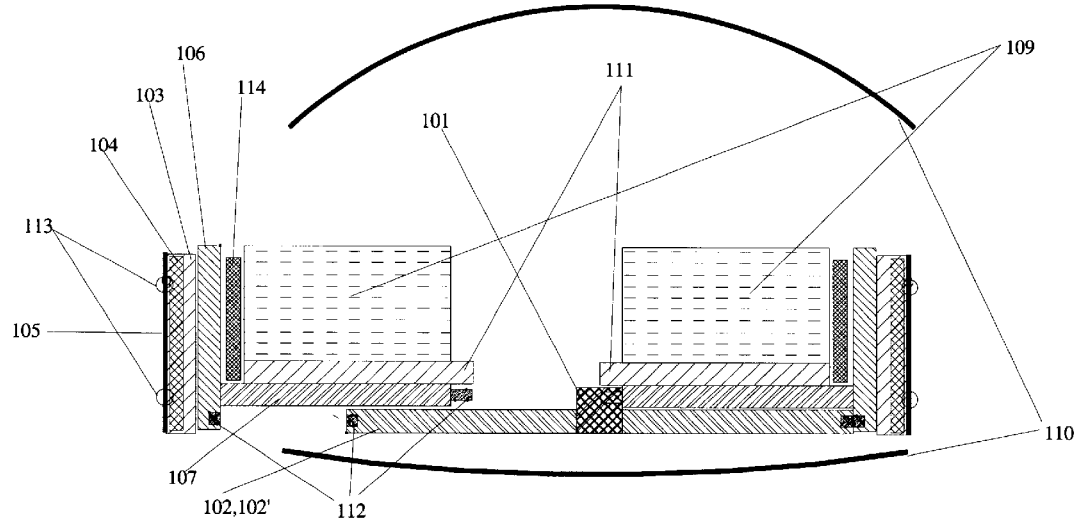
FIGS. 5 and 6 is an illustration of the seating arrangement as used for loading and unloading passengers and driver.

Means for access for passengers in this embodiment as illustrated in FIGS. 5, 6, 10A, 10B and 10C. The seat (109) and secondary slide (111), slide out on the upper Primary Slide (107) to a position that lets the seat (109) protrude from the vehicle such that the passenger may simply stand in front of the seat and sit down on the seat (109). Thereafter the seat (109) is retracted on the Primary slide to the position as depicted in FIG. 6, where the Safety beam upper element/ upper primary slide (107) is locked with the locking devices (112) in position for operation of the vehicle. The slide drive mechanism may be powered using approaches well disclosed in the background art such as servos, and pneumatic or hydraulic systems. The vehicle while in operation should have the Upper Primary Slide (107) retracted and locked. The ignition lock is used in this embodiment to ensure this practice.

While extended, the clearance on the side of the vehicle for the Easy Ejector will usually be in the range of about 20 inches to 30 inches. This could be substantially less than the clearance required for opening a conventional car door. This is particularly useful for parking in areas with limited clearance.

Figure 12:
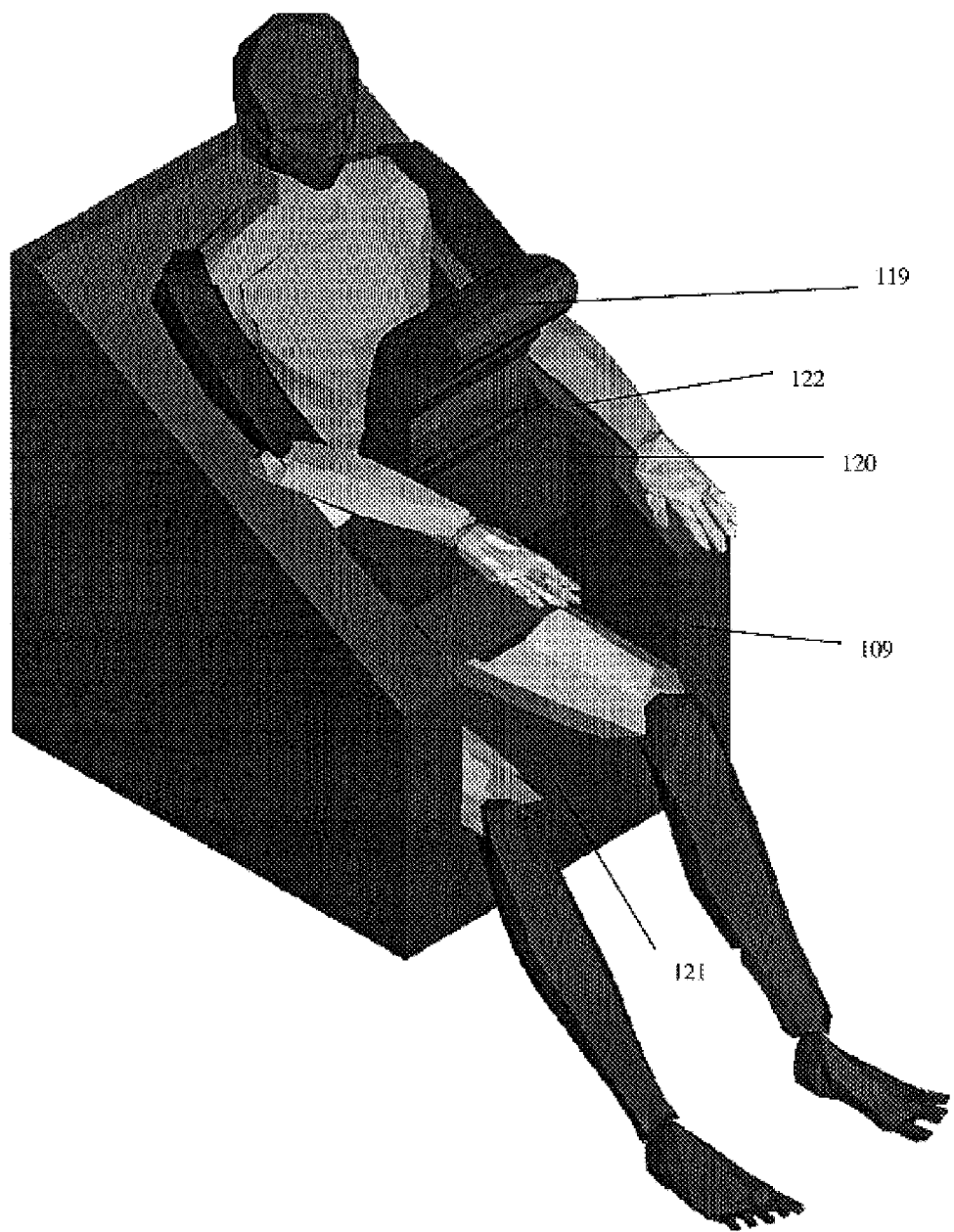
FIG. 12. A is an illustration of an isometric view of the Seat arrangement.
Figure 12:
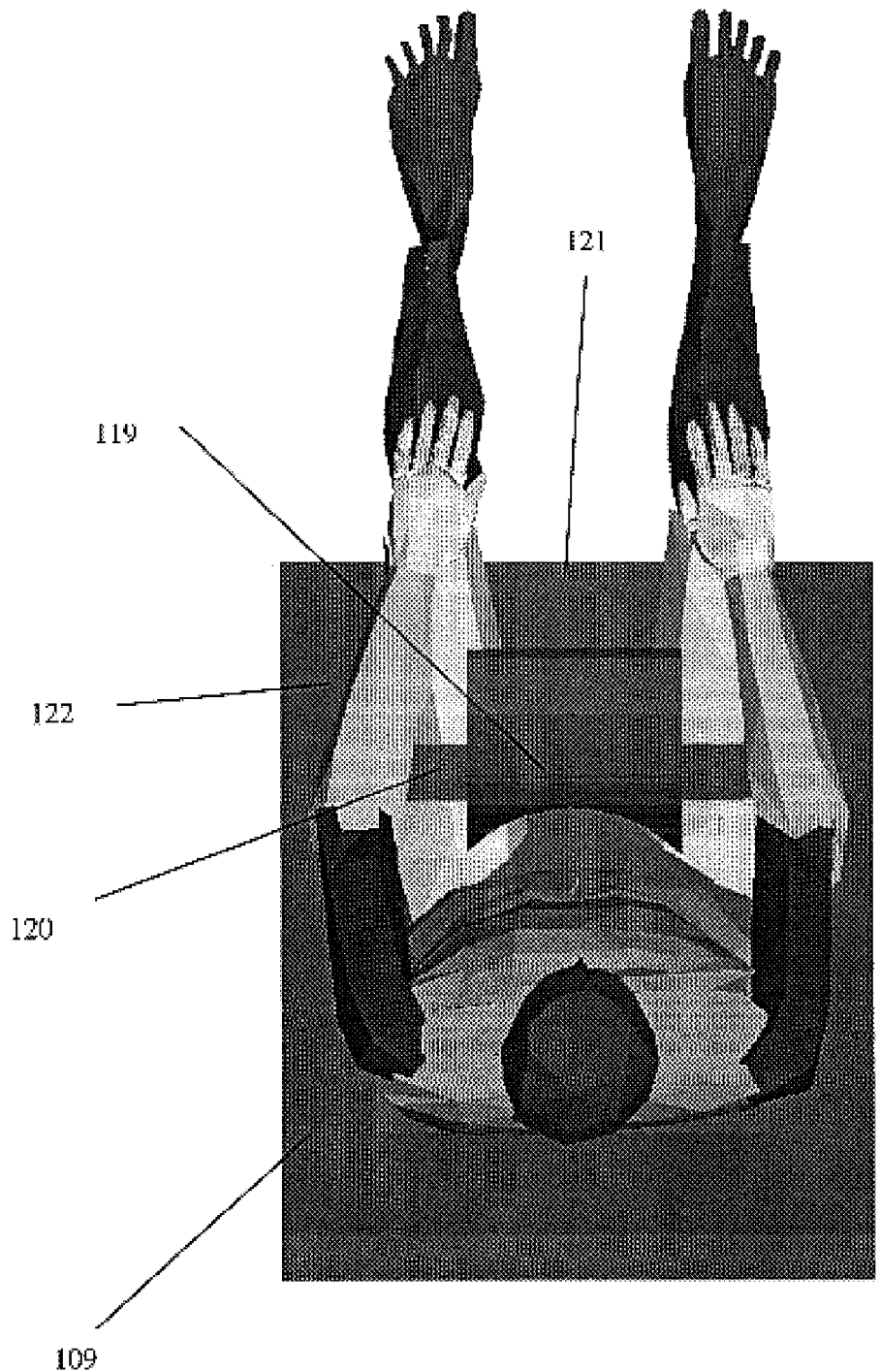
Figure 12:
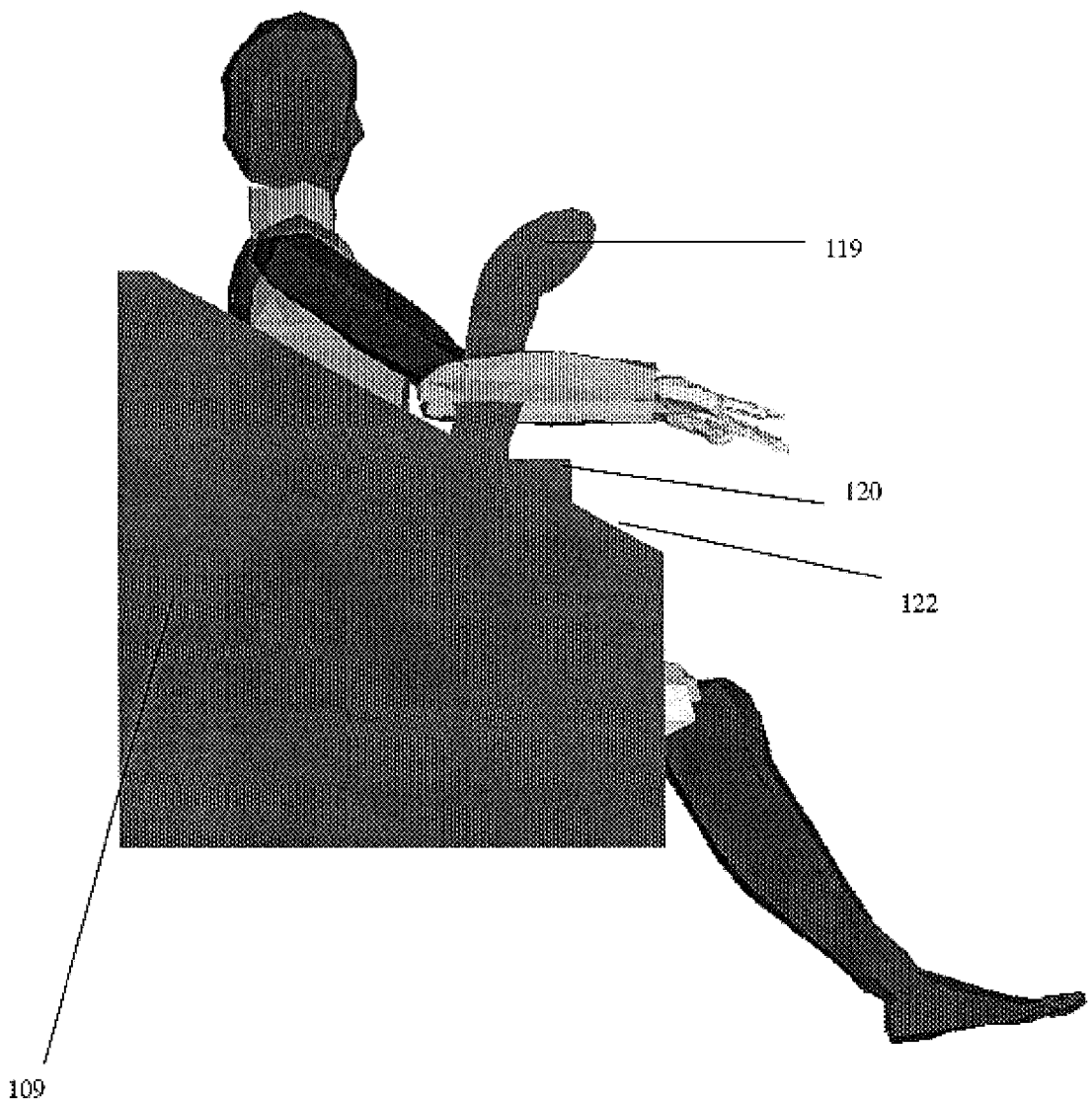
Figure 12:
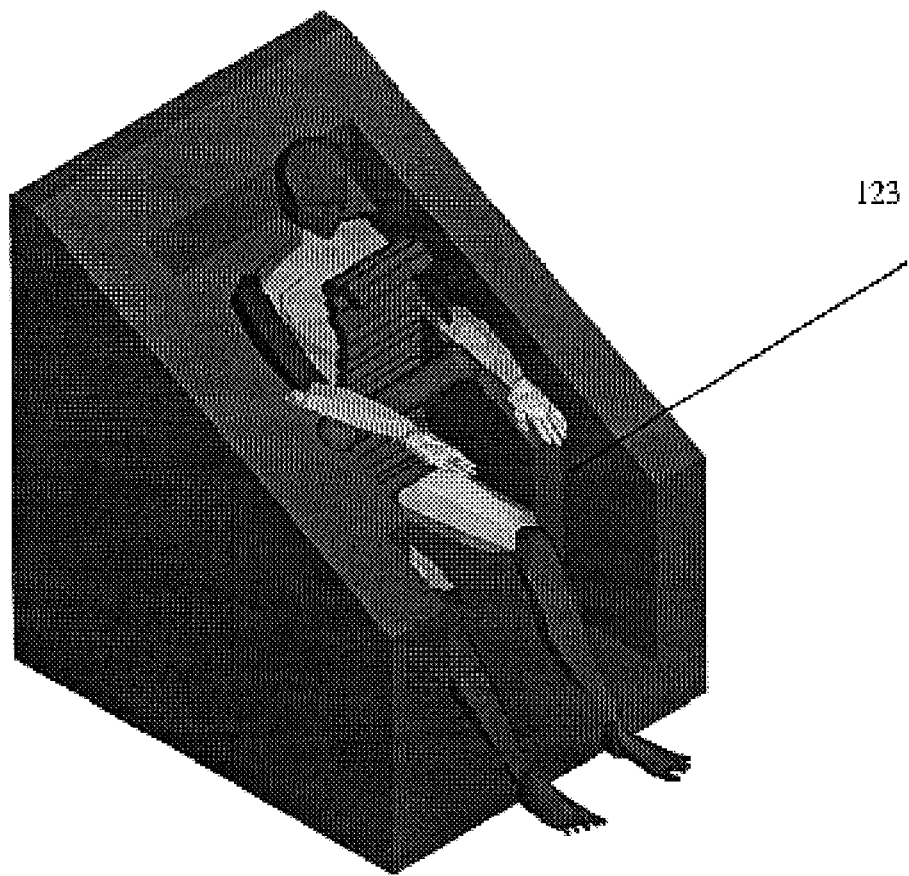
Figures 2, 12F:
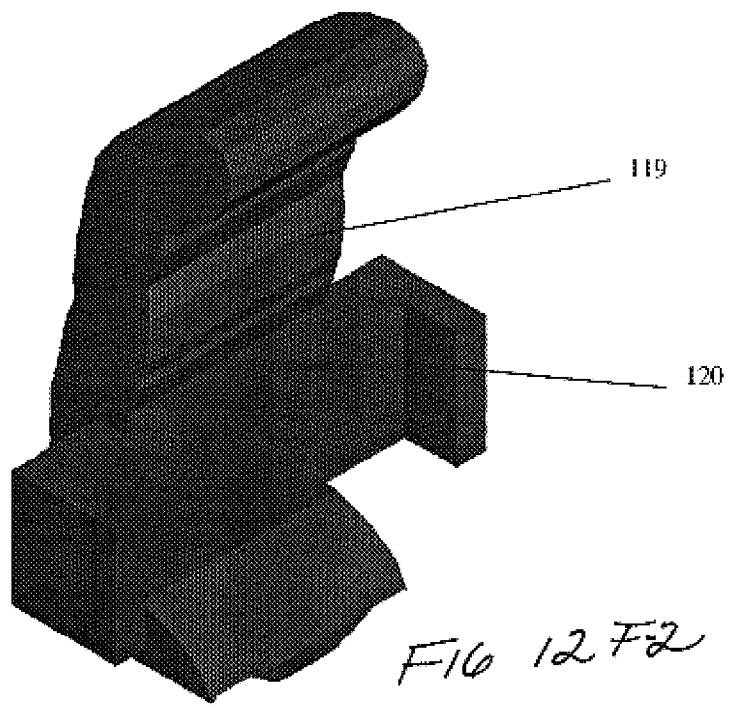
Figures 2, 12G:
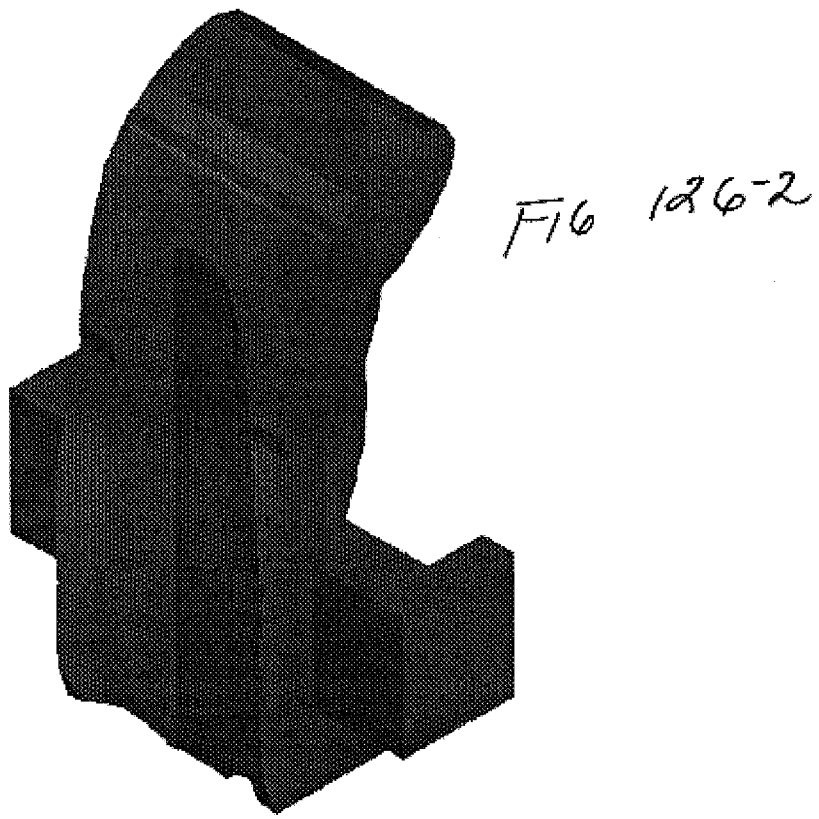
Figure 12:
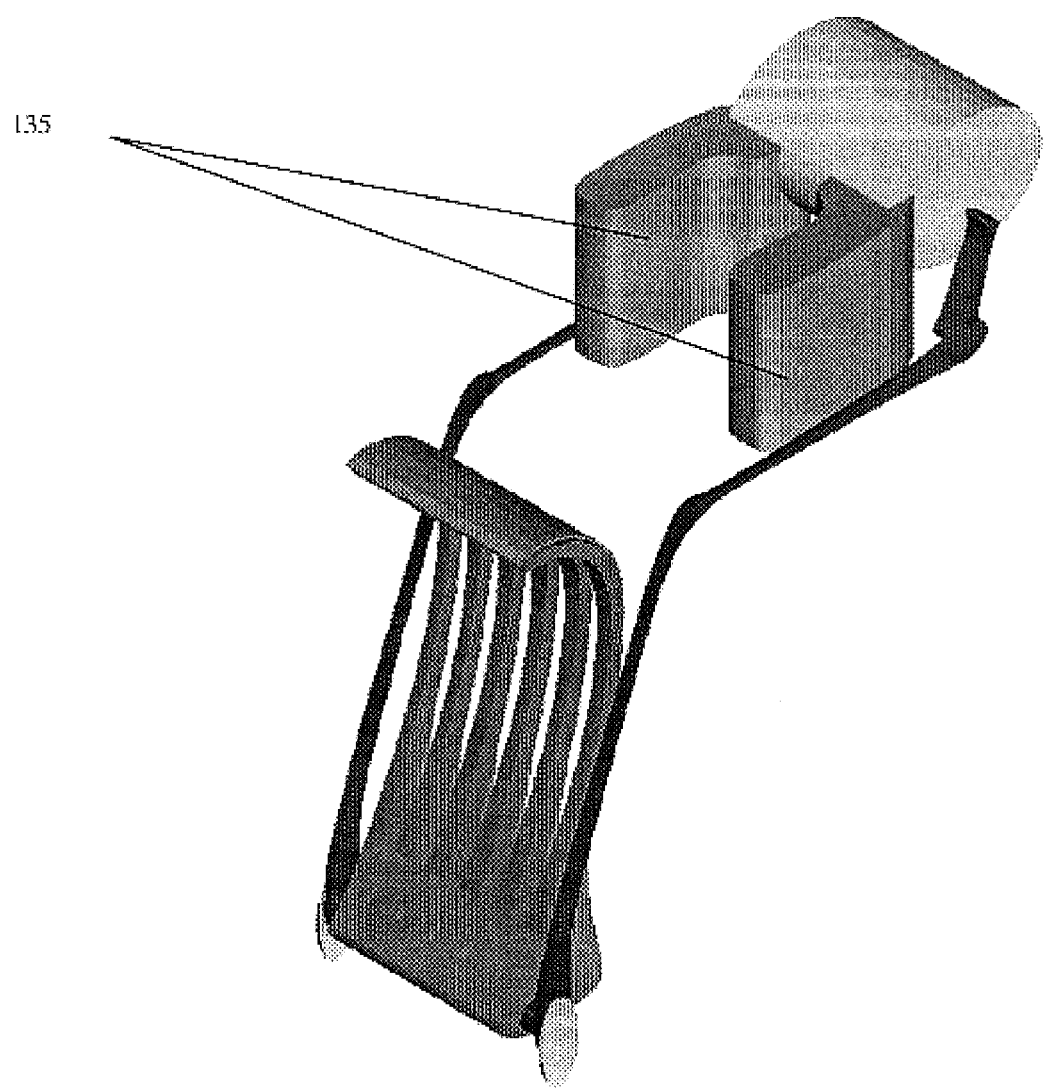
Figure 13:
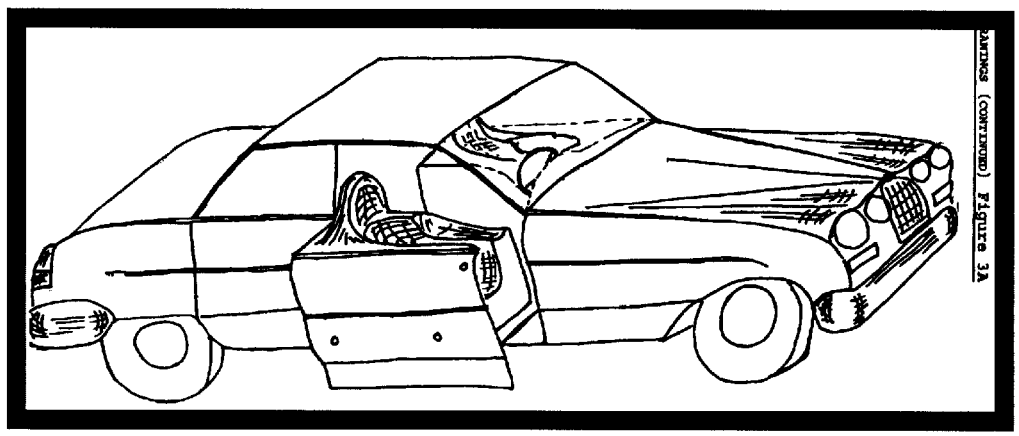
FIG. 13. is an illustration of a drawing of isometric view of the present invention.

FIGS. 12A, 12B and 12C illustrates the detail of the seat (109). The seat (109) may be constructed with customizable multi-elements that conform to the desired shape and provide the desired support for the passenger. Such adjustments may be effected using conventional seat control devices. In this figure the Safety Harness (119) is secured to the sides of the contoured seat (109) between the arm rests (122). The safety harness (119) may be designed to protect the passenger in head-on collisions by providing a soft barrier in close proximity to the body but not necessarily touching the body. This arrangement may be preferred to seat belts that do not provide the extended surface area that the harness (119) provides and as result provides greater impact resistance for the same level of limiting forces that the body can withstand. Moreover, this arrangement may obviate the need for a front collision airbag as the harness (119) may be high enough to support the face and neck under collision conditions. The harness may be constructed of pliable but semi-rigid material (such as high strength nylon) to provide support in a head on collision. A natural benefit of the arrangement of the harness (119) and its supports (120) is that lateral forces on the seat are also braced by the harness support (120) in the operating position. FIGS. 12 F 2 and 12 G2 illustrate an embodiment of the harness. Moreover the seat (109) may be constructed with reinforcing on the sides to further protect the passenger from crush injuries. The Seating surface (121) is illustrated in the same figure as are the arm rests (122). In conventional vehicle seat designs the door surface provides the only support on the external side surface which are usually limited to arm rests. This seat (109) provides surround support for the passenger particularly desirable on winding roads. The "Custom contoured seats" customized for each passenger may be created with a multi-element adjustable structure (the customized multi-elements)— manually with inserts or with computer controlled elements—that provide ergonomic passenger comfort providing where desired, lateral support in addition to the support that conventional seats provide, to cradle the entire lower body in the ejector seat. Similarly child seats (123) as in FIG. 12D1, may be designed to protect children. Such seats can be inserted into the seat (109). The Safety harness may also have an attachment for providing greater support for infants and small children.

ADDITIONAL EMBODIMENTS

Figure 7:
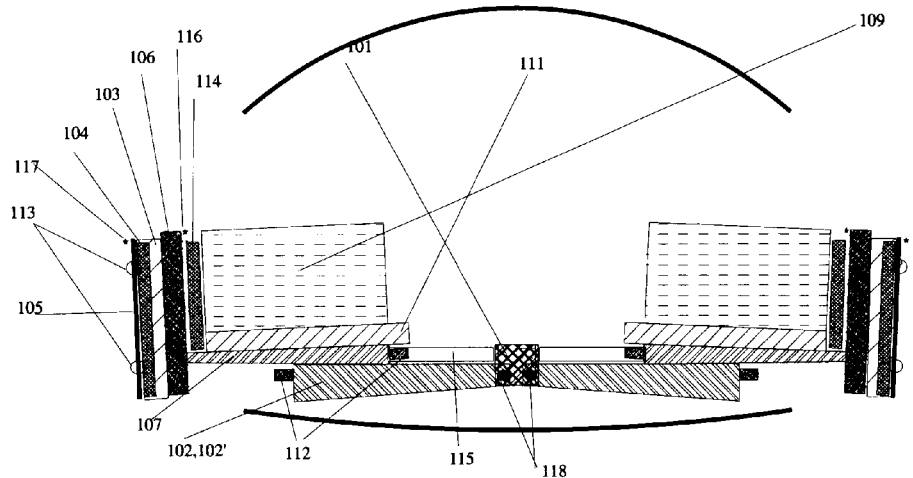
FIGS. 7–9 is an illustration of the Gravity slide drive that may be embodied in the invention.
Figure 8:
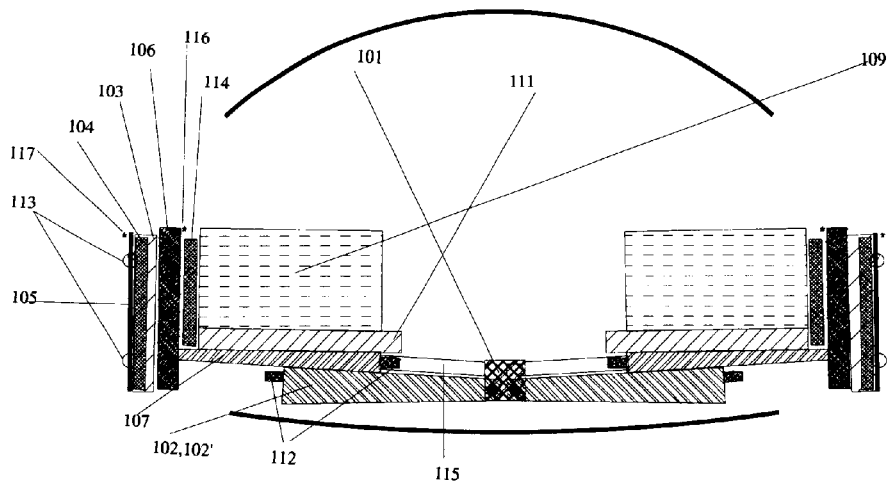
Figure 9:
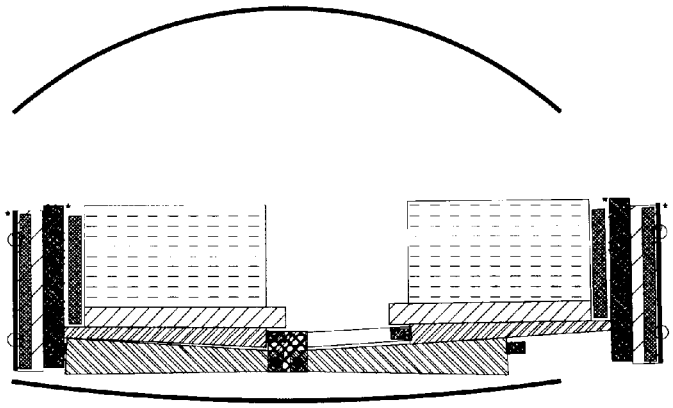

While the above embodiment uses a power slide drive, this embodiment differs in that a gravity slide drive is employed to move the slides for mounting the vehicle. FIGS. 7,8 and 9 describe this arrangement. This embodiment differs in the preferred embodiment above in that the Safety Beam Lower element/Lower Primary slide (102) are pivoted at the Central member of the indo- skeletal structure with pivots (118). As shown in FIG. 7, this allows the lower slide to fall to a lower of two positions, that inclines the upper surface of the Safety Beam Lower Element/Lower Primary slide (102) adequately to allow the safety beam upper element/upper primary slide (107) to slide outwards to the loading position assisted by the weight of a passenger in the seat and the additional assistance of the Spring arrangement (115). The passenger may dismount from the vehicle when the slide is fully extended as shown in FIG. 7. Each side of the vehicle has independent slides and may be operated by passengers independently.

When the passenger dismounts from the seat the Safety beam upper element/upper primary slide (107) in its extended position moves to the higher of two positions about the Pivot (118) as illustrated in FIG. 8. This move inclines the Upper surface of the Safety Beam Lower Element/Lower Primary slide adequately to allow the weight of a passenger to work against the spring arrangement (115) and move the slide to the operating position. This move up of the Safety Beam Lower Element/Lower Primary Slide (102) may be effected by mechanisms well disclosed in the background art. The Slide as depicted in FIG. 8, is now ready for a new Passengers to mount. When the passenger sits on the seat (109), the weight of the passenger works against the spring mechanism (115) to move the slide to the operating position as depicted on the left hand side of the FIG. 9 and lock the slide in the operating position. The Safety beam upper element/upper primary slide may be unlocked by the passenger by depressing the Inside Door Open Button (116). Activating this button in addition allows the Safety Beam Lower Element/lower primary slide (102) to move and be locked to the loading inclination—the lower of two positions, and the Safety beam upper element/upper primary slide (107) is free to slide out with the passenger. At this point the arrangement has completed a full cycle and is in the position depicted in FIG. 7.

The above cycle represents operation of the Gravity Slide Drive when there is a passenger in the seat (109) when the Slide moves to and from the operating position as on the left of FIG. 9. When a passenger dismounts however, and the Slide arrangement needs to be retracted without a passenger in the seat, the weight of the passenger is no longer available for aiding the motion of the slide to the operating position, and the slide must be pushed in against the action of the Spring Arrangement (115) and locked in place at the operating position. When a new Passenger wishes to mount the vehicle, he/she will press the Outside Door Open Button (117) which releases the catch that holds the Safety beam upper element/upper primary slide beam in place but does not affect the movement of the Safety Beam Lower Element/ Lower Primary Slide (102) about its pivot (118). The seat as a result slides out on the Safety beam upper element/upper primary slide assisted by the Spring arrangement (115) to the position for mounting the vehicle as depicted in FIG. 7. The spring arrangement (115) is designed to be such that it provides a force just adequate to move the Safety beam upper element/upper primary slide out with no passenger in the seat.

Some alternative embodiments may have multiple positions for the inclinations of the safety beams from the center of the vehicle, in the loading position to accommodate the varying road inclinations that may make a single inclination of the safety beam in the loading position inadequate. In such an embodiment the operator will have the facility to switch to the best loading inclination dependant on the inclination of the road. This will overcome some of the disadvantages of regular car doors on steep hills. Moreover, this arrangement can also function as a shock absorbing device for the comfort of the passengers in vehicles under operating conditions. A possible embodiment to achieve this can have a range of angular inclinations for the operating position, the range being set so that the transfer of the compressive load on impact through to the fixed body members of the vehicle or the central beam is achieved. The Safety beams are spring or shock absorber mounted in a vertical plane relative to the central beam and the fixed body members of the vehicle. When a bump in the road is encountered the safety beams pivot on the center and swing higher at the center thereby isolating the passenger from the road.

Figure 19:
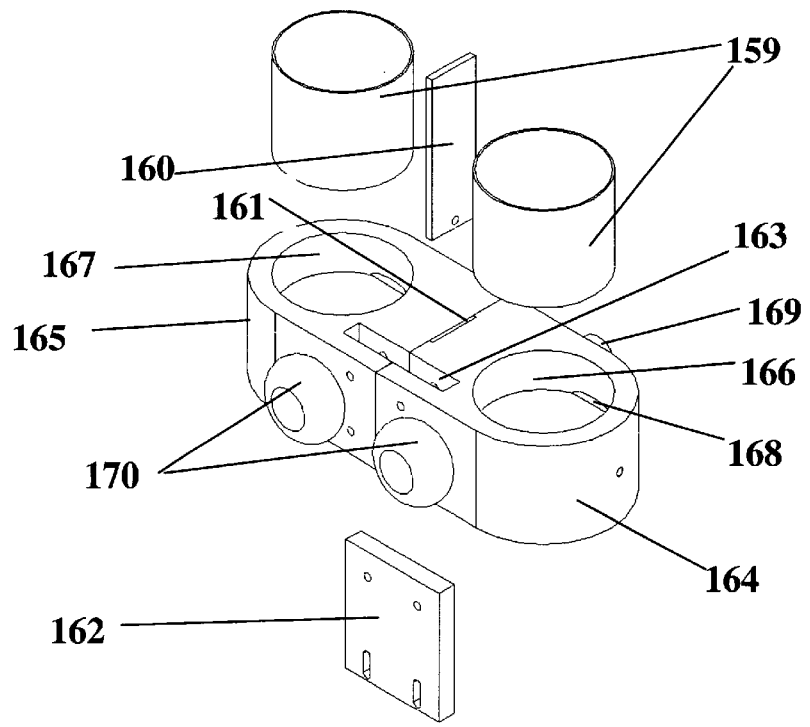
FIGS. 19 A–E show an embodiment of the customizable contoured multi—element seat.
Figure 19:
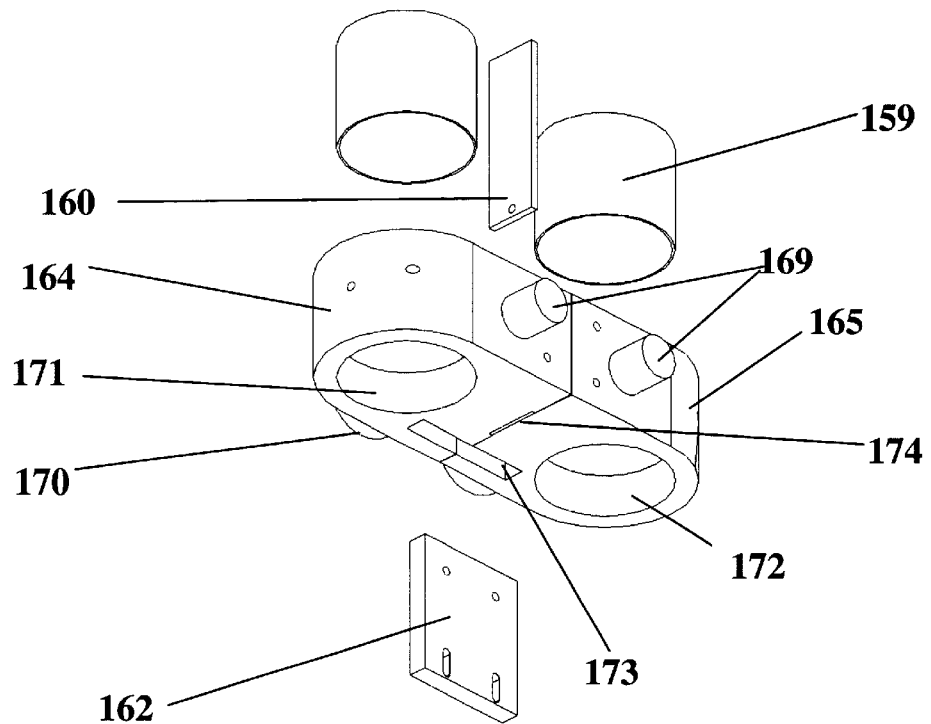
Figure 19:
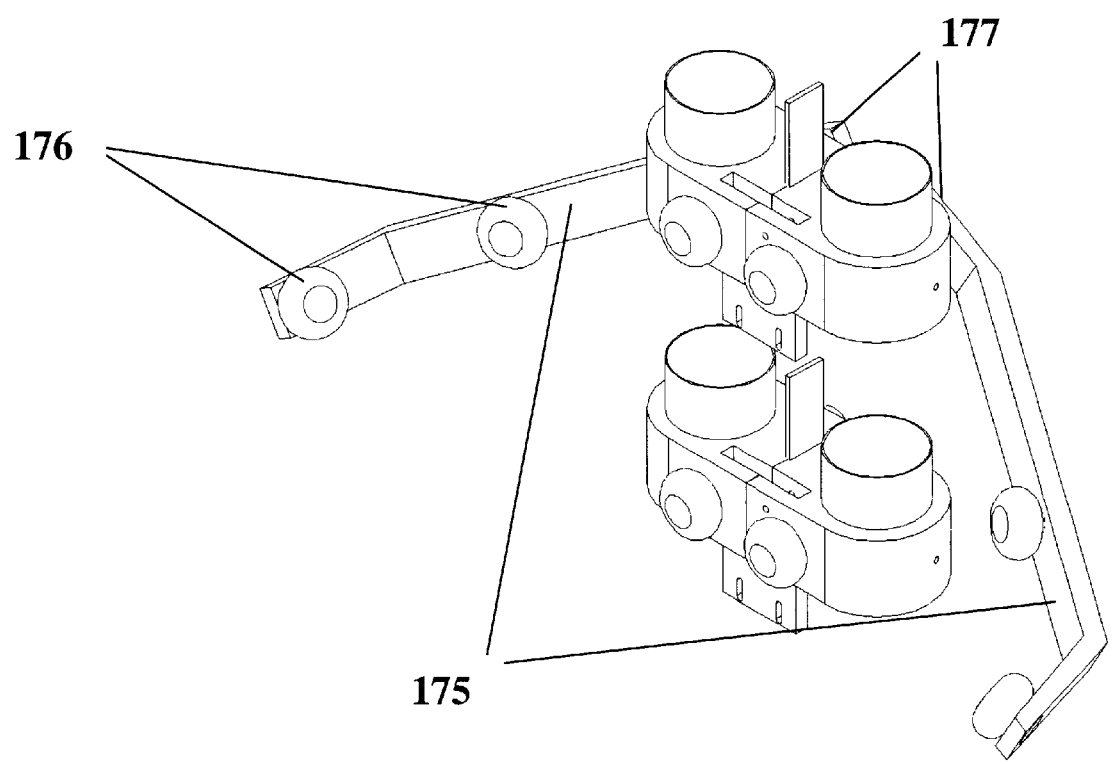
Figure 19:
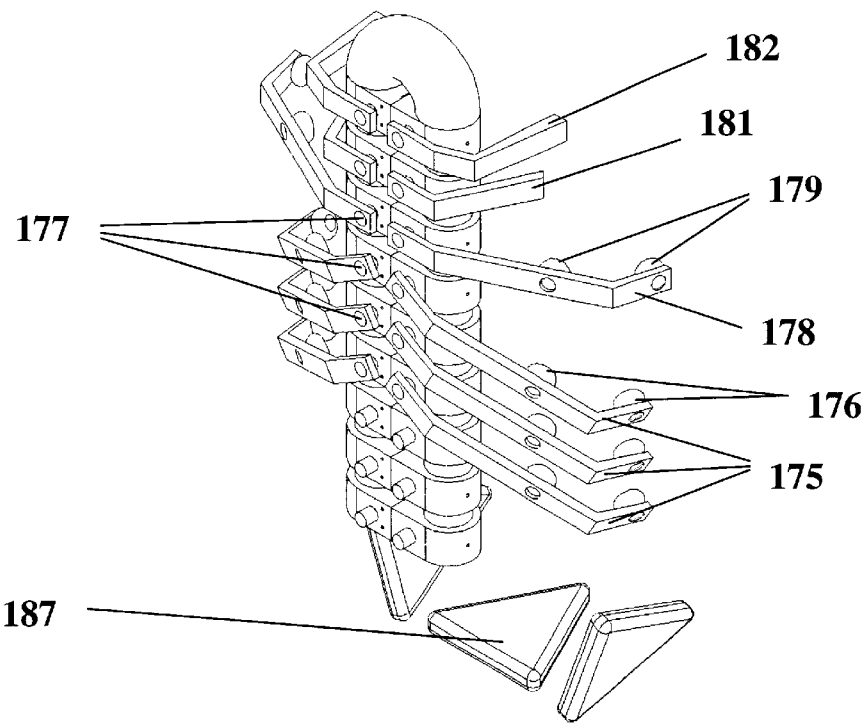
Figure 19:
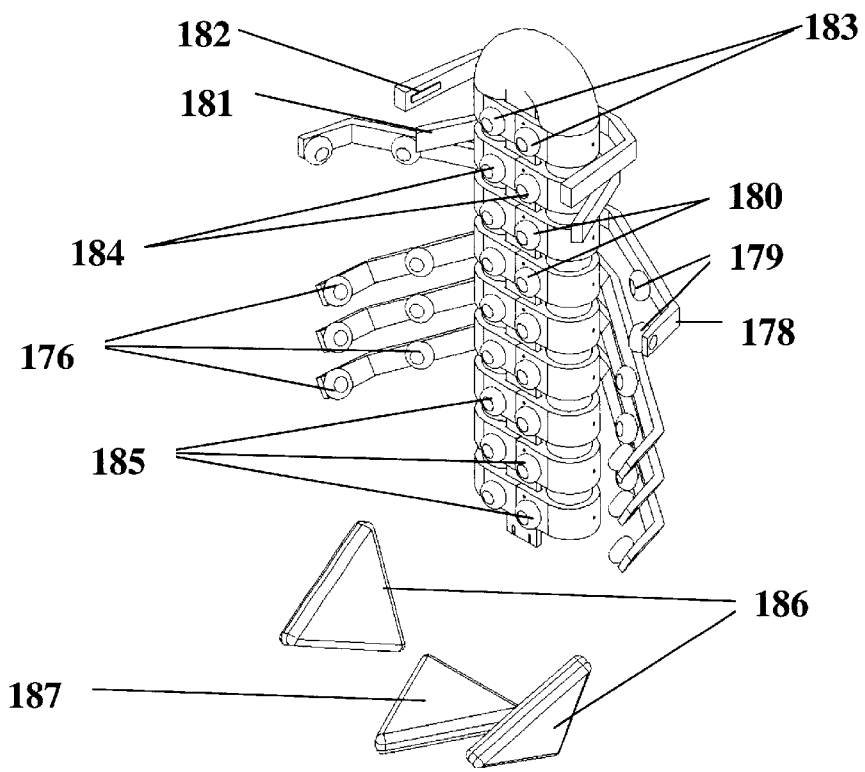

Some embodiments of the multi-element contoured seats may have a structure that provides anatomically accurate support for the body as illustrated in FIGS. 19 A,B,C,D and E. This seat architecture may be used in a wide variety of applications outside vehicles as well. Conventional car seats are a set of two or possibly three rigid structures—the seat bottom, the back and the head rest. These have some mobility for comfort. However there are two factors that militate against their comfort and the level of protective support they can provide in collision situations. First, one size must fit all passengers and drivers. The mobility provided for the seat bottom, seat back and head rest provide limited flexibility for passengers of different sizes. Second, there is little lateral support for the body that could be vital in a side collision, and third, in a vehicle in motion on a rough surface, the shock absorption provided to all parts of the upper body is the same—the seat back is rigid once set up by the passenger—this stands in contrast with the internal shock absorption of the human body, where the spine provides differential shock absorption to different parts of the body, increasing the shock absorption towards the head. This last factor implies that conventional seat backs cannot remove vibrations from both the top and the bottom of the upper body as the body's own shock absorption system will move differentially to the seat back along the length of the spine. The embodiments of this invention illustrated in FIG. 19, improve these characteristics of seats.

FIGS. 19 A and B show two view of a shadow vertebra of the seat. The design of this vertebra is to provide auxiliary support for the body. The structure shown is one of several possible structures for embodiments of this invention. The body of the vertebra in this embodiment is split into a left body (164) and a right body (165) these elements are permanently bonded or fixed together by bolts. The body has two cavities on each of the top and the bottom surface—the air cell sockets. These hold two air cells on the left and the right side. These air cells are supported on the sides by the air cell retainers (159) that slide in and out of the air cell sockets (166, 167, 171, 172). The air cells them selves are made of a pliable and inflatable material, or alternatively a material that can fold within the cell supports. Each pair of air cells are separately inflatable by a multi channel air pump that is installed in the seat embodiment. There is a connecting tube between the left and the right air cells housed in the lateral tilt air cell visco-eleastic damper tube. This tube allows limited air flow between the left and the right chambers to permit lateral tilting of the vertebrae relative to each other. This motion hover is corrected by the lateral tilt return spring (160) that ensures that in the normal position the vertebrae realigned vertically. This lateral tilt return spring is fixed on one end to a vertebra in the upper fixed slot for lateral tilt return spring (161) and can slide within the next vertebra in the lower sliding slot for lateral tilt return spring (174).Orthogonal support is provided between the vertebrae with the support flange (162) that is fixed at one end in the lower slot for the support flange (173) and is slidably mounted in the adjoining vertebra's upper slot for support flange (163). The flange is sized to allow limited lateral tilting as the vertebra tilts laterally, but provides firm back support. Notably the upper and lower slots for the support flange may be inclined slightly so as to take the form of the human spine. The body contact is made on the back with the back support adjustable air cushions (170), which in most embodiments are contoured to the shape of the bode and is illustrated as an ellipsoid for clarity. These air cushions are inflatable and the pressure may be adjusted to the comfort of the passenger. There may be a spring loaded cable that is threaded through the vertebrae to tie them together. The spring loading will work against the air cell pressure as the gets elongated with higher air cell pressure. Ideally there can be as many of the shadow vertebrae as vertebrae in the human body although some embodiments may choose some economy in the number of such shadow vertebrae. FIG. 19C illustrates two adjoining shadow vertebrae. One of these are for supporting the thorax region and therefore have attached the shadow rib body (175) and the related shadow rib adjustable air cushions (176) (shown as ellipsoids for clarity but in most embodiments will be contoured to take the shape of the body. These air cushions are inflatable for passenger comfort. The air supply being led to the cushions along the rib body and down the shadow spine to the multiple channel control air pump which also supplies air pressure of each of the many air cushions and air cells in the seat embodiment. The shadow ribs are supported by the tilt control connectors (177) that may adjust the angle of the shadow ribs. FIGS. 19 D and E illustrate one possible version of this embodiment. Here the shadow vertebrae are stacked up to provide support for the head the neck the shoulders, the thorax and the lumbar region. The head rear support adjustable air cushions (183) provide forward support for the head while the Head lateral support arms with deploying passive air bag (182) provides lateral support particularly during side collisions with deploying passive micro airbags. Similarly the neck has rear support from neck rear support adjustable air cushions (184) and lateral support from Neck lateral support with deploying passive micro air bag (181). The shoulders are supported by the shoulder bolster (178) and the shoulder bolster adjustable cushions (179). The shoulder bolster being pivotally attached to a vertebra of the shadow spine and allowed limited pivotal motion vertically to allow the passenger to move his/her upper arms upwards at normal speed. However, the shoulder bolster will resist rapid motion of the upper arms and shoulders as in a collision thereby supporting the passenger. This differential movement characteristics can be achieved by approaches well disclosed in the background including viscous loading of the coupling. Lumbar support is provided by the Lumbar support adjustable air cushions (185). The entire array of the shadow vertebrae may be elongated and contracted by changing the pressure in the air cells thereby providing the optimal sizing for all heights of passengers. The lateral support and back support cushions may be inflated to provide width control and support for passengers of different shapes. Adjustable hip bolsters provide lateral and forward support while the adjustable pelvic support (187) provides vertical support for the passenger. The illustrations exclude the leg and arm supports that are part of the embodiment for sake of clarity. Spring supports can substitute for the air cells in the vertebrae but will not have the advantage of viscous lateral resistance and independent height control. Overall height can however be controlled with the cable threaded through the vertebrae. Motion control of the seat elements can be achieved with devices well disclosed in the background art including servos, and pneumatic and hydraulic systems.

Considering the complexity of the seat systems including the multi channel inflators for each of the air cells and the air cushions along with the mechanical controls for inclining the shadow ribs and the pelvic and hip supports, it would normally be necessary to use a closed loop feedback with computer control. Pressure sensing of each air filled device will provide feedback on the resistant force o the human body and therefore firmness of the support. This information can be used to provide the firmness control desired by the passenger. One computer controlled scheme could be where the passenger inputs gender weight, and height and the computer alters the size of the seat by inflating and deflating air cells and cushions accordingly and the provides several alternative configurations that the customer can select. The customer can then customize firmness and variations on the seat presets.

Finally the shoulder bolsters and shadow ribs may have deploying micro aircushions that hold the passenger in the event of a collision.

Yet another variation of this embodiment discharges the air in the adjustable air cushions when passengers leave the seats, and then reinflate these aircushions when the new passenger sits down with air that is preheated or precooled to the preferred temperature of the passenger. Thereafter the air cushions will provide insulation at that temperature for the seating surface.

Figure 20:
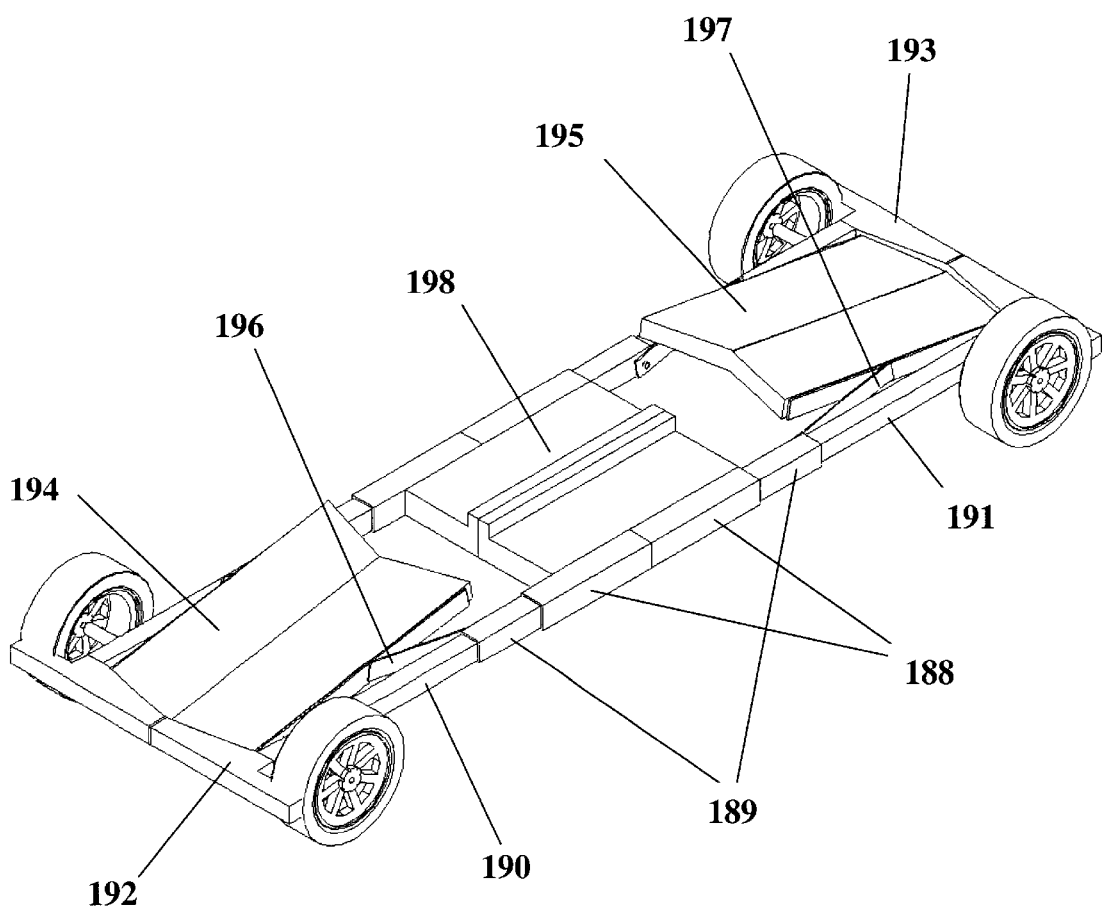
FIGS. 20 A–C show an embodiment of the indo skeletal structure that includes special arrangements for front impact protection and other features for passenger convenience and comfort.
Figure 20:
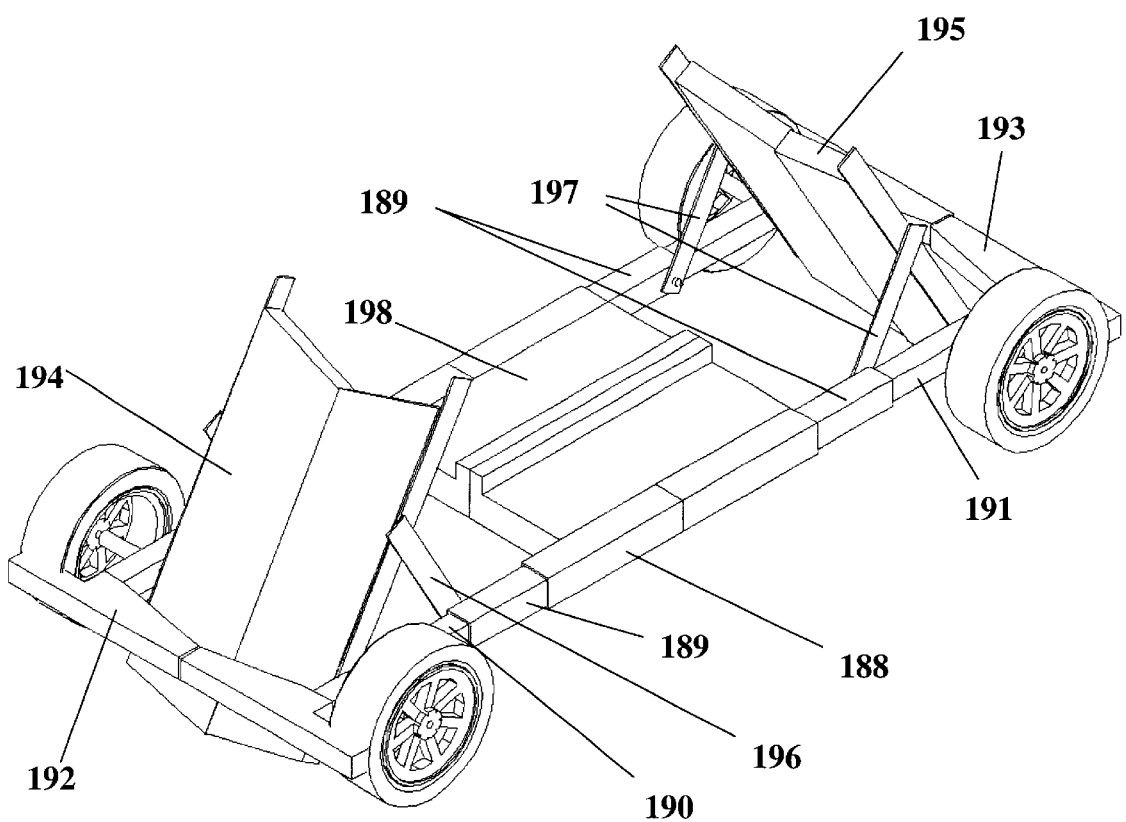
Figure 20C:
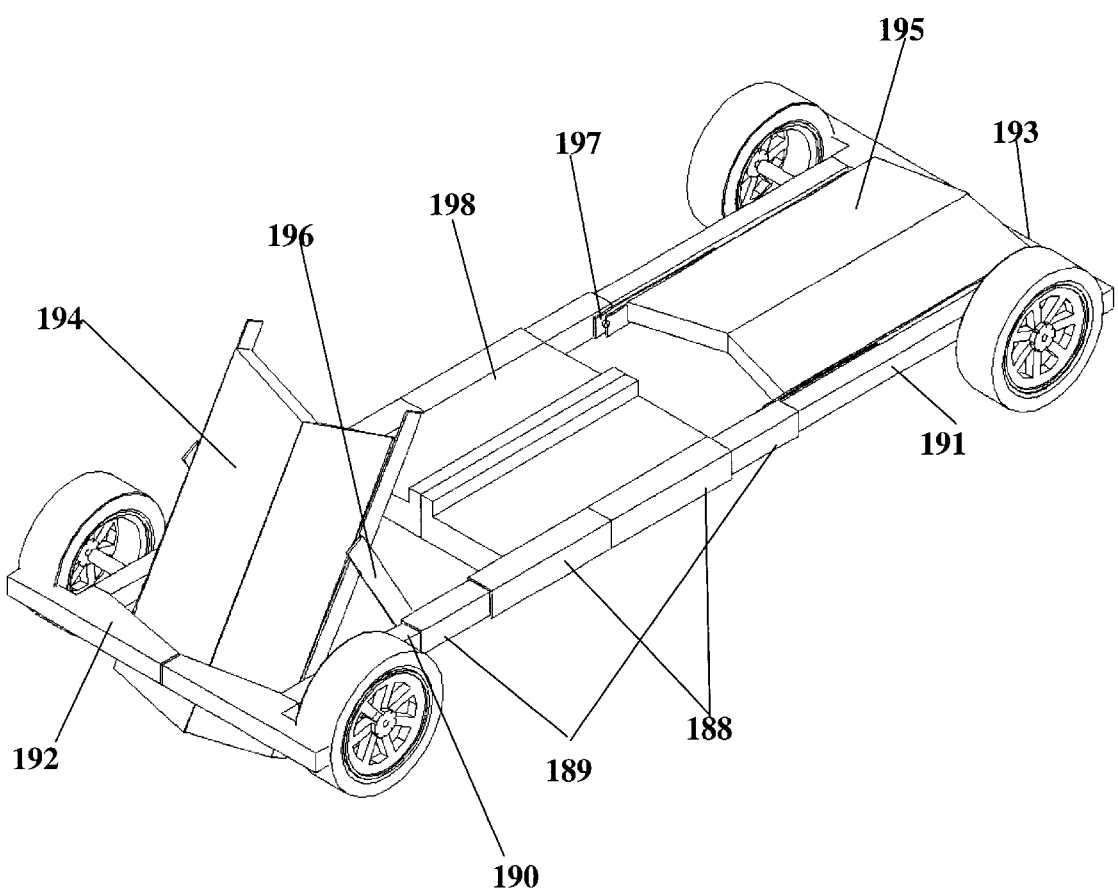

Embodiments, particularly those that utilize the indo-skeletal structure may include the following additional embodiments and variations thereof as support arrangements for a passenger environment and for frontal and rear impact protection in a safe passenger environment and passenger comfort and convenience. The additional structure is illustrated in FIGS. 20 A,B and C. The passenger support platform (198) represents the set of machinery for that purpose. It will take the shape needed to support the variety of structures that are described in this invention. It is supported either in the middle or on the edges by the Central body tubes (188) said support being on attachment surfaces of said central body tubes. The first tube that fits into the central body tube is the Body extender tube (189). This optional tube is slidably connected to the central body tube and may be moved in and out by servo motors or pneumatic/hydraulic pistons and cylinders (the "first motion control elements"). However the inner tube is axially supported by a compression resistant shock absorber (the "first shock absorbing elements") which in turn is mounted rigidly with regard to the outer central body tube in all positions that the body extender tube can take. The Body extender tube (189) has functions that include extending the wheel base of the vehicle under computer control particularly in drive by wire vehicles, thereby improving the comfort of the vehicle and second increasing the wheel base contingent on vehicle speed such that in the event of a collision there is a longer deceleration space. The shock absorber will become longer and shorter to accommodate this need and can for example be air shock absorbers. The correlation of speed and length will normally be computer controlled to provide statistically appropriate deceleration distances for the speed of the vehicle at any time. Notably the steering arrangements and other vehicle systems may also need to be compensated to accommodate the change in wheel base to ensure driver convenience and precise control of the vehicle. The Front end connector tube (190) has a shock absorber (the "second shock absorbing elements") in series with a servo or pneumatic/hydraulic controlled actuator (the "second motion control elements") for axial movement in and out of the body extender tube (189) as does the back end connector tube (191). 190 and 191 are connected to the front and back ends respectively (192,193) which include the front and back wheels and bumper arrangements. The front module (194)—which may be the engine or hybrid unit is pivoted on brackets at the front end of the front end connector tube, thereby allowing the module to rotate upwards about this pivot. Notably the modules (194, 195) will be significantly massive and will require strong supports and pivots. The front module crank (196) is pivotally attached to the body extender tube and also pivotally attached to the front module as shown in FIG. 20 A. Similarly the rear module crank (197) moves the rear module. Therefore if there is a movement of the front end towards the body extender tube the front module crank would swing the front module about its pivot in the front towards the vertical direction.

There are at least two functions for this motion. First in the event of a front collision the force will compress the shock absorbers on the end of the front end connector tube and thereby force the crank to pivot up the front module. This angular acceleration of the massive front module (massive element) will absorb energy of the impact and acting as a "fly wheel", remove acceleration spikes that the passenger would otherwise sustain and in addition due to its vertical acceleration increase the traction on the front wheels thereby increasing the braking friction resistance that can be offered because of an increased force on support surfaces. In addition the kinetic energy of the impacting object will be converted to heat energy in compressing the shock absorbers. Finally in the event of a collision the inclining front module will divert the impacting vehicle over the passenger space. This action is illustrated in FIG. 20 C. Second, particularly for drive by wire vehicles, the front and back end connector tubes may be retracted by servo or pneumatic/ hydraulic arrangements, to pivot up the front and back modules thereby reducing the vehicle length substantially and providing better curb visibility to the driver particularly while parking. This is illustrated in FIG. 20 B. Notably the wheels are maintained in the same orientation to the road surface and may be steered as desired with the same mechanisms. For conventional vehicle architectures the pivot of the front module and engine with the front end connector tube should be near the wheel axis to facilitate this additional feature.

The same value is derived in the rear structure as the front structure for rear collisions and in front collisions and in parking. The arguments are similar.

Another embodiment may have a single but broad set of central body tube body extender tube and the back/front end connector tubes with a split front or back module and connection of the front/back connector tube with the front/ back ends respectively in the middle. Yet another configuration may have a single central body tube and body extender tube but then have a "T" shaped structure on the back or the front to have separate left and right front and/or back end connector tubes connected with the front end at either side. In the event the body extender tube is not used the connection of the front/back module cranks will be to the central body tubes.

For embodiments that use an exoskeletal or shell design, an additional embodiment deploys airbags in the space surrounding the engine components to change the characteristics of the crumple zone. Moreover in addition some of these embodiments have the passenger cabin slidably and detachably connected to the rest of the vehicle and mounted behind these deploying airbags such that on impact, the cabin detaches from the vehicle and slides backwards in a controlled fashion to ensure the integrity of the cabin.

ALTERNATIVE EMBODIMENTS

In an alternative embodiment to the preferred embodiment, the present invention may use hinged Protector Shields (106) that lock into the Primary Slide (107) when closed. This will allow the arrangement to work for mounting and dismounting the vehicle with either the Primary Slides deactivated or non-operational as well as when they are functional. The seats may also be mounted on rotating mechanisms or extension arms rather than a primary slide, to assist passengers in mounting and dismounting.

Another alternative embodiment utilizes co-axial sliding mechanisms that constitute said rotating mechanisms rather than the primary slides such that the fixed and rotating members of said rotating mechanisms have an adequate area of contact and reaction to support lateral collision forces.

Another alternative embodiment is illustrated in FIGS. 5A and 6A. The "door" that contains the perforation shield (105) with distance/velocity sensors (113), the external airbags (104), the shock absorbers (103) and the protector shields (106), hinges down on the pivot (112A) to provide support for the safety beam upper element/upper primary slide. The inner surface of the Protector shield is designed to perform the function of the Safety Beam Lower Element/ lower Primary slide (102). This embodiment will be particularly useful for larger vehicles with a plurality of seats on each side of the vehicle. These multiple seats may be mounted on separate sections of upper primary and secondary slides.

Another alternative embodiment is illustrated in FIGS. 1D to 4D where the Shock Absorbers (103) excluding the External Air bags (104) are mounted on the inner surface of the protector shields (106). As may be seen from the drawings, in this particular embodiment, the shock absorber excluding the external air bags are locked directly to the Safety Beam Lower Element/lower primary slide (102) in the operating position, although in another configuration the locks my be between the protector shield and the lower primary slide in the operating position. Such embodiments may be designed to allow limited intrusion of the protector shield with resistance provided by the shock absorber (103) thereby reducing the peak acceleration sustained by the vehicle body under impact. Notably, as the passenger environment is protected and moves away from the impact, crush injury to the passenger is avoided. This is a unique feature of this invention where both the crush injury of the passenger and the peak acceleration of the vehicle (and the passenger as a result) may be minimized at the same time. Conventional designs try to minimize intrusion by bracing the side of the vehicle with beams and thereby increasing the peak acceleration of the vehicle, or increasing intrusion to reduce the peak acceleration but allowing greater crush injury.

Another alternative embodiment may have a contoured safety harness with a different shape to that of the preferred embodiment. FIGS. 12 A1 to 12 C1 illustrate an embodiment of a safety harness using a slightly different geometry but performing the same function in the same way as in the preferred embodiment.

Some embodiments of the multi-element contoured seat may have sides that fold down and away from the passenger. This feature is useful for the inner side of the passengers near the side of the vehicle and for both sides of the passengers in the middle of the vehicle, if the center seats are fixed and not eject able. Notably however, the sides lock in the operating position and brace the seat from lateral compression, thereby protecting the passenger.

Some embodiments of the seats may have sides that could include arm rests, side bolsters and other elements as disclosed in this invention, that that drop down or back on the door or access side at the time of egress and ingress, particularly in embodiments that use conventional doors for access. Activation for these movements can be with the switching on and off of the ignition switch for the vehicle.

Yet another embodiment raises he seat bottom at the time of egress and ingress with servos or pneumatic/hydraulic systems, so that the seat members on the sides of the sat are relatively lower to the seat bottom thereby facilitating egress and ingress of the passenger. Moreover, arrangements to raise the seat bottom may in addition in some embodiments help negotiate a high "door" sill by the sliding or rotating seats at egress and ingress.

Yet another embodiment using conventional doors, has the arm rests on the door side integrated in to the doors but protected and decoupled from the door members on its outside by inside air bags. This design would have these arm rests locking into the seat when the door is closed thereby providing the decoupling for the entire seat with the inside airbag during lateral impact.

Another alternative embodiment uses shock absorbing devices mounted at each end on each of the two surfaces of the impact decoupler/secondary slide substituting or supplementing the inside airbags.

Figure 4G:
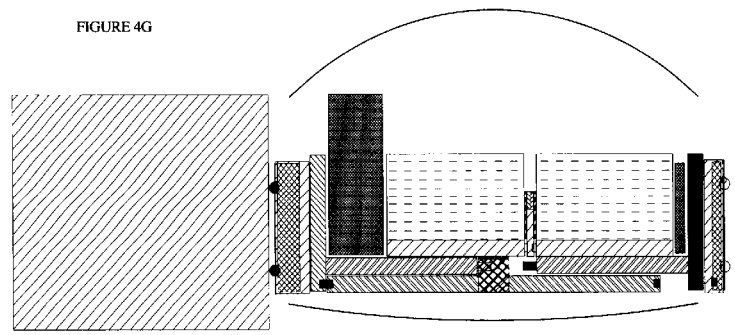

Another alternative embodiment may have an auxiliary slide behind the seat and of any convenient height. This embodiment is shown in FIGS. 1C–4 C. The figures illustrate the working of the current invention with a high section of the central member of the indo skeletal structure behind the seats, but abutting the auxiliary beams in the operating position. As the High section of the central member (101) is behind the seats and the secondary slides (111), the seats and the secondary slides are free to move across the vehicle under impact as shown in FIG. 4 C.

Yet another alternative embodiment has an external seat profile as illustrated in FIG. 12 E1. The higher rectangular external profile provides greater protection to the passenger.

Figure 10:
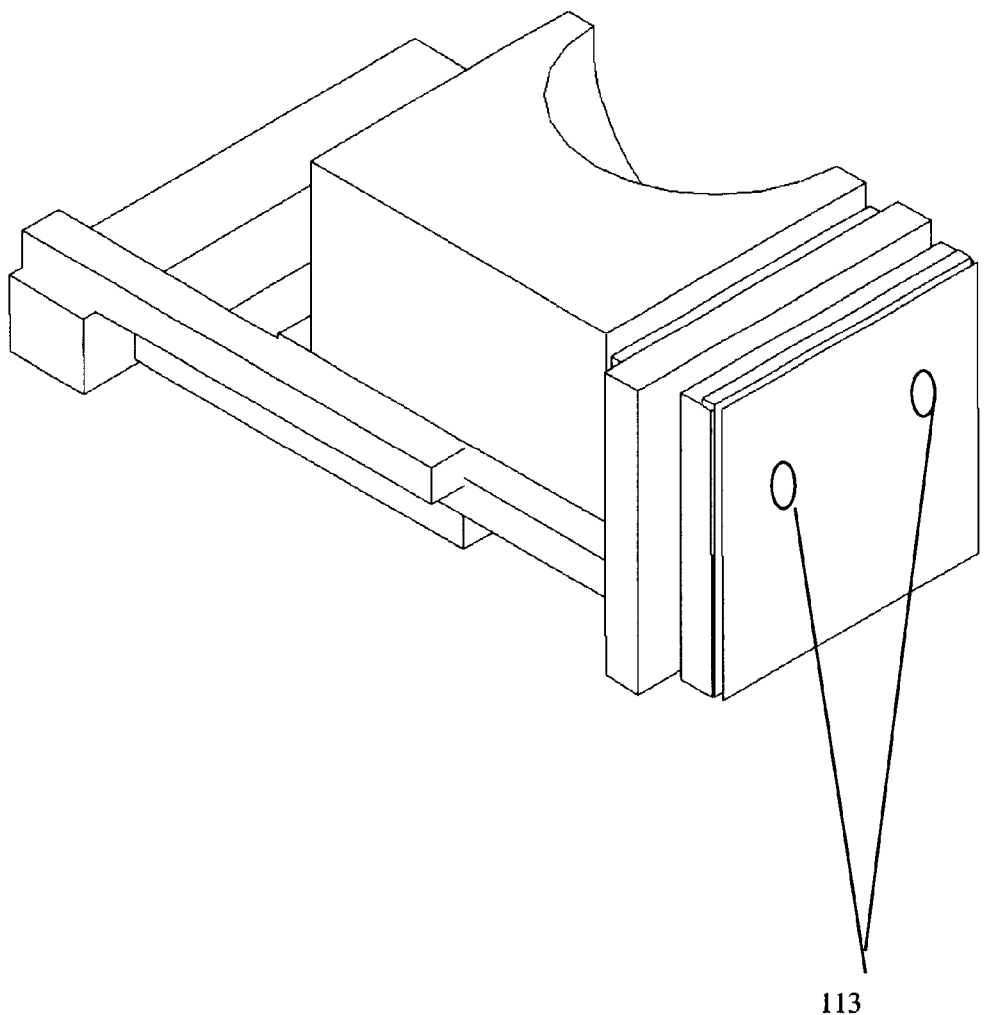
Figure 10:
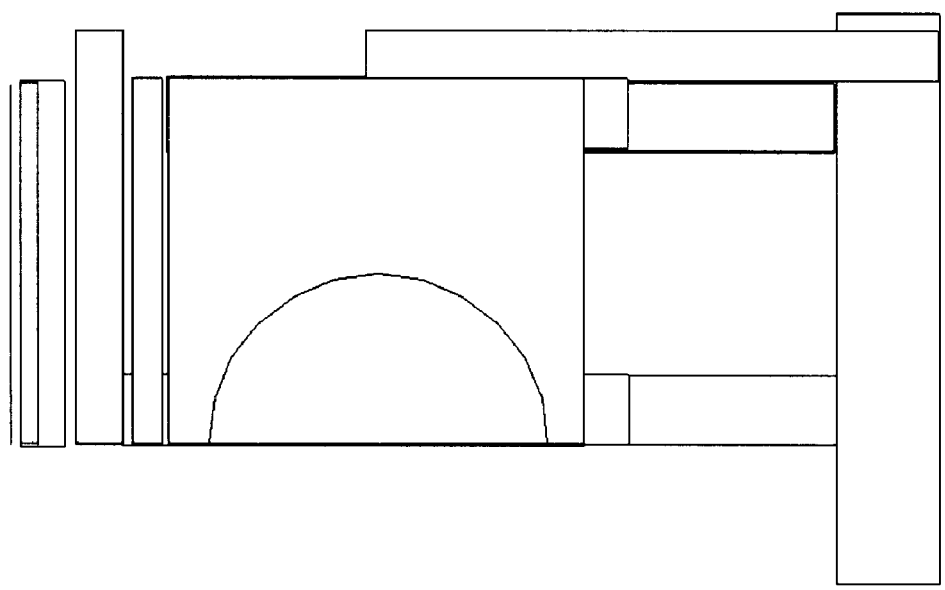
Figure 10:
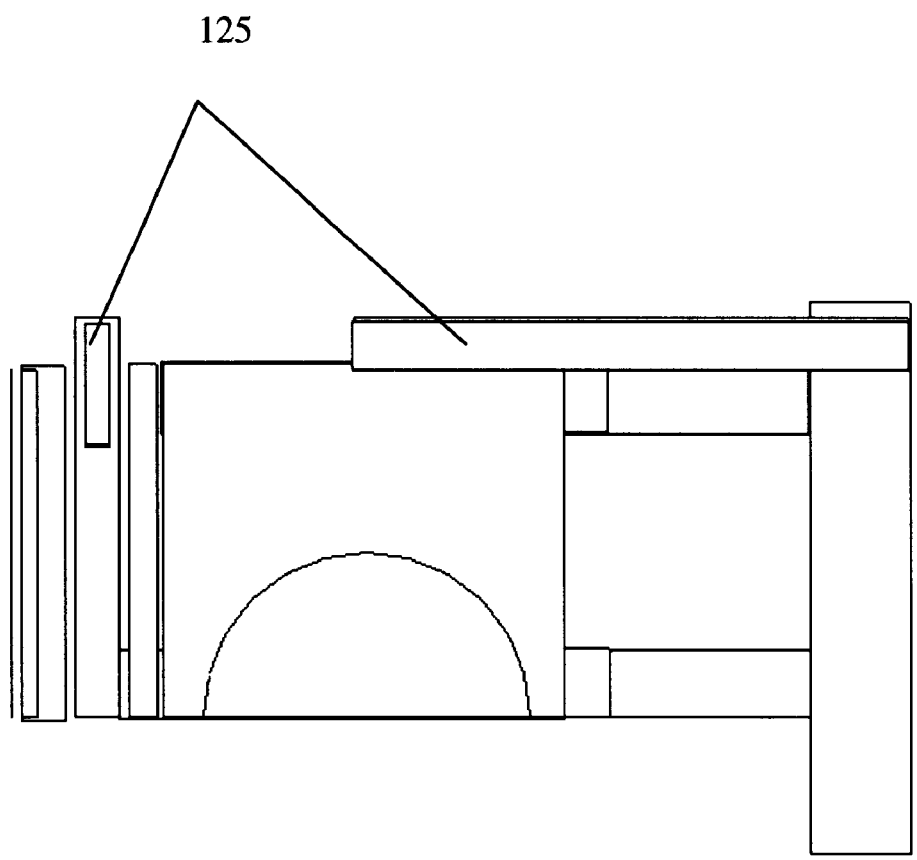

Yet another alternative embodiment has a vertical extension/"safety cage" (125) as shown in FIGS. 10 A1, 10B1 and 10C1. Here the vertical extension/safety cage engages a beam across the top of the vehicle that may be supported by the shell structure of the vehicle (the figure shows only half the width of the vehicle). Such a safety cage/vertical extension can provide protection in a roll over situation and also provide additional compressive strength for the vehicle, and may function as a fixed or retractable roll bar. In some embodiments such a vertical extension "safety cage" will perform the function of the "B" pillar of the vehicle under lateral impact. Notably no "B" pillar is needed to support rear door hinges in the present invention. Moreover, in some embodiments the beam arrangement across the top of the vehicle or other support structures on the roof section of the shell may be designed to be rigid on compression but telescope out with the secondary slides under impact using appropriate logic to drive the locking mechanisms, thereby providing a protective cage even when the seat is in the ejected state.

Yet another embodiment, deters a roll over following side impact, by implementing an "outrigger" arrangement having reinforced safety beam upper element/upper primary slides and/or secondary slides and bracing brackets anchored to the fixed members of the vehicle that hold these slides in their extended substantially horizontal position after extension under impact, without permitting them to buckle under vertical forces encountered under the initial stage of a roll over situation.

The preferred embodiment has the external airbags or shock absorbers triggered on detection of an expected impact as noted. This implies that on the far side (non-impact side) if there is possible secondary impact from a second object, the same mechanisms will deploy the external airbags on the second side, thereby protecting the far side occupant in the event of a second object hitting the vehicle soon after the first. An alternative embodiment can have distance/velocity sensors mounted in positions on the front and back edge of the perforation shields or protector shields to facilitate better detection of objects approaching the vehicle at wide angles to the perpendicular direction. Yet another alternative embodiment to this will have both impact side and far side external airbags deploy on detection of the first impact.

Another alternative embodiment has a safety harness/shield as illustrated in FIG. 12H2. This embodiment of the safety harness is mounted on spring loaded hinged supports (137) at the head support section of the multi element adjustable seat—similar to conventional supports for the headrest, and to lockable supports (138) between the arm rests or on the side bolsters of the multi element adjustable seat. The spring loading will support the weight of the harness and thereby retract the harness when unlocked. The harness includes a hinged and spring mounted shield (130) that may pivot on the lower safety harness support (138). The passenger side of the shield, has on its surface an implementation of a Passive Air Cushion System that uses the pressure in one or more sacrificial chambers which under pressure transfer air to one or more micro-air cushions that protect high priority anatomical regions. In this embodiment, the passive anatomical micro air cushion (131), derives it inflation source from the sacrificial chamber (139) at the lower end of the shield of the safety harness, that is compressed by a much greater body mass under impact. In a frontal collision the force of the more massive parts of the body on the sacrificial chamber will deploy the passive anatomical micro-air cushions to protect the face and the neck. The narrower sections of the aircushions and flow control mechanisms if installed, will cause some visco-elastic behavior and in addition cause air speed amplification to create faster deployment. While this mechanism activates the shield (130) may pivot down to take some of the impact energy. The shield is shaped to the contour of the human body head and neck when it is forced forward as in a frontal collision. This embodiment may in addition have multiple or variable position harness support anchor points on the arm rests or the side bolsters that are part of the multi-element seat, to accommodate people of different proportions. Moreover this embodiment may have in addition an additional bracket that moves the anchor point of the lower safety harness locking supports substantially forward, and provides a supplementary passive anatomical micro-air-cushion that can be mounted on the permanent micro-air-cushion on the shield, to accommodate pregnant women, and the special critical force distribution they can withstand.

In this embodiment, the two pivoted arms swing forward under collision forces the moment created by the shield with the body pressure against it, and extends the upper extending arms (133) to absorb some of the shock and to provide a space for the forward movement of the upper body. The elbows (132) facilitate the relative angular movement of the upper arms and lower arms of the safety harness (133,134). They are spring loaded to ensure that they support the lower parts of the harness when unlocked to allow the entire harness to move up and away from the body when unlocked without any force being applied. Under side impact the passive anatomical head and neck micro-air-cushions deploy to protect the head and neck under relative lateral acceleration. Notably the passive anatomical head and neck micro-air-cushions can be actively deployed or as in this embodiment passively deployed by a discharge of air from sacrificial chambers between the seats or on the outer surface of the seats and mounted on each of the seats, so that lateral pressure will inflate the anatomical head and neck micro-air-cushions. The sacrificial chambers offer secondary impact protection by cushioning the seat. Notably this embodiment does not use any active airbags in the vicinity of the human body, reducing the risks associated with the high energy external deployment devices. The adjustable head rest (136) follows conventional design but is here mounted on the safety harness hinged mounts.

FIG. 12 I2 shows the passive anatomical micro-air-cushions deployed (the sacrificial chamber has been compressed and the top region is full and ready to protect the face and neck in a frontal impact. FIG. 12 J2 shows the anatomical head and neck passive micro aircushions deployed under side impact, ready to support the head and neck in a side collision. Notably this embodiment uses a new concept where the impact energy is redeployed for protecting vital parts of the impacted object which are often embedded inside the object, using fluid transfer—in this case air transfer. Force and velocity amplification or deamplification can be achieved with the geometry of the interconnections, the sacrificial chambers and the micro-air-cushions. The sacrificial chambers can be used for secondary impact protection as well by carefully controlling the flow parameters. This is illustrated in FIG. 17. The approach obviates the need for active airbag technologies in the vicinity of sensitive equipment, living organisms and indeed people.

Figure 16A:
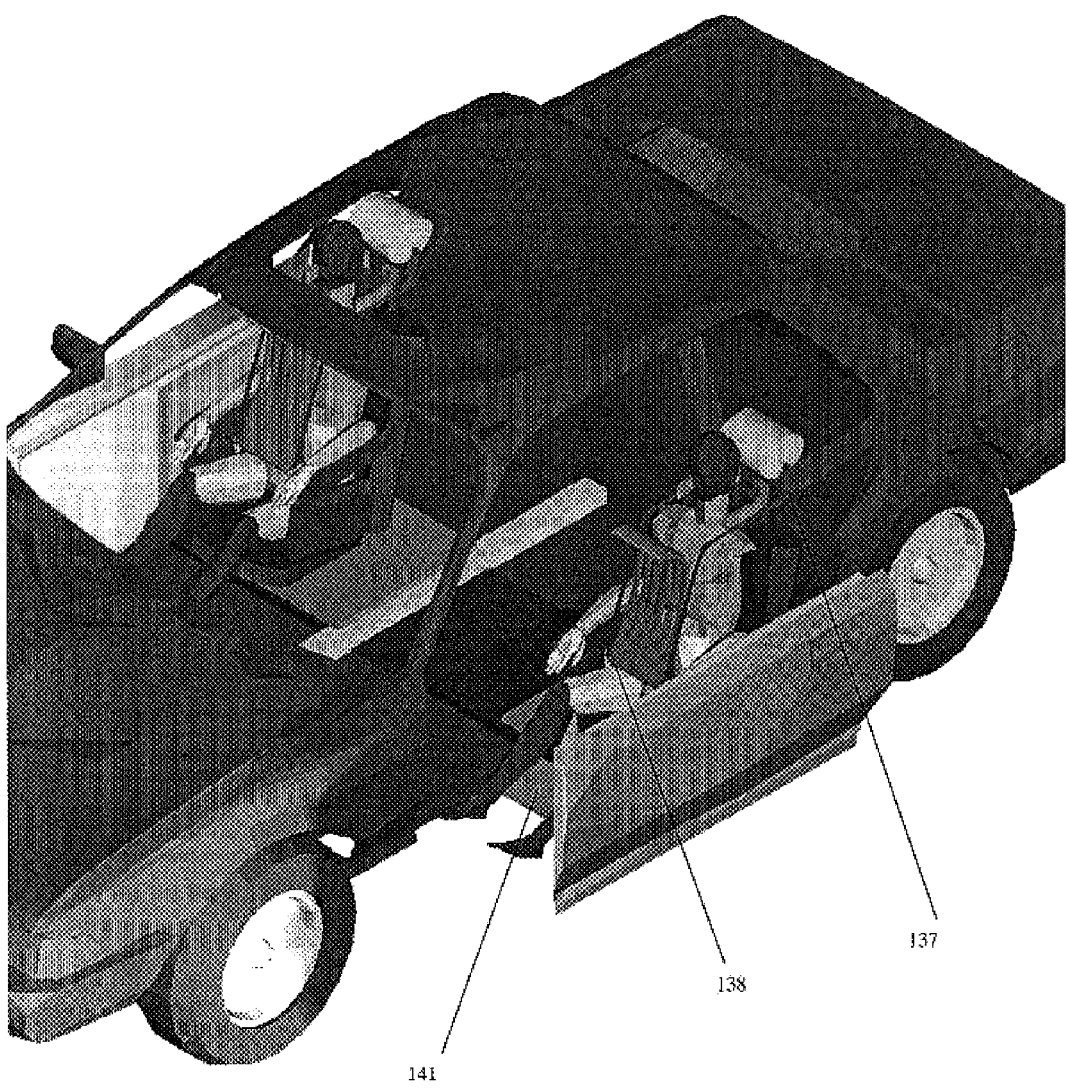
FIG. 16A illustrates a passenger ready to leave the vehicle. The safety harness/shield is still in place.
Figure 16:
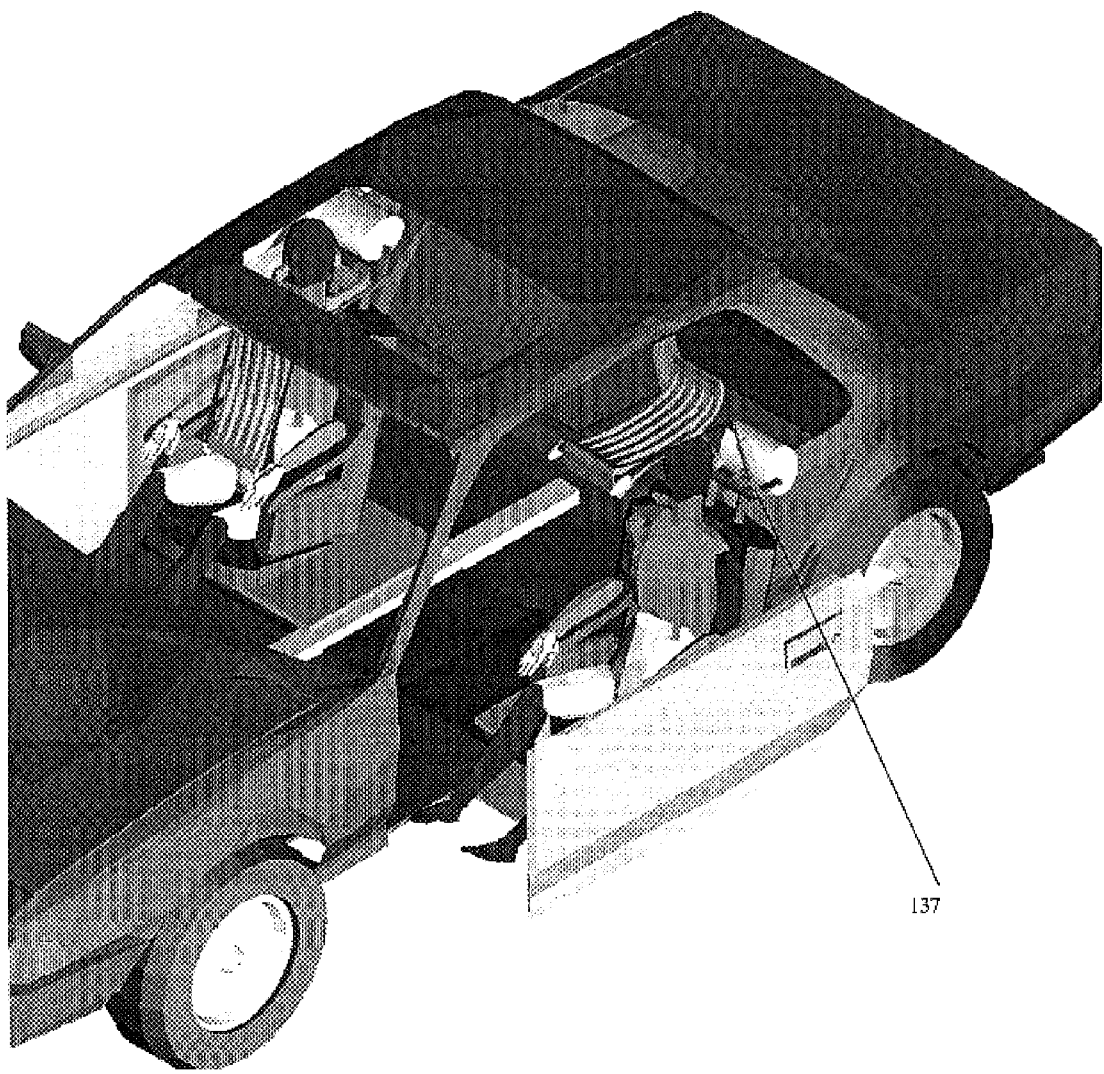
FIG. 16B shows the passenger in FIG. 16 A after releasing the safety harness/shield from the locks.
FIG. 16D shows the safety harness/shield unlocked from its mounts within the vehicle, illustrating the flexibility to move within the vehicle under these conditions but not having the visibility to drive, thereby ensuring that the safety harness/shield is used under driving conditions.
Figure 16D:
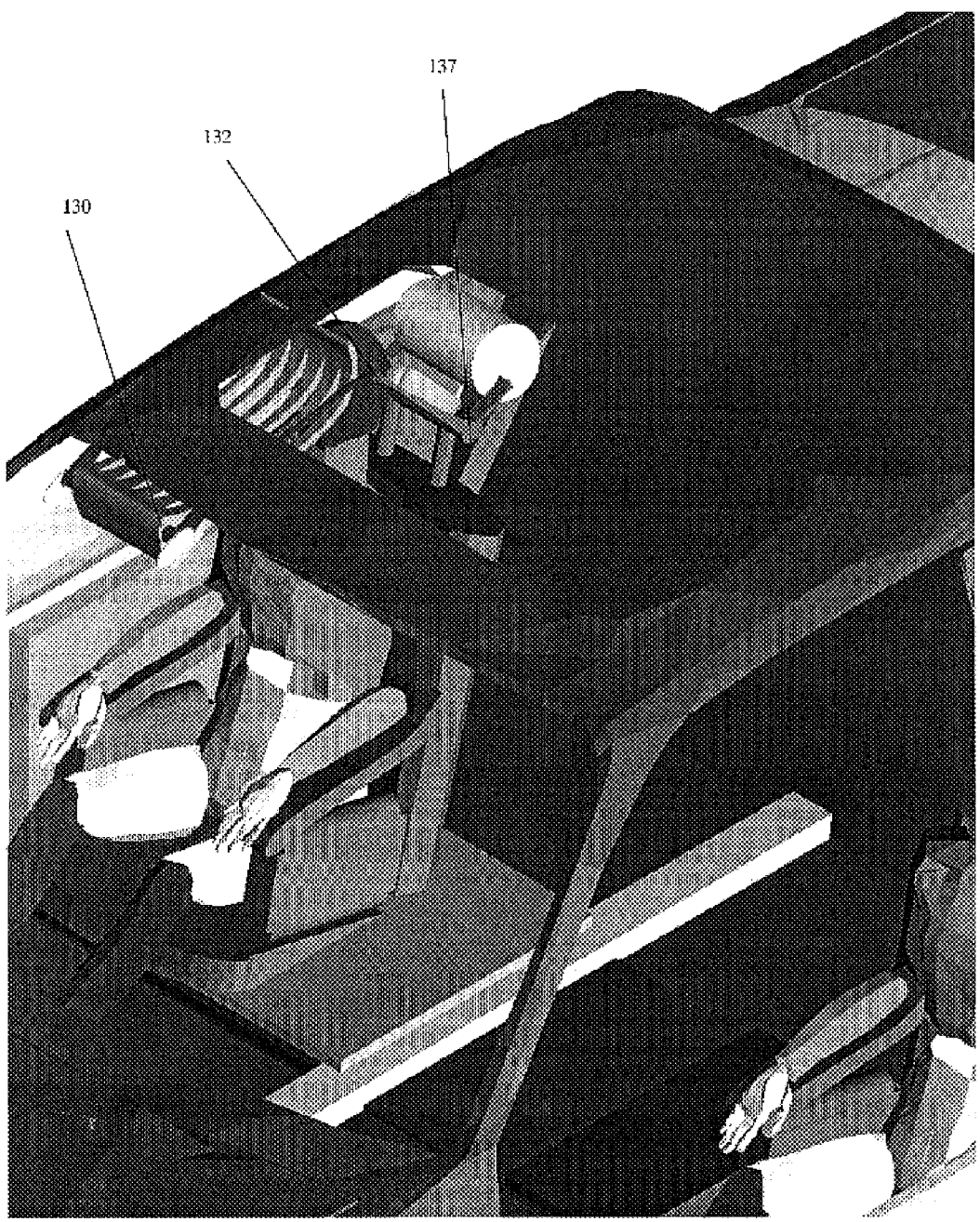

This embodiment of the harness allows movement within the vehicle for passengers when it is unlocked and allowed to swing up within the vehicle as shown in FIG. 16D. However, visibility is somewhat obstructed preventing the driver from driving without locking the harness in place.

In this embodiment of the safety harness entering and leaving the vehicle are facilitated by the entire device swinging away from the body as shown in FIGS. 16 A,B and C. The passenger simply needs to stand up to leave. To enter the passenger simply sit down and place his/her feet on the foot rest (141) and retract the slider mechanism. This embodiment also has radar or infrared detectors as on elevator doors to detect limbs in the way of the retracting sliding mechanism for the protection of the passengers.

FIG. 15C shows the parts of this embodiment and the adjustable arm rests.

Another embodiment of the shield on the safety harness has a folding section at the top that can be straightened and locked in place for adults and folded down for children.

Another embodiment uses flexible netting on part of the shield surface to protect passengers under impact. In this embodiment, the shield has a frame on which the netting is deployed. The upper end of the frame is adequately bent forward and then downwards to ensure that the passenger head and neck do not strike the frame under frontal collision. In yet another embodiment of this arrangement, the shield of flexible netting is designed for the head and neck and is normally retracted forward, and deployed on impact by initial forces by the lower torso of the passenger against the lower part of the safety harness/shield.

Yet another variation of this safety harness with netting on a frame, has telescoping frame members on the sides so that the height of the frame is adjustable by retraction of the telescoping members to accommodate children and small adults.

Yet another embodiment of the harness has an upper section of the safety harness consisting of spring mounted support arms mounted in the vicinity of the head rest and designed—when pulled down by the passenger—to swing down and over the passenger head and in front of the passenger. The support arms each having telescoping sections that connect to the shield, such telescoping sections having arrangements for an inertial ratcheting that prevent extension of these telescoping arms in the event of a sudden tension as in an impact. The lower section of the harness consists of short adjustable belts or arms that can be locked on the sides of the seat or on the inside of the arm rests as in a four point seat belt. This embodiment provides all the benefits of a four point seat belt but in addition has the benefit of head and neck support in the event of a collision. This arrangement allows protection with the telescoping sections and the adjustments on the lower end of the harness for different sized passengers.

Yet another embodiment utilizes the passive anatomical micro air cushion (131) at the top of the shield/harness that derives its inflation source from the sacrificial chamber (139) at the lower end of the safety shield/ harness. However, in this embodiment the anatomical micro air cushion is limited to only the top edge of the shield to support the head, neck and the upper thorax when deployed under collision conditions. This anatomical micro air cushion (131) is supported by pairs of telescoping tubes the lower member of each such tubes being fixed to the harness/shield support in the vicinity of the sacrificial chamber, and the upper member of each pair of telescoping tubes are attached to the passive anatomical micro air cushion (131). The outer tubes have contoured semi-rigid materials to conform broadly to the body shape. The lower and upper members of each pair telescope into one another co-axially, and are lockable in different longitudinal positions relative to the other member of the pair, thereby providing for a variable height anatomical micro air cushion. Airflow under deployment conditions is conducted either directly through said telescoping tubes or separate tubes that have an "accordion" collapsible structure that can extend as the telescoping tubes do, and may be placed inside said telescoping tubes. The length of the telescoping tubes may be manually set with the locks or in other embodiments set by automated or computer controls that sense the size of the passenger from selected elements of the multi-element contoured seat.

Yet another embodiment has a harness as in FIG. 12H2 except that there is a safety harness support arm only on the outer side of the passenger towards the side of the vehicle. (i.e in some of these embodiments there is one Safety Harness elbow (132), one Safety Harness extending upper arm (133) and one Safety Harness Pivoting lower arm (134). Moreover the safety harness/shield support arm is designed such that upon release from across the lap of the passenger, the shield flips to a vertical plane in the vicinity of the vertical plane of said support arm. Thereby permitting the safety harness to swing over the head of the passenger even when the seat is only partially displaced for entry or exit from the vehicle. Often this may be useful when there is limited access space next to the vehicle.

Yet another embodiment, principally for vehicles with drive by wire technologies, has the vehicle controls mounted on the shield. If a steering wheel is used this may be mounted on the front surface of the shield (on the surface opposite the passenger). The steering wheel or other controls may have distance adjustments for ergonomic positioning.

Yet another embodiment principally for drive by wire technologies, has the driver controls mounted on the contoured arm rests of the car. Adjustments for the arm rests will include further controls for the ergonomic positioning of these controls on the arm rests.

Vehicles, principally those that utilize drive by wire technologies with either of the above configurations, will have the entire area below the windshield free of controls. This embodiment utilizes this area for a GPS driven positioning display that mimics the view ahead of the driver. The display system may use vector imaging techniques or non-linear image mapping techniques that are well disclosed in the background art that provide the same perspective to the driver on the display as what he sees on the road ahead, thereby minimizing mental processing of information in establishing a correspondence between the image and the actual physical position and orientation of the vehicle thereby reducing reaction time for action by the driver. Furthermore, the positioning of the display just below the screen ensures that there is minimal spatial disorientation of the driver in turning his/her head to look at the screen thereby reducing further the mental information processing needs and improving further the reaction time of the driver. In some embodiments when there are controls such as a steering wheel in front of the driver, a fixed or a "pop up" screen just below the windshield or a projection onto the lower windshield may be utilized. The image may include the destination and path to that destination and may be at a different scale to the perspective of the driver ahead of the vehicle. This embodiment and variations provide a unique system that conventional GPS navigation systems do not provide in speeding up driver reaction times.

Another embodiment has air conditioning micro-ducts on the seating surfaces and the safety harness/shields, for the comfort of passengers, particularly in open vehicles.

Another alternative embodiment has the "Open" switch for the slide on the inside of the vehicle designed the "press bar" so that the intuitive reaction of the passenger to "open the door" is harnessed. However, this can be deactivated when the vehicle is in motion.

Another alternative embodiment has a center console that is designed to crush under impact as shown in FIGS. 1F—4F, thereby minimizing the ejection of the far side passenger on impact.

Another alternative embodiment has the internal airbag partially filled at all times, so that in the event of no deployment of the external airbags either because of technology failure or non installation or other reason, the passenger and seat arrangement are cushioned even prior to further inflation of the internal airbag on deployment on impact. Shock absorbers may supplement the operation of the internal airbags in this embodiment with partially inflated internal airbags under normal operating conditions.

Another alternative embodiment can have the internal airbags deployed on impact as noted with such deployment effected by inflation by some of the compressed air of the external airbags on impact, thereby providing "acceleration de-amplification" for the movement of the passengers on impact.

Yet another embodiment has proactive sensors deploying the internal airbags directly, without the installation of external airbags.

Yet another embodiment of the invention has a retaracting canopy stored in the roof of the vehicle, and attachable to the protector shield or attached components such as the side window, when desired. When attached, the canopy will deploy over the seats when in the extended or loading positions, thereby protecting the seat and the passenger from rain or other snow while entering or leaving the vehicle.

Yet another embodiment has external airbags constructed using the Passive Air-Cushion System with micro chambers that are connected to each other by restricted paths that provide visco elastic energy absorption in the event of some sections of the airbag being impacted while others are not, thereby forcing air from the compressed micro chambers to the other micro chambers, each of the micro chambers functioning as either a sacrificial chamber or a Micro Air Cushion on impact. This embodiment may of course have external airbags proactively deployed in the manner described herein, prior to impact and their performance as Micro Air Cushion systems. Yet another variation may include one-way valves between the chamber directly connected to the inflation source and each of the micro-chambers (implement able for example with flaps against an aperture) so that inflation may be achieved rapidly, and then the Passive Air-cushion benefits realized on impact.

Yet another embodiment uses the Passive Air-cushion system to protect passengers from "Whip Lash" injury, by providing Micro Air-cushions in the vicinity of the head and neck, and providing sacrificial chambers that are compressed in the event of a rear end collision. In some embodiments the sacrificial chamber can be mounted below the seat with one face mounted to the vehicle structure and the other face mounted to the seat of the passenger, the seat being mounted to the support structure to allow controlled limited rearward movement relative to its mountings to allow compression of the sacrificial chamber by the inertial mass of the passenger and seat on impact.

Yet another embodiment utilizes multiple adjoining but separate Passive Air-cushion systems where one such system connects the external airbags (sacrificial chambers) with internal airbags (micro Air-cushions), and another such system connects different and distinct internal airbags (sacrificial chambers) to micro Air-cushions in the vicinity of the passenger's body, thereby creating a cascading system of Passive Air 30 cushion systems. These embodiments may of course have external airbags proactively deployed in the manner described herein, prior to impact and their performance as Micro Air Cushion systems.

Yet another embodiment utilizes an auxiliary brake attached to the secondary slides in addition to the friction limited sliding arrangements of the secondary slide, to provide a further control on the rate of movement of the secondary slide under side or lateral impact.

Yet another embodiment utilizes a foot safety switch attached to the foot rest, that activates the sliding mechanism to move the sliding seats into and out of the vehicle. The foot rest in some such embodiments may be bar that is depressed to move the slide into and out of the vehicle. These foot rests being designed to avoid ankle injuries in the event of rear collisions sustained by the vehicle.

Yet another embodiment uses supplementary porous filling materials within prefilled internal airbags designed with suitable vents to change the compression characteristics of the inside airbags under impact.

Yet another embodiment utilizes pressure memory capable materials on the surface of the seats or passenger supports so that surround seats contour to the exact shape of the body for further comfort of passengers and also better support under collision conditions.

Figure 18:
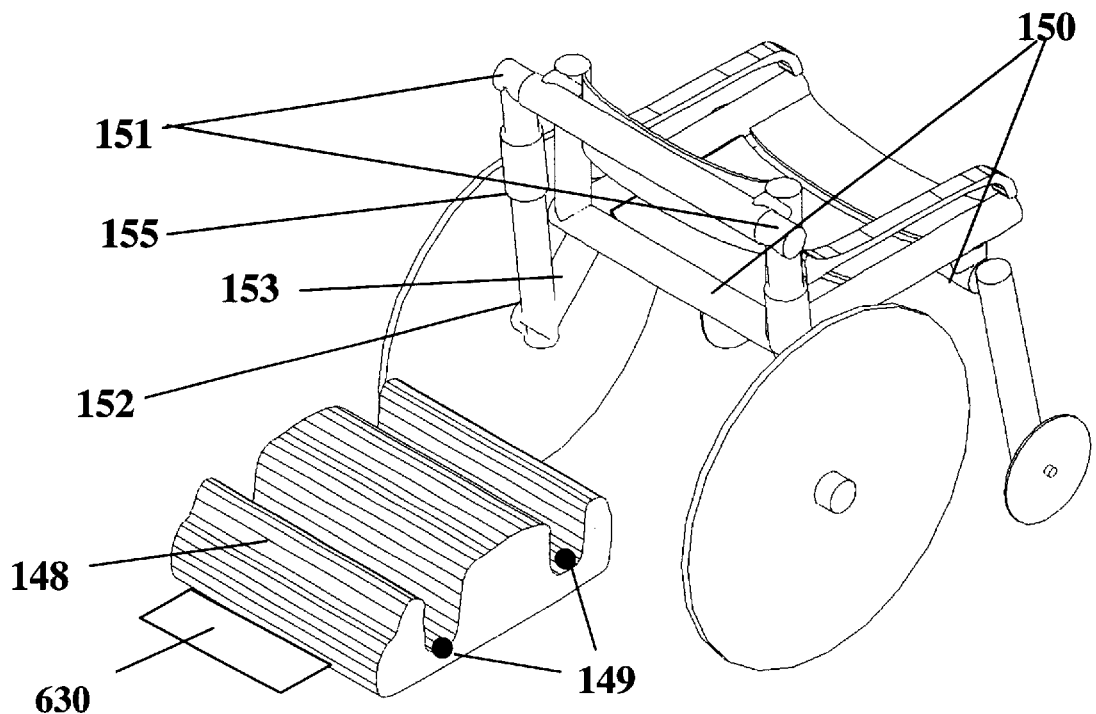
FIGS. 18 A–J shows different views of the wheelchair arrangements deployed as passenger support mechanisms.
Figure 18:
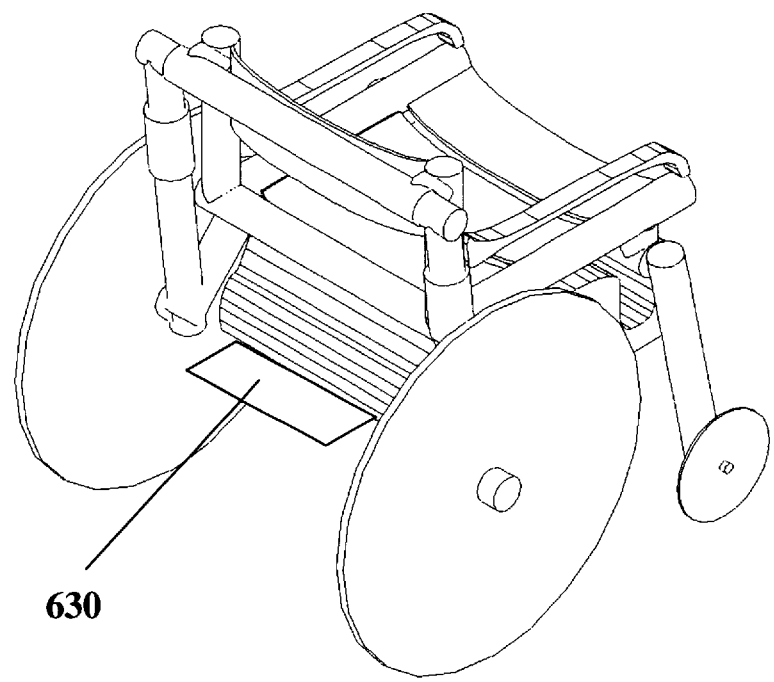
Figure 18:
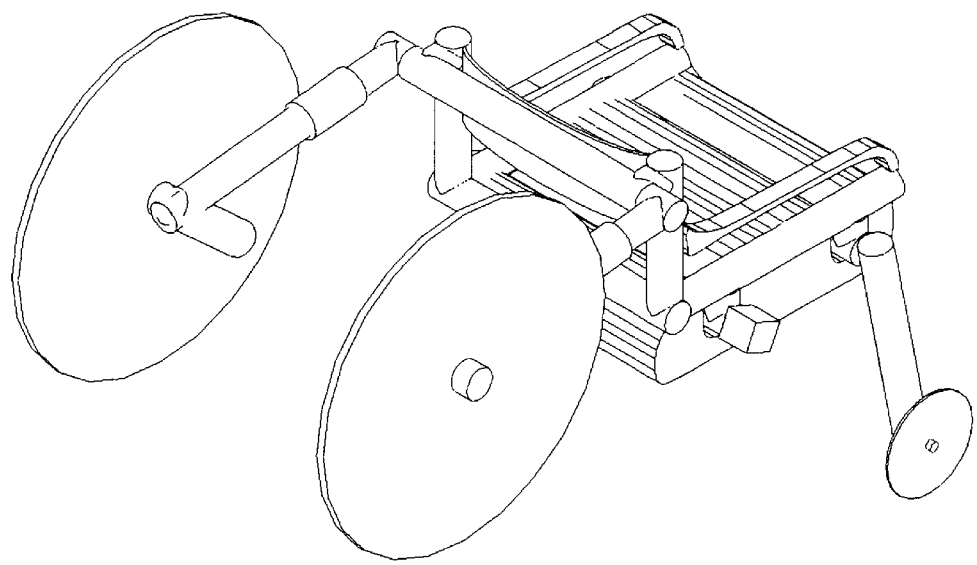
Figure 18:
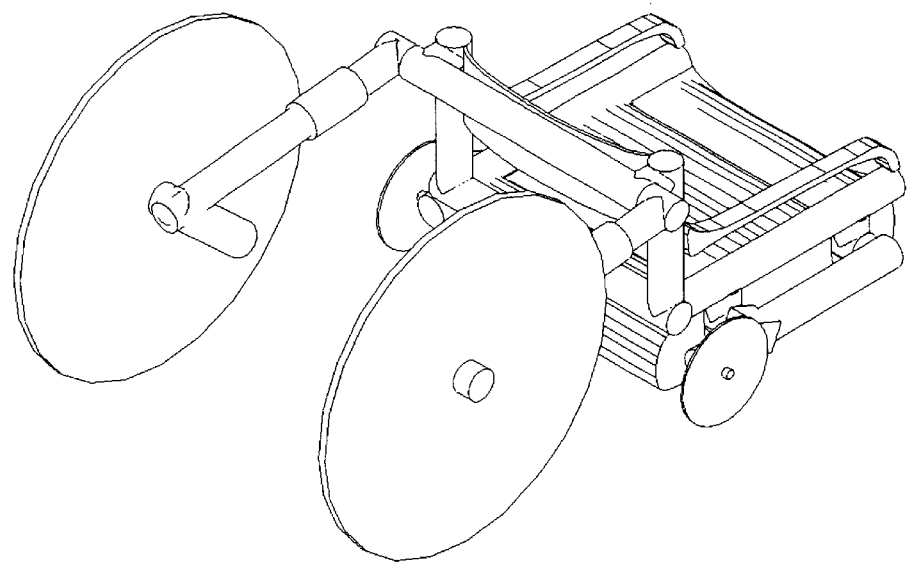
Figure 18:
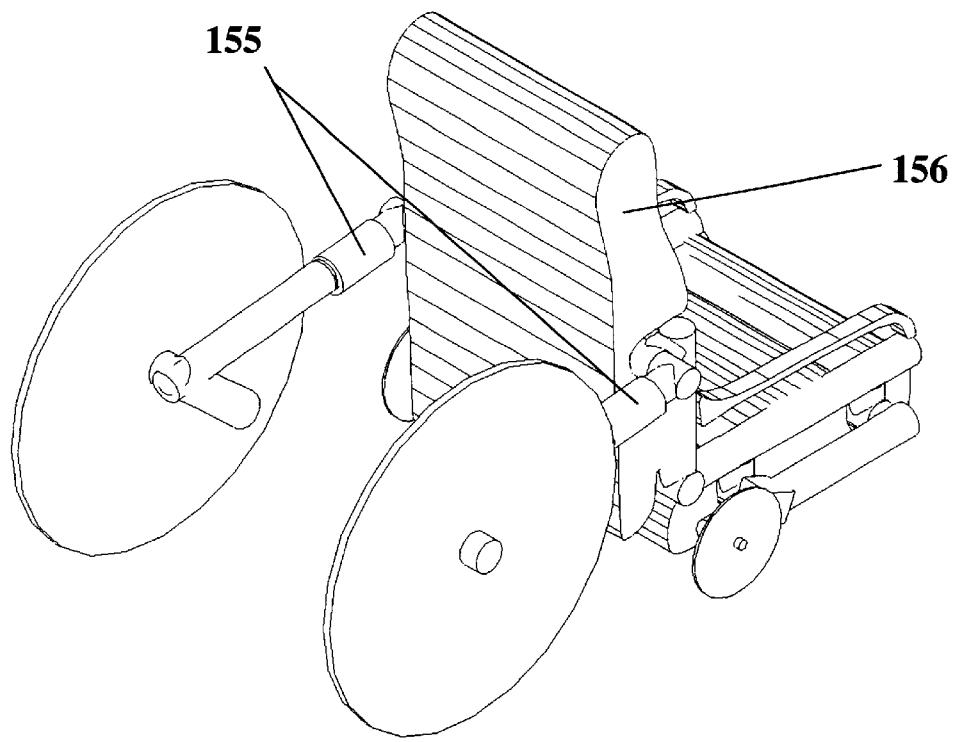
Figure 18:
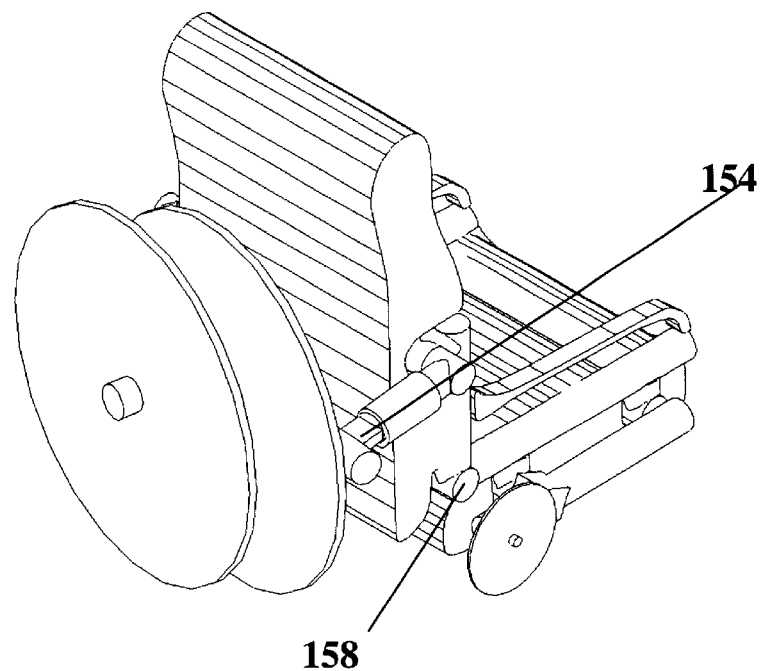
Figure 18:
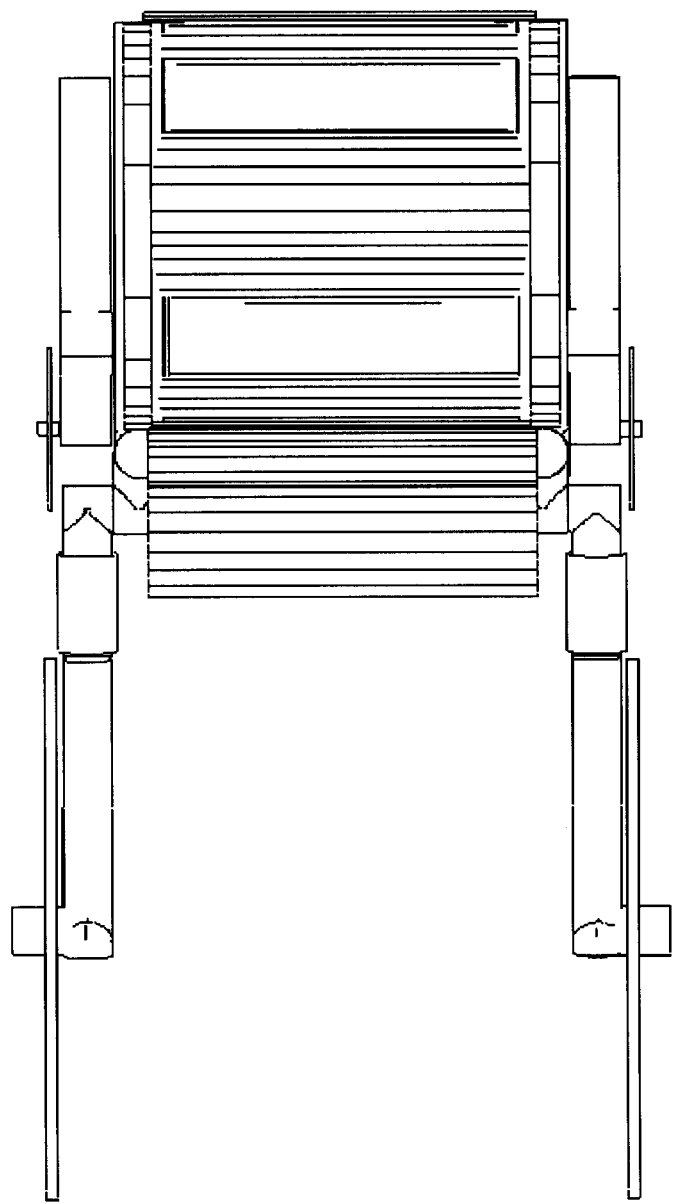
Figure 18:
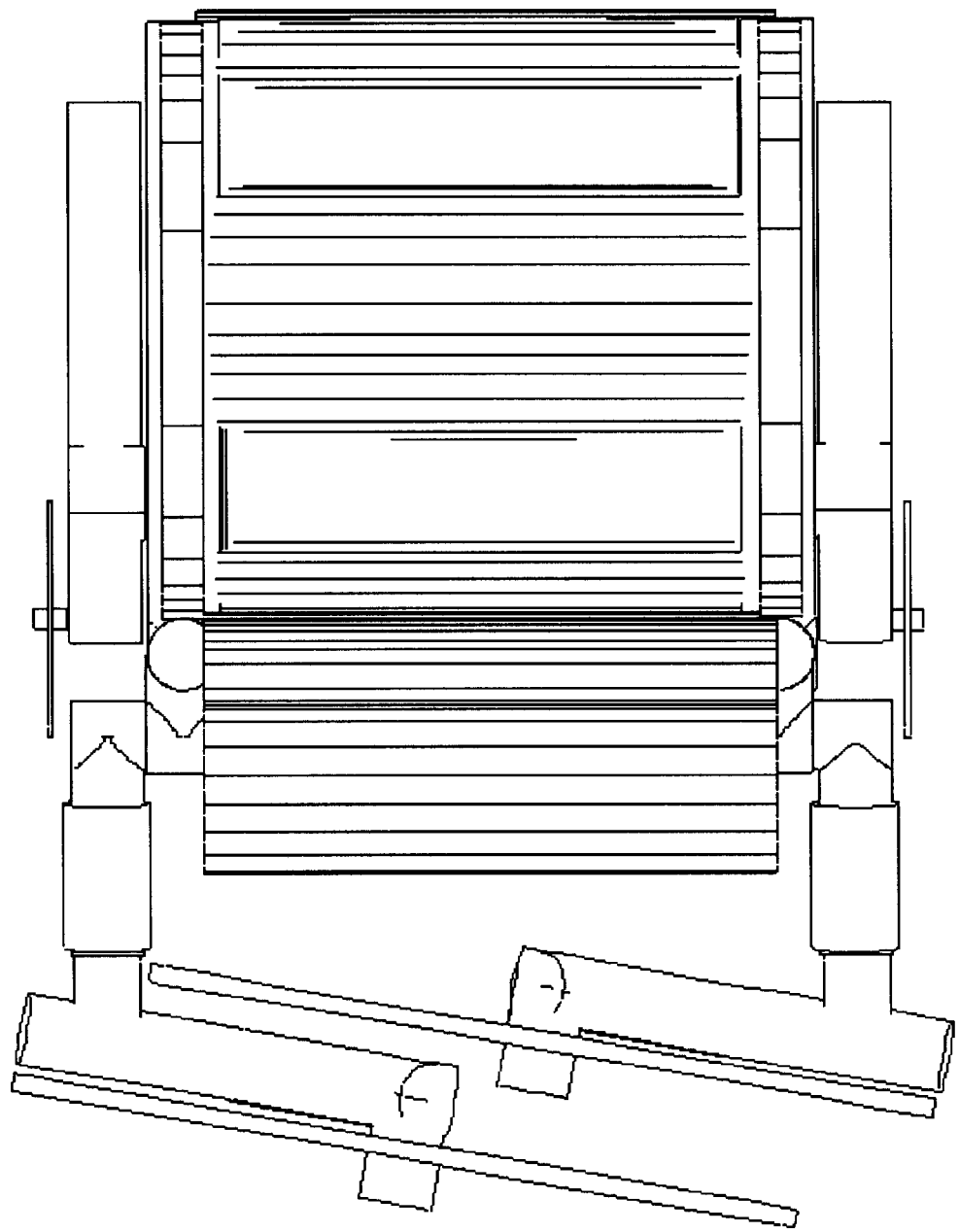

Yet another embodiment, (as illustrated in FIGS. 18A to 18J, 18 A1, 18B1, 6-2, 6-1, 5-1, 6A2, 6A1, 5A1, 5A2, 5A1, 5-0) has a wheelchair as detachable parts of a passenger support mechanism for the disabled, with collapsible wheels such that the chair may be backed into clamps 149 that attach on the lower side of the chair supports. The wheels of the wheelchair have an operational postion when the wheelchair is detached from the vehicle and when the wheels are extended, and a retracted position when the wheel as are retracted for storage and the wheelchair is supported by elements of the vehicle for transportation (wheels and retractable support members are the "undercarriage" of the wheelchair). For loading the wheelchair for transportation, in some such embodiments clamps 149 along with— movable parts of the passenger support mechanism—the lower cushion of the car seat 148—(which is specially made to accommodate the chair support cross members), are extended forward on tertiary slides or extension arms (the "mobility devices"—630 ) with for example hydraulic automation, such that the movement forward and if necessary down, supports the wheelchair by locking the chair clamps 149 to the chair cross supports 150, and then providing adequate support for the passenger and the wheelchair. The movable elements of the passenger support mechanism have an extended position to load the wheelchair and a retracted or operational position when the vehicle is operational. The Tertiary Slides or extension arms (the mobility devices—630) are supported by the impact decoupler/Secondary Slides which are in turn attached to the Upper Primary Slides in the extended or loading position. FIG. 18B illustrates the position of the seat bottom and clamps just below the wheelchair prior to attachment to the wheelchair. Once the hydraulic mechanism raises the wheelchair off the ground, the Primary Pivot of the rear wheels 151 may be unlocked and the wheel swung up and back and locked as noted in FIG. 18C. Notably the Rear wheels support much of the passenger weight when the wheelchair is used and therefore in addition to the pivoting Principal Rear Wheel Support 152 the rear wheel in addition has a Rear Wheel Support Strut 153 that supports the compressive load when the wheelchair is operational. Threafter the front wheels may be unlocked and swung back on the Primary Pivots for the Front Wheel 157. This is illustrated in FIG. 18 D.

Thereafter the space below the wheelchair is clear and the tertiary slide or arm mechanism can move the wheelchair back and lock it with and against the Seatback 156 which is specially shaped to accommodate the cross support members of the wheelchair. This is illustrated in FIG. 18 E. Some such embodiments may have the option to release the rigid back support mounting of the wheelchair 158, and thereby benefit from the reclining options of the vehicle seat back. In the process of moving back to the seat back 156, the spring loaded locking sleeves 155, that support the Secondary pivot for rear wheel retraction 154 are pushed forward relative to the wheelchair body thereby releasing the Secondary Pivot for rear wheel retraction 154 to allow the wheels to swing in and lock behind the seat back 156. This is illustrated in FIG. 18F. The retraction of the front wheels are as illustrated in FIGS. 18C to 18D. The wheelchair is then in a position on the extended impact decoupler/secondary slide to be transported into the vehicle. Notably in this wheelchair conversion embodiment, supplementary side and back air cushions 632 may be inflated to fill in the areas where wheelchair support members are in the vicinity of the passenger and also to hold the wheelchair structure securely, thereby providing further protection in the event of a collision of the vehicle. This wheelchair conversion embodiment has all the side impact protection as the regular seat and has all the options for front impact protection of the safety shield/harness or more conventional options. FIG. 18 G shows a plan view of the wheelchair prior to the insertion of Seat lower cushion and support structure. FIG. 18 H illustrates an elevation view of the wheelchair and the seat lower cushion and support structure. Still other of these embodiments may use turn tables or other rotating mechanisms (the "mobility devices") with or rather than the tertiary sliding arrangements or extending arms so that the wheelchair may be directly loaded on a turn table mounted on the impact decoupler/secondary slides, and then rotated into a driving or passenger position when retracted into the vehicle. The sequence of FIGS. 6-2, 6-1, 5-1, 5-0 illustrate one embodiment. FIG. 6-2 illustrates the normal operating position of the wheelchair as the passenger support mechanism with the supplementary air cushions 632 inflated to support the wheelchair which is supported by the mobility device 630. FIG. 6-1 illustrates the wheelchair still in the operating position but with the supplementary aircushions 632 deflated to allow detachment of the wheelchair. FIG. 5-1 illustrates the extended position of the wheelchair still on the mobility device 630. FIG. 5-0 illustrates the motion of the wheelchair on the mobility device 630 for disengagement. The sequence of FIGS. 6A2, 6A1, 5A1, 5-0 illustrate another embodiment as disclosed herein—respectively the operating position wth the supplementary air cushions 632 inflated, with the supplementary air cushions deflated for detachment, with the wheelchair in the extendd position ready for the mobility device to be activated, and FIG. 5-0 which shows the movement of the wheelchair in the slide type mobility device. The sequence FIGS. 6A2, 6A1, 5A1, 5A2, 5A1 illustrate the action of the mobility devides with the two functions of rotation and sliding as disclosed (represented by separate boxes for 630 in the FIGS. 5A2 and 5A1).

Yet another embodiment has anatomical micro-aircushions on the left and right edges of the support surface of the safety shield connected to selected sacrificial chambers along the bottom edge of said support surface. This will provide additional support for the passenger in a side impact, by assisting in preventing body movement outside the contoured seat under collision conditions.

Yet another embodiment has anatomical micro-aircushions on the outer edges of each of the contoured seats, particularly to cover a part of the front of the shoulders the legs and torso in the event of a side collision. These anatomical air-cushions use sacrificial chambers on the sides of the seats.

Yet another embodiment minimizes ejection hazards by controlling further the lateral movement of the seats under side impact. In these embodiments, the Upper primary slide is connected to the locking mechanisms that hold it to the vehicle under operating conditions through shock absorbers or spring mechanisms that allow controlled movement of the upper primary slides out of the vehicle when the vehicle sustains a side impact from the far side. In such embodiments the locks do not disengage when there is a side impact, as the shock absorbing devices provide the required controlled lateral movement of the far side upper primary slide under impact.

Yet another embodiment has a flexible stretchable (or folded) material that is bound to the protector shield and the "doors" of the vehicle on one of its edges where it makes contact normally with the vehicle body, the other edge of the flexible and stretchable material is bound to a frame that locks to the vehicle body under operating conditions. Under normal egress and ingress the frame along with the "doors" with the flexible, stretchable material operates as one unit the frame being held together with the "door" with door impact decouplers that fracture or disengage under impact, thereby allowing the "door" and the upper primary slide on the far side to extend out of the vehicle while the frame remains locked to the vehicle, and stretching the flexible, stretchable material so that passenger body extremities are not ejected from the vehicle but are retained by the flexible stretchable material within the vehicle.

Yet another embodiment has preinflated inside airbags that are deflated when seats move outwards (on the far side) under impact, thereby creating more space within the vehicle, minimizing the need for ejection on the far side under impact.

CONCLUSIONS, RAMIFICATIONS & SCOPE

Thus it will become apparent that the present invention presented, provides a new paradigm for implementing key safety features and providing utility in accessing passenger vehicles and comfort in travelling in such vehicles. While the above description provides many specificities, these should not be construed as limitations on the scope of the present invention, but rather as an exemplification of the preferred, an additional and an alternative embodiment thereof. Many other variations are possible.

The present invention provides an arrangement that diverts the impact energy in lateral or side impacts away from the passengers to the remaining mass of the vehicle thereby protecting the passengers but decelerating the impacting object with the remaining mass of the vehicle. Moreover the arrangement synergistically provides a means for utilitarian easy access to the vehicle for passengers and drivers alike and allows the installation of multi-element surround contoured seats for the comfort and protection of passengers. Furthermore, the arrangement allows the installation of a new and unique safety harness that may obviate the need for safety belts and front impact airbags for protection in head-on collisions. This arrangement differs sharply from the Background art in that it does not simply offer to the impacting body a reinforced rigid shell where the passenger is treated as part of this integral unit, but rather provides selective and differential treatment of the mass of the passengers and driver of the vehicle vis-à-vis the remaining mass of the vehicle. Furthermore the present invention differs sharply from the Background art in that the resulting structure synergistically permits the installation of contoured multi-element surround seats that would not be implementable without the slide arrangements on either side of the vehicle in the present invention.

The present invention provides a gravity slide drive for my arrangement for which there is no counterpart in the Background art. This allows further Utility and weight and energy saving in implementing the above elements of the present invention.

The present invention includes External side Airbags that differ sharply from the Background art in that for the first time they proactively create a "Just in Time" deceleration zone for the lateral or side impact with internal and/or external side airbags while not remaining in an extended position under normal operating conditions of the vehicle.

The present invention describes an indo-skeletal structure of the vehicle body that permits the energy transfer from the lateral or side impact through compressive members to the body of the vehicle. Unlike the Background art this indo-skeletal structure is designed to transfer energy to the body of the vehicle without transferring it to the passengers and driver of the vehicle. The passengers are targeted for protection with "Safety zones".

What is claimed is:

1. In a vehicle having a left and a right side, a vehicle structure comprising at least one passenger support mechanism consisting of fixed, movable and detachable elements wherein said detachable elements comprise a wheel chair wherein said movable elements may be retracted in the operational position of the vehicle and extended in the loading position of the vehicle, and wherein said wheelchair comprises a support frame, a seat back and a seat bottom, wherein said seat back and bottom, of said wheel chair when in the detached state from said fixed elements and movable elements of said passenger support mechanism, are accessible from the back and below respectively for support by said movable elements of said passenger support mechanism when required, said wheel chairs further comprising a collapsible undercarriage that is collapsible without obstructing the lower surface of said seat bottom, thereby enabling said wheel chair to be supported by said movable elements of said passenger support mechanism in said vehicle.

2. (D) The vehicle structure of claim 1, further comprising locking devices, that lock to the support frame members of said at least one wheel chair in said at least one passenger support mechanism, and are fixedly attached to the movable elements of said passenger support mechanism, whereby, said at least one wheel chair may be secured to said movable elements of said at least one passenger support mechanism, of said vehicle and supported by said movable elements of said at least one passenger support mechanism from below said seat bottom and locked in position by said locking mechanism on said frame members, thereby securing said wheelchair and occupant safely to said movable elements of said at least one passenger support mechanism and retracted to the operational position by said movable elements of said at least one passenger support mechanism while the vehicle is operational.

3. (D) The vehicle structure of claim 2, further comprising an independantly ejectable mechanism for each of said at least one passenger support mechanism, wherein:

a) said independently ejectable mechanism for the at least one passenger support mechanism on the left side of the vehicle are at least one of slidably mounted and pivotally mounted indirectly to fixed body members on the left side of said vehicle to allow said at least one passenger support mechanism on the left side of the vehicle to eject by one or more of sliding along a lateral axis and rotating about a vertical axis to a position substantially outside but adjoining the vehicle on the left side thereby allowing said passengers that ride on said at least one passenger support mechanism on the left side of said vehicle to mount and dismount from the left side of the vehicle by respectively attaching and detaching said wheel chair from said independently ejectable mechanism;

b) said independently ejectable mechanism for the at least one passenger support mechanism on the right side of the vehicle are at least one of slidably mounted and pivotally mounted indirectly to fixed body members on the right side of said vehicle to allow said at least one passenger support mechanism on the right side of the vehicle to eject by one or more of sliding along a lateral axis and rotating about a vertical axis to a position substantially outside but adjoining the vehicle on the right side thereby allowing said passengers that ride on said at least one passenger support mechanism on the right side of said vehicle to mount and dismount from the right side of the vehicle by respectively attaching and detaching said wheel chair from said independently ejectable mechanism.

4. (D) The vehicle structure of claim 3, wherein said independently ejectable mechanism has means to raise and lower said wheel chair, supporting said wheelchair on the lower surface of said seat bottom, thereby enabling wheels of said wheelchair when extended, to be lowered to and raised from contact with the ground in the vicinity of the vehicle.

5. (D) The vehicle structure of claim 3, wherein said at least one wheel chair comprises rear wheels that have an operating position when the wheel chair is in use and a retracted position when loaded into the vehicle and wherein said rear wheels of said wheel chair are folded behind the fixed and movable elements of said passenger support mechanism when in the retracted position, thereby isolating the wheel chair wheels from the passenger in the interest of safety while in the vehicle, and also providing a comfortable seating arrangement.

6. (I) In a vehicle having a right and left side and substantially massive components, and having at least one fixed body member connected with substantial rigidity to substantially all of the substantially massive components of said vehicle, a vehicle structure having an operating position attained during normal driving conditions and an extended position attained at the time of occupant access to the vehicle, said vehicle structure having a means to divert the impact energy in lateral impacts to be absorbed by said vehicle through the at least one fixed body member while releasing at least one occupant having mass, weight, left and right sides, a back and a bottom, to move independently of said vehicle, in a passenger support mechanism with detachable elements consisting of a wheel chair, said release of said at least one occupant being in a predetermined controlled fashion, in order to minimize injury to such at least one occupant.

7. (D) The vehicle structure of claim 6, further comprising:
  a) at least one pair of safety beam lower elements comprising two members, each member of said at least one pair having a first face and a second face, and constructed to provide a means to resist compressive lateral impact forces, and to provide support for components attached thereto, a member of each at least one pair of said safety beam lower elements being directly mounted on its second face to the at least one fixed body member said mounting being on the left side and the right side of the vehicle respectively, the members of each at least one pair being mounted at the same longitudinal position of said vehicle on a lateral axis;
  b) at least one pair of a safety beam upper elements, comprising two members, each member of said pair having a first face and a second face and designed to resist compression, and each of the members of said pair mounted to the first face of each member of a pair of said safety beam lower element on the left and the right sides of the vehicle;
  c) at least one pair of passenger support mechanisms each pair comprising two members, members of each pair being mounted on each of the left and the right sides of said vehicle on said lateral axes and at least one member of said pair of said passenger support mechanisms comprising, movable and detachable elements in addition to the fixed elements comprised in both members of the at least one pair of passenger support mechanisms;
  d) a plurality of secondary slides each with a first face and a second face, attached by said first face to one member of said pair of said safety beam upper elements on the second face of said safety beam upper element and said secondary slides fixedly attached by said second face to said fixed elements of each of the members of said at least one pair of passenger support mechanisms, such that said secondary slides are normally fixedly attached by said first face to said safety beam upper element, but become decoupled and thereafter slidably attached by said first face to said safety beam upper element along a lateral axis when a lateral shear force greater than a predetermined force is applied to said first face relative to said second face of said secondary slides allowing the said passenger support mechanisms attached to said second face of said secondary slides to slide along said lateral axis relative to said safety beam upper element, said secondary slides mounted on each of said safety beam upper element being constructed such that after they are decoupled, they can be guided laterally by, and are slidably attached to at least one of said safety beam upper element mounted on a single pair of said safety beam lower element, and further positioned on the safety beam upper element at all times such that they are not obstructed by any elements of the vehicle in the event that said secondary slides need under collision conditions to traverse the center of the vehicle to the further side of the vehicle;
  e) internal airbags, each mounted on the outer side of and adjoining each of the passenger support mechanisms, on both the left and the right sides of the vehicle, such that upon detection of an impact event on a impact side of said vehicle, the airbag on said impact side of said vehicle deploys next to the adjoining passenger support mechanism upwards and inwards to protect the passengers; and
  f) pairs of at least one protector assembly comprising a shock-absorbing device and a force distributing protector shield, elements of each pair being mounted on the left side and the right side of said vehicle, said protector assembly installed to protect each of the passenger support mechanisms, on each of the left and right sides of the vehicle, and locked to the fixed body members of the vehicle to be oriented parallel to the sides to the passenger support mechanisms and adjoining said internal airbags, when in the operating position and positioned so as to not interfere with egress and ingress when said passenger support mechanisms are in the extended position.

8. (D) The vehicle structure of claim 6, further comprising:
  a) at least one pair of safety beam lower elements each comprising two members, each member of said at least one pair having a first face and a second face, and constructed to provide a means to resist compressive lateral impact forces, and to provide support for components attached thereto, a member of each at least one pair of said safety beam lower element being directly mounted on its second face to the at least one fixed body member said mounting being on the left side and the right side of the vehicle respectively, the members of each pair being mounted at the same longitudinal position of said vehicle on a lateral axis;

b) at least one pair of a safety beam upper elements, each comprising two members, each member of said pair having a first face and a second face and designed to resist compression, and each of the members of said pairs mounted to the first face of each member of a pair of said safety beam lower element on the left and the right sides of the vehicle;

c) at least one pair of passenger support mechanisms each pair comprising two members, members of of each pair being mounted on each of the left and the right sides of said vehicle on said lateral axes and at least one member of said pair of said passenger support mechanisms comprising, movable and detachable elements in addition to the fixed elements comprised in both members of the at least one pair of passenger support mechanisms;

d) one or more mobility devices each having a first face and a second face that are one or both of rotationally and slidably connected to each other, and said first face of each of said mobility devices, providing a surface for support of a seat bottom of said wheelchairs, and said mobility devices being designed to assist ingress of passenger by locating said second face below said bottom of said wheelchair while said wheel chair is on the ground beside said vehicle, and thereafter raising said wheel chair and locating it adjoining said fixed elements of said passenger support mechanisms to be then one or both of translated and rotated into the operating position in the vehicle, and said mobility devices being designed to assist egress of passenger by supporting said seat bottom of said wheelchair and moving said wheel chair from said fixed elements of said passnger support mechanism to a position on the ground beside said vehicle by one or both of traslation and rotation of said first face of said mobility devices;

e) a plurality of secondary slides each with a first face and a second face, attached by said first face to one member of said pair of said safety beam upper element on the second face of said safety beam upper element and said secondary slides fixedly attached by said second face to said second face of one of said one or more mobility devices, such that said secondary slides are normally fixedly attached by said first face to said safety beam upper element, but become decoupled and thereafter slidably attached by said first face to said safety beam upper element along a lateral axis when a lateral shear force greater than a predetermined force is applied to said first face relative to said second face of said secondary slides allowing the said passenger support mechanisms along with said mobility devices, attached to said second face of said secondary slides to slide along said lateral axis relative to said safety beam upper element, said secondary slides mounted on each of said safety beam upper element being constructed such that after they are decoupled, they can be guided laterally by, and are slidably attached to at least one of said safety beam upper element mounted on a single pair of said safety beam lower elements, and further positioned on the safety beam upper element at all times such that they are not obstructed by any elements of the vehicle in the event that said secondary slides need under collision conditions to traverse the center of the vehicle to the further side of the vehicle;

f) internal airbags, each mounted on the outer side of and adjoining each of the passenger support mechanisms, on both the left and the right sides of the vehicle, such that upon detection of an impact event, on a impact side of said vehicle, the airbag deploys upwards and inwards next to said passenger support mechanism on the impact side of said vehicle to protect the passengers; and g) pairs of at least one protector assembly comprising a shock-absorbing device and a force distributing protector shield, elements of each pair being mounted on the left side and the right side of said vehicle, said protector assembly installed to protect each member of the pair of passenger support mechanisms, on each of the left and right sides of the vehicle, and locked to the fixed body members of the vehicle to be oriented substantially parallel to the sides to the passenger support mechanisms and adjoining said internal airbags, when in the operating position and positioned so as to not interfere with egress and ingress when said passenger support mechanisms are in the extended position.

9. (D) The vehicle structure of claim 8, wherein said wheel chairs comprise rear wheels and front wheels and wherein each of said rear wheels and front wheels may be in an extended or retracted position, and wherein the rear wheels of said wheel chair are folded behind the passenger support mechanism thereby isolating the wheel chair wheels from the passenger in the interest of safety while in the vehicle, and also providing a comfortable seating arrangement.

10. (D) The vehicle arrangement structure of claim 8, wherein said wheel chair is provided additional security by being held in position by inflatable supplementary air cushions on the sides of the chair after being loaded into position.

11. (I) A method to facilitate ingress to vehicles for passengers in wheelchairs with wheels with a safe retracted position and an exended position, comprising:
   a) supporting said wheelchair on its bottom, from its position on the ground;
   b) raising said said wheelchair from the ground;
   c) retracting the wheels of said wheelchair to the safe retracted position with regard to the passenger;
   d) one or more of translating and rotating said passenger in said wheel chair to an operating position within the vehicle.

12. (I) A method to facilitate egress to vehicles for a passenger in a wheelchair with wheels with a safe retracted position and an extended position, comprising:
   a) one or more of translating and rotating said passenger in said wheel chair from a operating position within the vehicle to a position substantially outside the vehicle;
   b) extending the wheels of said wheelchair from the safe retracted position with regard to the passenger to the extended position;
   c) lowering said wheelchair to the ground;
   d) releasing support of said wheelchair on its bottom by vehicle when said wheelchair is supported by the ground.

* * * * *

UNITED STATES PATENT AND TRADEMARK OFFICE
CERTIFICATE OF CORRECTION

PATENT NO. : 6,715,816 B2
APPLICATION NO. : 09/779593
DATED : April 6, 2004
INVENTOR(S) : Arjuna Indraeswaran Rajasingham It is certified that error appears in the above-identified patent and that said Letters Patent is hereby corrected as shown below:

Column 1, lines 7-16 should be changed to the following and reproduced on the first page of the Patent:

This application is a continuation-in-part of: Serial No. 09/404,475 filed September 24, 1999 now U.S. Patent No. 6,547,315; Serial No. 09/435,830 filed November 8, 1999 now U.S. Patent No. 6,609,749; and Serial No. 08/936,626 filed September 24, 1997 now U.S. Patent No. 6,059,354. This application also claims priority to: Prov. Serial Nos. 60,195,298 filed April 10, 2000 and 60/226,570 filed August 21, 2000. This application also claims priority to: EP Application No. 00203896 filed November 7, 2000 now EP Patent No. 1099607; and EP Application No. 98948260 filed September 17, 1998 now EP Patent No. 1021320.

EP Application No. 00203896 claims priority to: Serial No. 09/435,830 filed November 8, 1999 now U.S. Patent No. 6,609,749; and Prov. Serial Nos. 60,195,298 filed April 10, 2000 and 60/226,570 filed August 21, 2000.

EP Application No. 98948260 claims priority to Serial No. 08/936,626 filed September 24, 1997 now U.S. Patent No. 6,059,354.

U.S. Patent No. 6,547,315 is a continuation of Serial No. 08/936,626 filed September 24, 1997 now U.S. Patent No. 6,059,354.

U.S. Patent No. 6,609,749 is a continuation-in-part of Serial No. 08/936,626 filed September 24, 1997 now U.S. Patent No. 6,059,354.

Signed and Sealed this
Sixth Day of November, 2012

David J. Kappos
*Director of the United States Patent and Trademark Office*